United States Patent
Kilaru et al.

(10) Patent No.: US 10,664,447 B2
(45) Date of Patent: May 26, 2020

(54) DYNAMIC MANAGEMENT OF EXPANDABLE CACHE STORAGE FOR MULTIPLE NETWORK SHARES CONFIGURED IN A FILE SERVER

(71) Applicant: Commvault Systems, Inc., Tinton Falls, NJ (US)

(72) Inventors: Satish Chandra Kilaru, Manalapan, NJ (US); Rajiv Kottomtharayil, Marlboro, NJ (US); Paramasivam Kumarasamy, Morganville, NJ (US); William Katcher, Tinton Falls, NJ (US)

(73) Assignee: Commvault Systems, Inc., Tinton Falls, NJ (US)

( * ) Notice: Subject to any disclaimer, the term of this patent is extended or adjusted under 35 U.S.C. 154(b) by 323 days.

(21) Appl. No.: 15/601,944

(22) Filed: May 22, 2017

(65) Prior Publication Data

US 2018/0018344 A1 Jan. 18, 2018

Related U.S. Application Data

(60) Provisional application No. 62/361,417, filed on Jul. 12, 2016.

(51) Int. Cl.
*G06F 16/174* (2019.01)
*G06F 11/14* (2006.01)
(Continued)

(52) U.S. Cl.
CPC .......... *G06F 16/1748* (2019.01); *G06F 3/067* (2013.01); *G06F 3/0608* (2013.01);
(Continued)

(58) Field of Classification Search
None
See application file for complete search history.

(56) References Cited

U.S. PATENT DOCUMENTS

| 4,084,231 A | 4/1978 | Capozzi et al. |
| 4,267,568 A | 5/1981 | Dechant et al. |

(Continued)

FOREIGN PATENT DOCUMENTS

| EP | 0259912 | 3/1988 |
| EP | 0405926 | 1/1991 |

(Continued)

OTHER PUBLICATIONS

Callaghan et al., NFS Version 3 Protocol Specification Jun. 1995, ietf.org, Request for Comments 1813, https://tools.ietf.org/rfc/rfc1813.txt.*

(Continued)

*Primary Examiner* — Jason G Liao
(74) *Attorney, Agent, or Firm* — Commvault Systems, Inc. Knobbe, Martens, Olson & Bear, LLP

(57) ABSTRACT

Expandable cache management dynamically manages cache storage for multiple network shares configured in a file server. Once a file is written to a directory or folder on a specially designated network share, such as one that is configured for "infinite backup," an intermediary pre-backup copy of the file is created in an expandable cache in the file server that hosts the network share. On write operations, cache storage space can be dynamically expanded or freed up by pruning previously backed up data. This advantageously creates flexible storage caches in the file server for each network share, each cache managed independently of other like caches for other network shares on the same file server. On read operations, intermediary file storage in the expandable cache gives client computing devices speedy access to data targeted for backup, which is generally quicker than restoring files from backed up secondary copies.

18 Claims, 23 Drawing Sheets

(51) Int. Cl.
  *G06F 16/172* (2019.01)
  *G06F 16/182* (2019.01)
  *G06F 3/06* (2006.01)
  *G06F 11/10* (2006.01)
  *G06F 9/455* (2018.01)

(52) U.S. Cl.
  CPC .......... *G06F 3/0643* (2013.01); *G06F 3/0652* (2013.01); *G06F 11/1466* (2013.01); *G06F 16/172* (2019.01); *G06F 16/1844* (2019.01); *G06F 11/1076* (2013.01); *G06F 11/1446* (2013.01); *G06F 11/1469* (2013.01); *G06F 2009/45579* (2013.01); *G06F 2211/1009* (2013.01)

(56) References Cited

U.S. PATENT DOCUMENTS

| | | |
|---|---|---|
| 4,283,787 A | 8/1981 | Chambers |
| 4,417,321 A | 11/1983 | Chang et al. |
| 4,641,274 A | 2/1987 | Swank |
| 4,654,819 A | 3/1987 | Stiftler et al. |
| 4,686,620 A | 8/1987 | Ng |
| 4,912,637 A | 3/1990 | Sheedy et al. |
| 4,995,035 A | 2/1991 | Cole et al. |
| 5,005,122 A | 4/1991 | Griffin et al. |
| 5,093,912 A | 3/1992 | Dong et al. |
| 5,133,065 A | 7/1992 | Cheffetz et al. |
| 5,193,154 A | 3/1993 | Kitajima et al. |
| 5,212,772 A | 5/1993 | Masters |
| 5,226,157 A | 7/1993 | Nakano et al. |
| 5,239,647 A | 8/1993 | Anglin et al. |
| 5,241,668 A | 8/1993 | Eastridge et al. |
| 5,241,670 A | 8/1993 | Eastridge et al. |
| 5,276,860 A | 1/1994 | Fortier et al. |
| 5,276,867 A | 1/1994 | Kenley et al. |
| 5,287,500 A | 2/1994 | Stoppani, Jr. |
| 5,301,286 A | 4/1994 | Rajani |
| 5,321,816 A | 6/1994 | Rogan et al. |
| 5,347,653 A | 9/1994 | Flynn et al. |
| 5,410,700 A | 4/1995 | Fecteau et al. |
| 5,420,996 A | 5/1995 | Aoyagi |
| 5,454,099 A | 9/1995 | Myers et al. |
| 5,559,991 A | 9/1996 | Kanfi |
| 5,642,496 A | 6/1997 | Kanfi |
| 6,415,300 B1* | 7/2002 | Liu .................... G06F 11/1458 707/652 |
| 6,418,478 B1 | 7/2002 | Ignatius et al. |
| 6,542,972 B2 | 4/2003 | Ignatius et al. |
| 6,658,436 B2 | 12/2003 | Oshinsky et al. |
| 6,721,767 B2 | 4/2004 | De Meno et al. |
| 6,760,723 B2 | 7/2004 | Oshinsky et al. |
| 7,003,641 B2 | 2/2006 | Prahlad et al. |
| 7,035,880 B1 | 4/2006 | Crescenti et al. |
| 7,107,298 B2 | 9/2006 | Prahlad et al. |
| 7,124,133 B2 | 10/2006 | Yamauchi et al. |
| 7,130,970 B2 | 10/2006 | Devassy et al. |
| 7,162,496 B2 | 1/2007 | Amarendran et al. |
| 7,174,433 B2 | 2/2007 | Kottomtharayil et al. |
| 7,246,207 B2 | 7/2007 | Kottomtharayil et al. |
| 7,287,047 B2* | 10/2007 | Kavuri ................ G06F 11/1448 |
| 7,315,923 B2 | 1/2008 | Retnamma et al. |
| 7,343,453 B2 | 3/2008 | Prahlad et al. |
| 7,389,311 B1 | 6/2008 | Crescenti et al. |
| 7,395,282 B1 | 7/2008 | Crescenti et al. |
| 7,440,982 B2 | 10/2008 | Lu et al. |
| 7,454,569 B2 | 11/2008 | Kavuri et al. |
| 7,490,207 B2 | 2/2009 | Amarendran et al. |
| 7,500,053 B1 | 3/2009 | Kavuri et al. |
| 7,529,782 B2 | 5/2009 | Prahlad et al. |
| 7,536,291 B1 | 5/2009 | Vijayan Retnamma et al. |
| 7,543,125 B2 | 6/2009 | Gokhale |
| 7,546,324 B2 | 6/2009 | Prahlad et al. |
| 7,603,386 B2 | 10/2009 | Amarendran et al. |
| 7,606,844 B2 | 10/2009 | Kottomtharayil |
| 7,613,752 B2 | 11/2009 | Prahlad et al. |
| 7,617,253 B2 | 11/2009 | Prahlad et al. |
| 7,617,262 B2 | 11/2009 | Prahlad et al. |
| 7,620,710 B2 | 11/2009 | Kottomtharayil et al. |
| 7,627,728 B1* | 12/2009 | Roeck .................. G06F 11/203 711/162 |
| 7,636,743 B2 | 12/2009 | Erofeev |
| 7,651,593 B2 | 1/2010 | Prahlad et al. |
| 7,657,550 B2 | 2/2010 | Prahlad et al. |
| 7,660,807 B2 | 2/2010 | Prahlad et al. |
| 7,661,028 B2 | 2/2010 | Erofeev |
| 7,734,669 B2 | 6/2010 | Kottomtharayil et al. |
| 7,747,579 B2 | 6/2010 | Prahlad et al. |
| 7,801,864 B2 | 9/2010 | Prahlad et al. |
| 7,809,914 B2 | 10/2010 | Kottomtharayil et al. |
| 8,156,086 B2 | 4/2012 | Lu et al. |
| 8,170,995 B2 | 5/2012 | Prahlad et al. |
| 8,229,954 B2 | 7/2012 | Kottomtharayil et al. |
| 8,230,195 B2 | 7/2012 | Amarendran et al. |
| 8,285,681 B2 | 10/2012 | Prahlad et al. |
| 8,307,177 B2 | 11/2012 | Prahlad et al. |
| 8,364,652 B2 | 1/2013 | Vijayan et al. |
| 8,370,542 B2 | 2/2013 | Lu et al. |
| 8,578,120 B2 | 11/2013 | Attarde et al. |
| 8,954,446 B2 | 2/2015 | Vijayan et al. |
| 9,020,900 B2 | 4/2015 | Vijayan et al. |
| 9,098,495 B2 | 8/2015 | Gokhale |
| 9,870,366 B1 | 1/2018 | Duan et al. |
| 10,228,962 B2 | 3/2019 | Dornemann et al. |
| 10,437,937 B2 | 10/2019 | Kilaru et al. |
| 2006/0224846 A1 | 10/2006 | Amarendran et al. |
| 2009/0193064 A1 | 7/2009 | Chen et al. |
| 2009/0319534 A1 | 12/2009 | Gokhale |
| 2010/0332401 A1 | 12/2010 | Prahlad et al. |
| 2012/0150818 A1 | 6/2012 | Vijayan Retnamma et al. |
| 2012/0150826 A1 | 6/2012 | Vijayan Retnamma et al. |
| 2012/0297140 A1 | 11/2012 | Wu et al. |
| 2012/0311068 A1 | 12/2012 | Gladwin et al. |
| 2013/0262394 A1 | 10/2013 | Kumarasamy et al. |
| 2013/0339298 A1 | 12/2013 | Muller et al. |
| 2014/0201170 A1 | 7/2014 | Vijayan et al. |
| 2015/0264111 A1 | 9/2015 | Aleksandrov |
| 2015/0347553 A1* | 12/2015 | Aizman ............... G06F 16/273 713/189 |
| 2016/0350391 A1 | 12/2016 | Vijayan et al. |
| 2017/0185488 A1 | 6/2017 | Kumarasamy et al. |
| 2017/0193003 A1 | 7/2017 | Vijayan et al. |
| 2017/0235647 A1 | 8/2017 | Kilaru et al. |
| 2017/0242871 A1 | 8/2017 | Kilaru et al. |
| 2018/0018270 A1 | 1/2018 | Kilaru et al. |
| 2019/0236053 A1 | 8/2019 | Kilaru et al. |

FOREIGN PATENT DOCUMENTS

| | | |
|---|---|---|
| EP | 0467546 | 1/1992 |
| EP | 0541281 | 5/1993 |
| EP | 0774715 | 5/1997 |
| EP | 0809184 | 11/1997 |
| EP | 0899662 | 3/1999 |
| EP | 0981090 | 2/2000 |
| WO | WO 95/13580 | 5/1995 |
| WO | WO 99/12098 | 3/1999 |
| WO | WO 2006/052872 | 5/2006 |

OTHER PUBLICATIONS

Harrison, CDIA Training & Test Preparation Guide 2000, Specialized Solutions Inc., TOC, 68-71.*

Silberschatz et al., Operating Systems Concepts 1999 Wiley & Sons., 5th ed.*

Files Systems, Physical View (Disk Allocation Methods) date unknown [captured on Jan. 10, 2001 by archive.org], https://web.archive.org/web/20010110195100/http://www2.cs.uregina.ca/~hamilton/courses/330/notes/allocate/allocate.html.*

Ding et al., Resource-Based Striping: An Efficient Striping Strategy for Video Servers Using Heterogeneous Disk-Subsystems 2003, Multimedia Tools and Applications, vol. 19, pp. 29-51.*

(56) References Cited

OTHER PUBLICATIONS

Arneson, "Mass Storage Archiving in Network Environments" IEEE, Oct. 31-Nov. 1998, pp. 45-50.
Cabrera, et al. "ADSM: A Multi-Platform, Scalable, Back-up and Archive Mass Storage System," Digest of Papers, Compcon '95, Proceedings of the 40th IEEE Computer Society International Conference, Mar. 5, 1995-Mar. 9, 1995, pp. 420-427, San Francisco, CA.
Eitel, "Backup and Storage Management in Distributed Heterogeneous Environments," IEEE, 1994, pp. 124-126.
Huff, KL, "Data Set Usage Sequence Number," IBM Technical Disclosure Bulletin, vol. 24, No. 5, Oct. 1981 New York, US, pp. 2404-2406.
Rosenblum et al., "The Design and Implementation of a Log-Structure File System," Operating Systems Review SIGOPS, vol. 25, No. 5, May 1991, New York, US, pp. 1-15.

\* cited by examiner

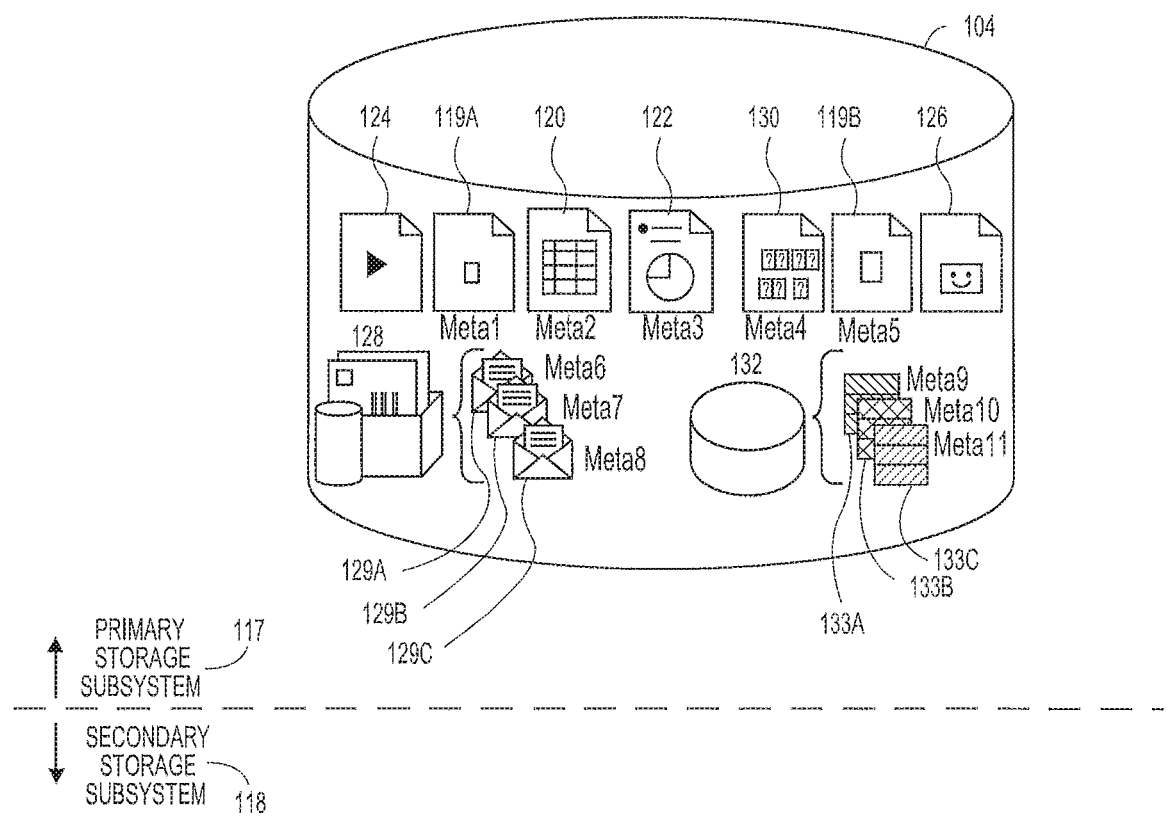
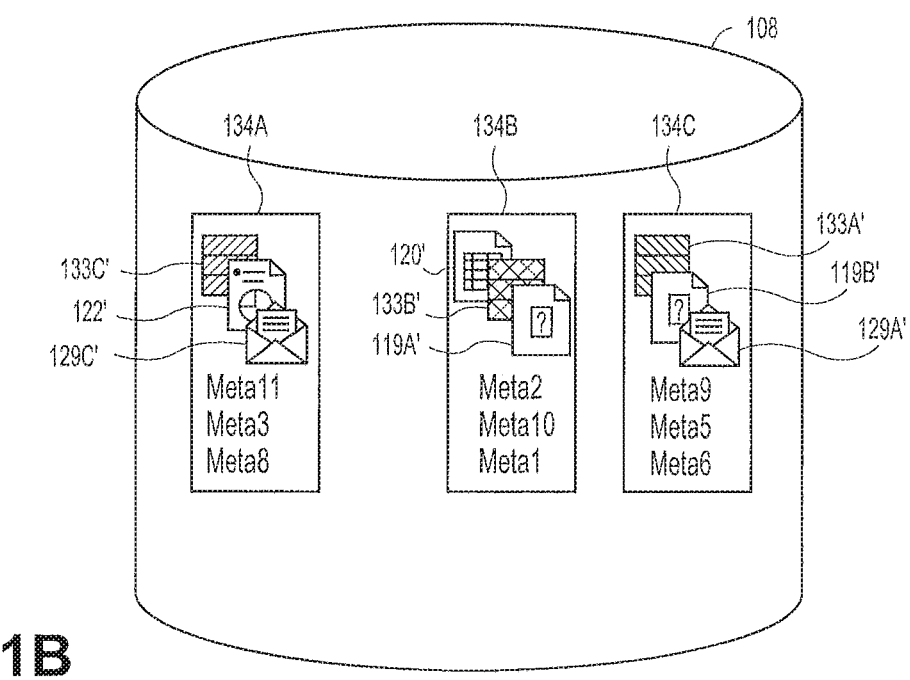
FIG. 1B

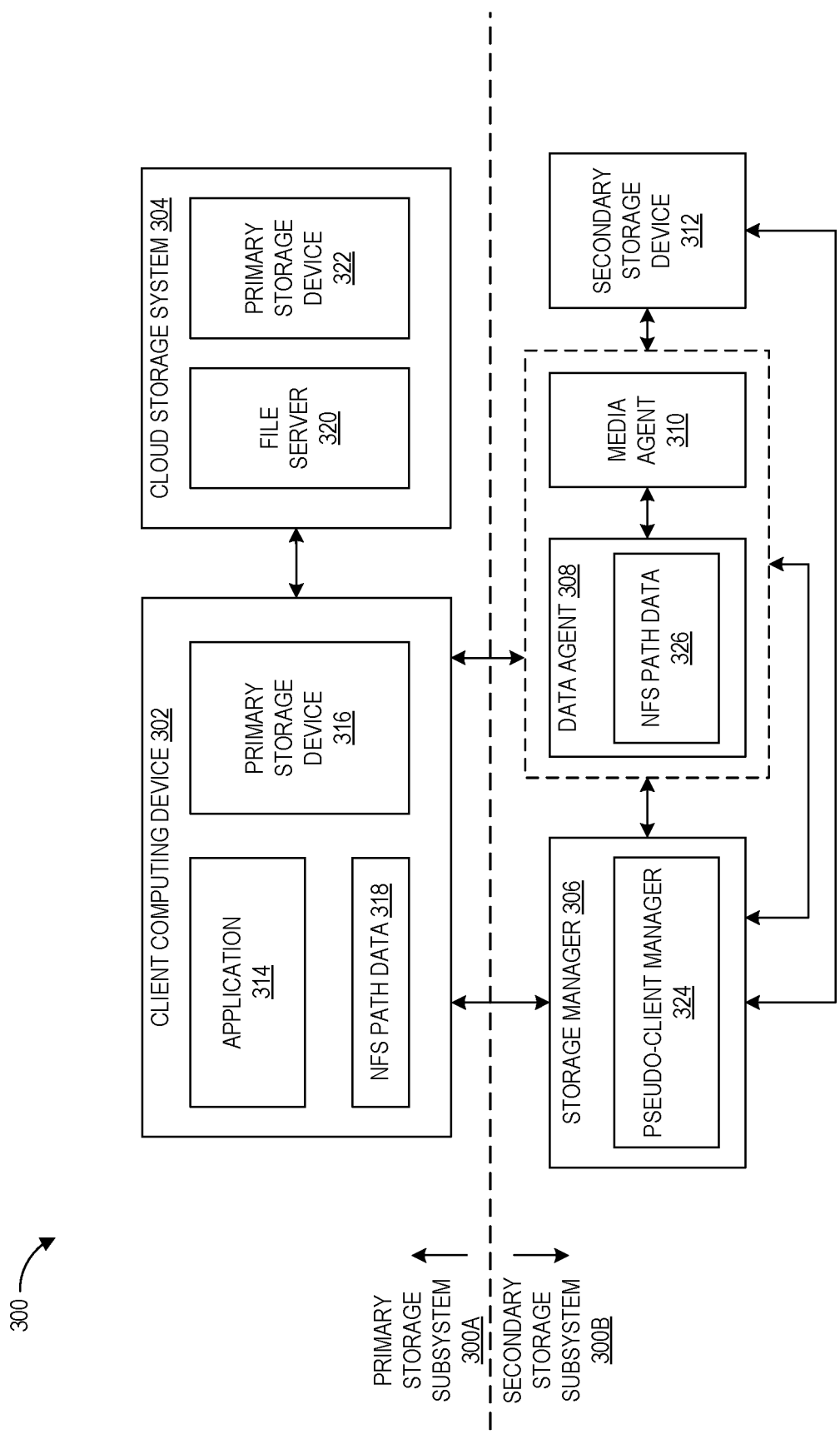

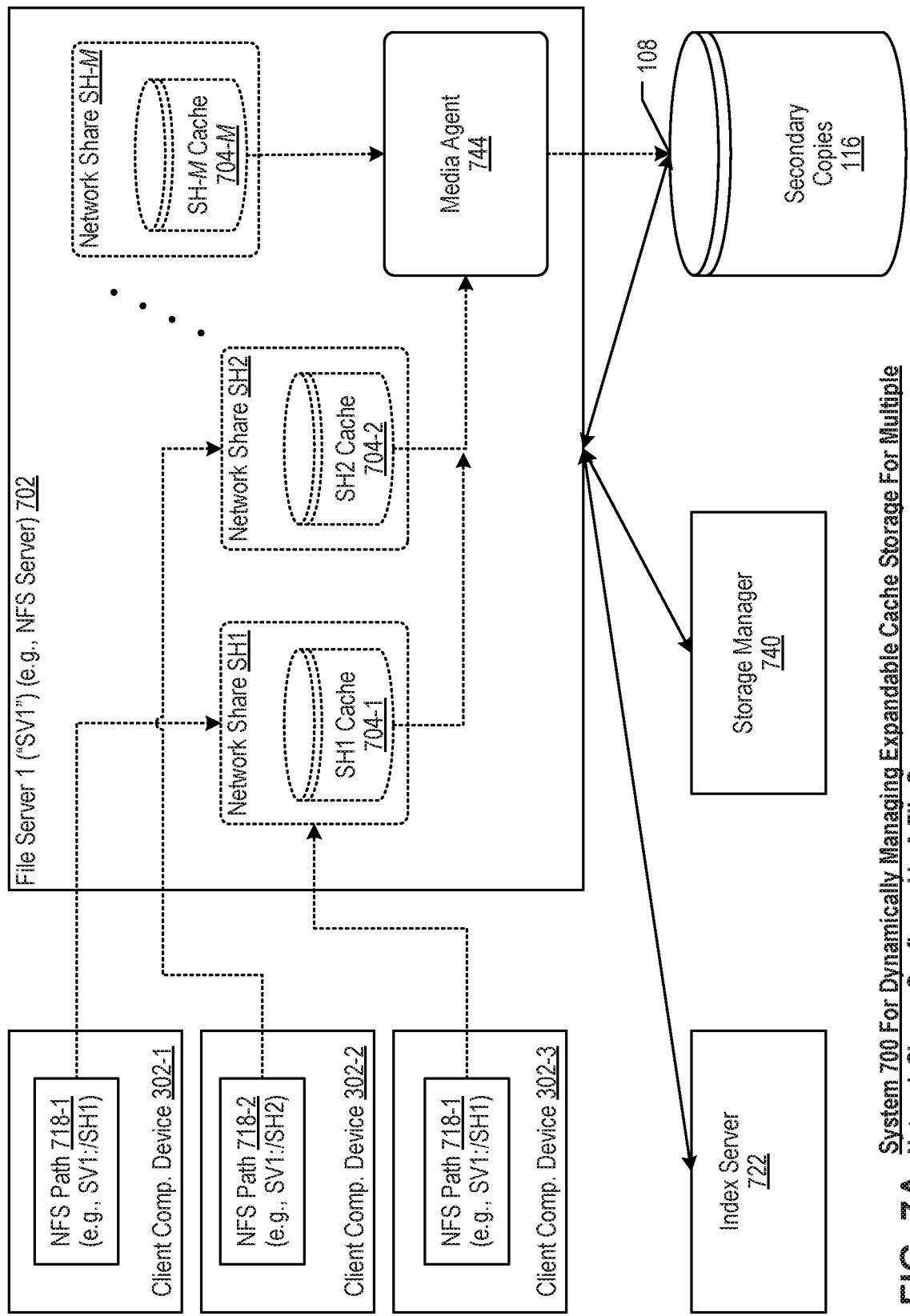
FIG. 7A  System 700 For Dynamically Managing Expandable Cache Storage For Multiple Network Shares Configured In A File Server

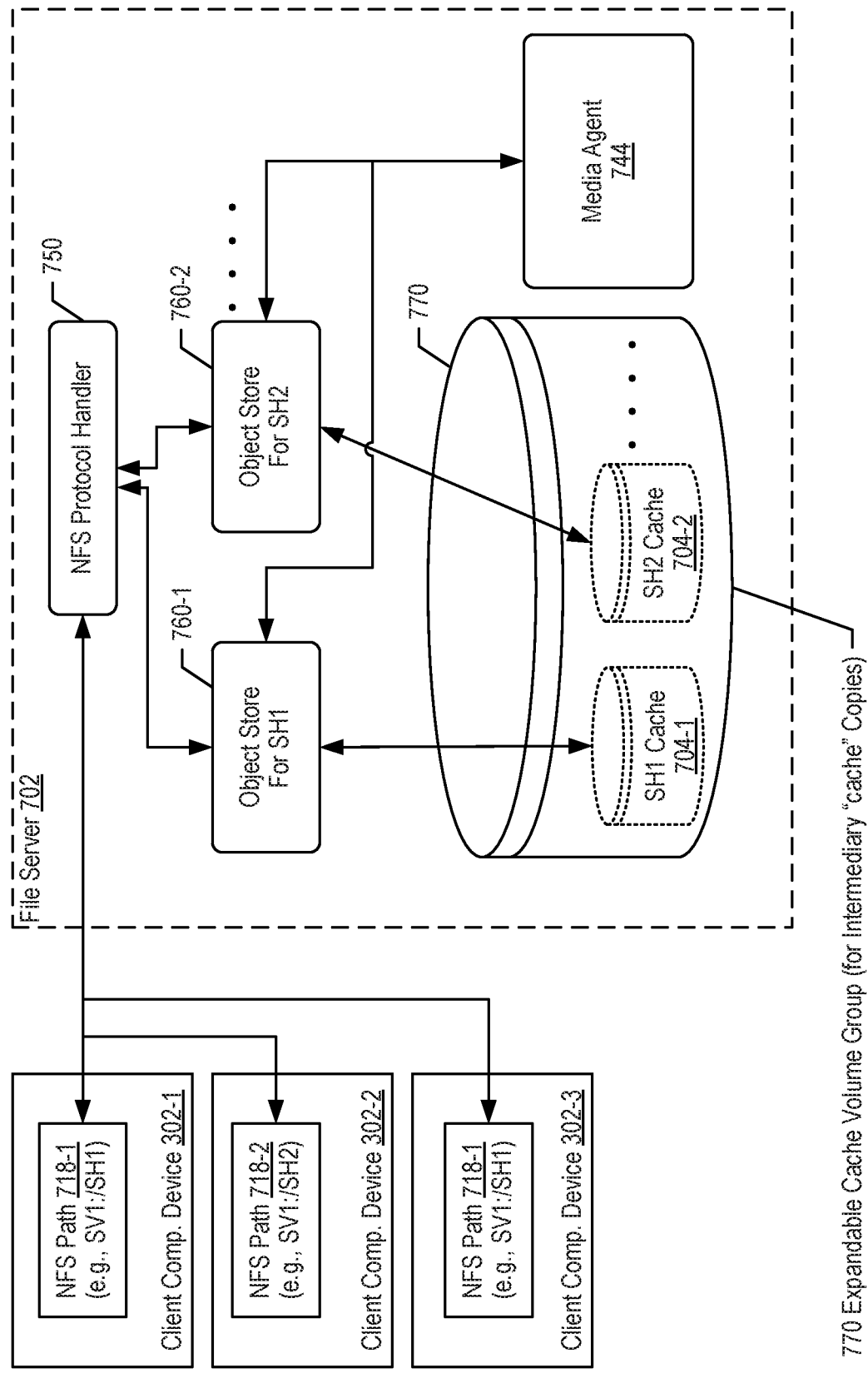
FIG. 7B  Illustrative Implementation Of Share-Specific Cache In Sys. 700 Using Object Store And Expandable Cache Storage

DYNAMIC MANAGEMENT OF EXPANDABLE CACHE STORAGE FOR MULTIPLE NETWORK SHARES CONFIGURED IN A FILE SERVER

INCORPORATION BY REFERENCE TO ANY PRIORITY APPLICATIONS

This application claims the benefit of U.S. Provisional Patent Application No. 62/361,417, filed on 12 Jul. 2016, and entitled "Dynamic Management of Expandable Cache Storage for Multiple Network Shares Configured in a File Server". Any and all applications, if any, for which a foreign or domestic priority claim is identified in the Application Data Sheet of the present application are hereby incorporated by reference in their entireties under 37 CFR 1.57.

COPYRIGHT NOTICE

A portion of the disclosure of this patent document contains material which is subject to copyright protection. The copyright owner has no objection to the facsimile reproduction by anyone of the patent document and/or the patent disclosure as it appears in the United States Patent and Trademark Office patent file and/or records, but otherwise reserves all copyrights whatsoever.

BACKGROUND

Businesses recognize the commercial value of their data and seek reliable, cost-effective ways to protect the information stored on their computer networks while minimizing impact on productivity. A company might back up critical computing systems such as databases, file servers, web servers, virtual machines, and so on as part of a daily, weekly, or monthly maintenance schedule. The company may similarly protect computing systems used by its employees, such as those used by an accounting department, marketing department, engineering department, and so forth. Given the rapidly expanding volume of data under management, companies also continue to seek innovative techniques for managing data growth, for example by migrating data to lower-cost storage over time, reducing redundant data, pruning lower priority data, etc. Enterprises also increasingly view their stored data as a valuable asset and look for solutions that not only protect and manage, but also leverage their data. For instance, data analysis capabilities, information management, improved data presentation and access features, and the like, are in increasing demand.

SUMMARY

Expandable cache management dynamically manages cache storage for multiple network shares configured in a file server. Once a file is written to a directory or folder on a specially designated network share, such as one that is configured for "infinite backup," an intermediary pre-backup copy of the file is created in an expandable cache in the file server that hosts the network share. On write operations, cache storage space can be dynamically expanded or freed up by pruning previously backed up data. This advantageously creates flexible storage caches in the file server for each network share, each cache managed independently of other like caches for other network shares on the same file server. On read operations, intermediary file storage in the expandable cache gives client computing devices speedy access to data targeted for backup, which is generally quicker than restoring files from backed up secondary copies. On read operations, cache storage space can be dynamically expanded or freed up by pruning previously backed up data to make room for restored files.

The illustrative system architecture not only provides intermediary file storage enabling client computing devices to have speedy access to data targeted for backup, much quicker than restoring files from secondary copies, and moreover does so expandably by increasing as needed the amount of storage space available on the file server for the intermediary copies. Likewise, cache storage can be expanded on restore operations in response to read requests. This approach advantageously creates flexible storage caches in the file server for each network share (a "network-share-specific" cache), each cache managed independently of other like caches for other network shares on the same file server. Each network-share-specific cache logically comprises any number of share-specific folders configured in and distributed amongst any number of respective storage volumes that are present in the file server. Thus, each network share has expandable cache storage configured in one or more storage volumes. For example, a volume group comprising a plurality of storage volumes is illustratively created in the file server—the volume group forming the initial basis for expandable storage in the file server. Some of these storage volumes, though included in the volume group, are initially left unused until needed to expand the storage space for one or more network shares. When more cache storage is needed for a particular network share, a new share-specific folder is created in a previously unused volume, thus expanding the amount of storage available to that particular network share. When a certain high-water mark is reached measuring the amount of cache storage occupied by a given network share and/or when none of the available storage volumes have sufficient additional storage available, pruning is initiated to free up space for the particular network share. However, the pruning is limited to the contents of existing network-share-specific folders (i.e., does not cross over into cache storage occupied by another network share) and only data that has already been backed up to secondary storage may be pruned to free up space in this manner. This approach enables the network shares to operate mutually independently. Each network share operates under its own high-water marks and administrative criteria, i.e., each one operates under a distinct and independent object store.

An illustrative system supports multiple independently operating network shares, while taking advantage of shared storage opportunities in the volume group which is configured on a given file server. For example, any given storage volume may host share-specific folders for several respective network shares. Because each network-share-specific folder is managed under the umbrella of its own associated network share, these co-resident folders do not interact. For example, a first-network-share-specific folder on a first storage volume may grow or may be added in to provide the first network share with more cache storage, while on the same first storage volume another second-network-share-specific folder may be pruned to free up cache storage for the second network share; conversely, the second-network-share-specific folder may also grow or may be added in to provide the second network share with additional cache storage.

An illustrative share-specific object store is responsible for managing the expandable cache storage for each respective network share and is also responsible to conduct backup and restore operations to/from secondary storage for the data placed in cache. Illustratively, backups of cached data occur periodically, e.g., as directed by a storage manager, although the cached data remains in the network-share-specific cache until pruned therefrom. On read operations directed to a given network share, the share-specific object store first attempts to serve the read request from cached data in the expandable cache storage of the network share and if need be retrieves read-requested data from secondary storage. Thus, a file that is "read" from the network share may comprise portions (e.g., chunks) that are extracted from the share-specific cache as well as other portions restored from a secondary copy in secondary storage outside the file server (e.g., read from tape). These sources and/or procedures are not visible to the end user who requested to read the file, and instead the read is served transparently by the network-share-specific object store to the requesting client computing device. A backup interface module and a restore interface module in the object store collectively operate as a data agent in regard to backup and restore operations to/from secondary storage. An illustrative cache manager module, which is also network-share-specific, handles storage to and retrieval from network-share-specific cache storage in the file server—without regard to how other network-share-specific caches are managed by other respective cache managers. For example, the network-share-specific cache manager receives portions of a file to be written (e.g., uniquely identified chunks), determines which storage volume has a network-share-specific folder with sufficient space to accommodate the respective chunk, determines whether a previously unused volume should be configured with a network-share-specific folder in order to expand the cache storage for the given network share, and/or determines whether pruning of cached data is needed to free up space for storing the file portion(s)—and then stores the chunk to an appropriate network-share-specific folder in an appropriate storage volume, retaining the chunk-to-volume mapping for future reference. On read operations, the network-share-specific cache manager determines whether a certain requested chunk is stored in and can be served from the network-share-specific cache.

The illustrative object store architecture is, as noted above, specific to each network share configured on a file server and object stores operate autonomously and mutually independently of each other on the same file server. Each object store provides expandable cache storage for the associated network share, manages the cache storage, and also provides for backup to and restore from secondary storage in a manner that is not visible to the client computing device using the network share. From the perspective of the client computing device and its user, data that is stored to a certain network share is automatically backed up in an "infinite backup" scheme and also is speedily available when needed from the network share (extracted from cache). For any given share-specific object store, a so-called "glue layer" module provides interconnections among other object store components such as the cache manager, a backup interface module, a restore interface module, as well as non-object-store components such as a data protocol handler and an index server.

The present expandable cache approach overcomes an existing problem faced by data center operators, namely that some file systems do not support real-time expansion of an existing storage volume. Therefore, if a network share needs to grow, a maintenance take-down may be required. To expand the amount of storage space for such a file system would require a temporary shut down and reconfiguration while a larger volume is configured and/or installed on the file server, followed by restarting the file system. This naturally would cause applications that depend on the file system to also pause or suspend while the volume expansion is implemented. This kind of scenario is undesirable because it is disruptive and time-consuming, but also because it is noticeable to the user community. It is preferable expand storage flexibly and as needed in a manner that is independent of the particular type file system and not visible to users. The illustrative system described herein provides such a solution, by providing real-time expansion of local cache storage for any number of different network shares, each one operating under different storage and expansion constraints. By providing any-to-any share-to-volume cache storage according to the illustrative embodiment, more flexibility and expandability can be provided within a single file server. Not only can each network share operate and expand independently of other network shares on the same file server, but the solution is also independent of the type of file system(s) accessing the respective shares and is not visible to end users or to the client computing devices accessing the network shares.

BRIEF DESCRIPTION OF THE DRAWINGS

FIG. 1B is a detailed view of a primary storage device, a secondary storage device, and some examples of primary data and secondary copy data.

FIG. 3 is a block diagram illustrating an exemplary system for facilitating infinite backup operations across computing platforms, according to an illustrative embodiment.

FIG. 7A is a block diagram providing a logical network-share view from a user's perspective of an illustrative system 700 for dynamically managing cache storage for multiple network shares configured in a file server.

FIG. 7B is a block diagram of an illustrative implementation of network-share-specific cache and cache management in system 700 using object store and expandable cache storage architectures.

DETAILED DESCRIPTION

Figure 1A:
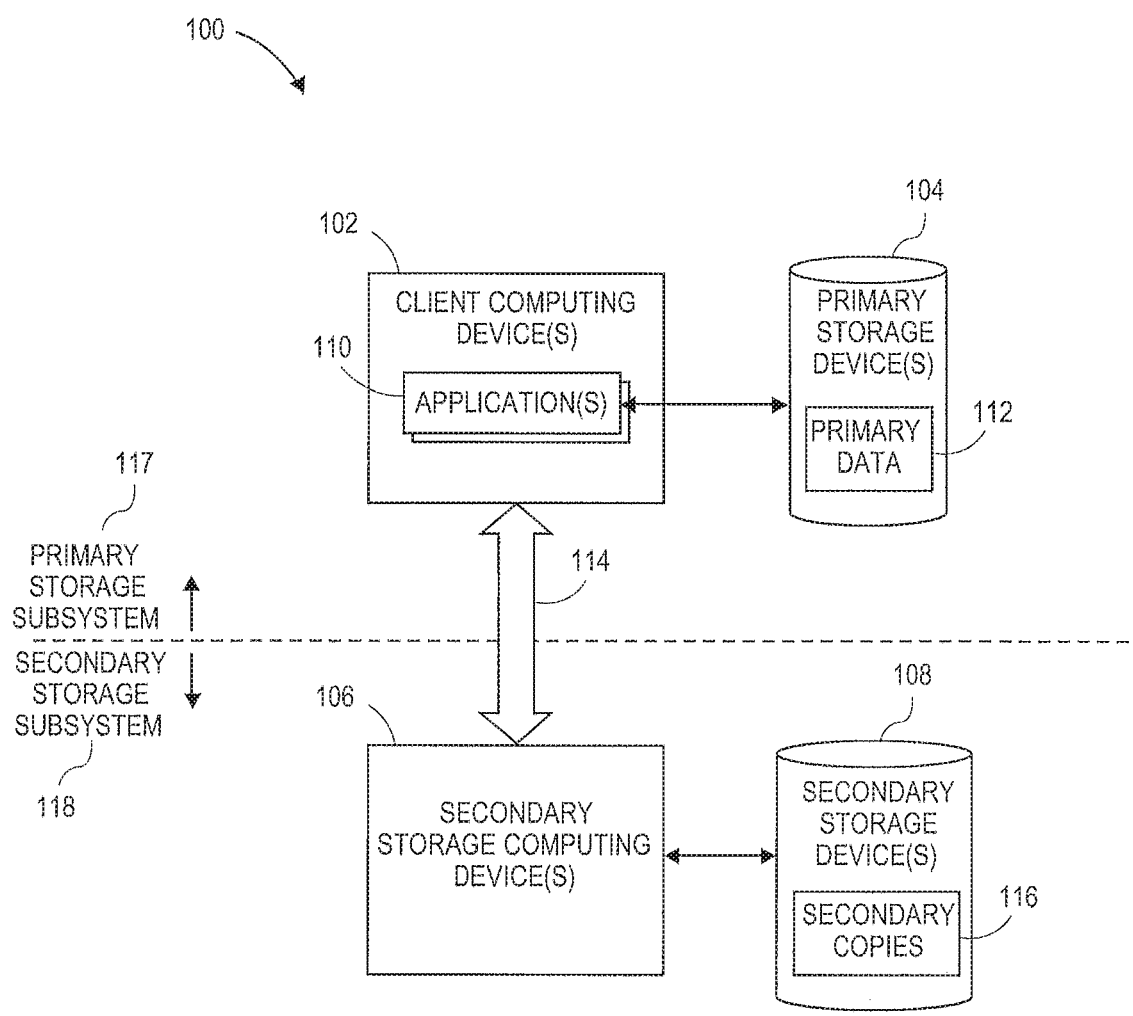
FIG. 1A is a block diagram illustrating an exemplary information management system.

An illustrative "expandable cache management" feature is described in further detail with reference to FIGS. 7A-14 and in sections "DYNAMIC MANAGEMENT OF EXPANDABLE CACHE STORAGE FOR MULTIPLE NETWORK SHARES CONFIGURED IN A FILE SERVER" and "Example Embodiments."

In regard to other previously disclosed technologies informally referred to as "infinite backup" (see, e.g., U.S. patent application Ser. No. 15/283,033, entitled "Data Protection Operations Based On Network Path Information" which is incorporated by reference in its entirety herein), systems and methods for performing improved data protection operations based on standard file system protocols are described in reference to FIGS. 3-6 and in the sections entitled "Overview of Infinite Backup Using Network File System (NFS) Protocol", "An Exemplary System for Implementing Improved Backup Process", "An Example Flow Diagram Illustrating Network Path Information Generation Process", "An Example Flow Diagram Illustrating Client Data Backup Process", and "An Illustrative Example of NFS Backup Operation". Components and functionality for performing improved data protection operations based on standard file system protocols may be configured and/or incorporated into information management systems such as those described herein in FIGS. 1 and 2. Some embodiments described herein can be implemented in a "3-way" information management system (e.g., illustrated in FIG. 1C) in which a data agent (e.g., running on a client computing device), a storage manager, and a media agent (e.g., running on a secondary storage computing device) communicate with each other to facilitate data protection operations associated with a client computing device. Some other embodiments described herein (e.g., systems and methods described with reference to FIGS. 3-6) may be implemented in a system having a different "two-way" architecture, in which the data agent resides in the secondary storage subsystem, such as where a storage manager communicates with a combined data/media agent. By moving specialized software associated with the information management system such as the data agent off the client computing devices, such an architecture effectively decouples the client computing devices from the installed components of the information management system, improving both scalability and plug-ability of the information management system. Indeed, the secondary storage subsystem in such environments can be treated simply as a read/write NFS target for the primary storage subsystem, without the need for information management software to be installed on the client computing device. As one example, an enterprise implementing a cloud production computing environment can add virtual machine (VM) client computing devices without installing and configuring specialized information management software on the newly added machines. Rather, backups and restores are achieved transparently, where the new VMs simply write to and read from the designated NFS path. An example of integrating with the cloud using file system protocols or so-called "infinite backup" using NFS share. An illustrative "infinite backup" feature allows improved data protection operations to be performed without being constrained by a fixed backup window or other storage/timing restrictions. For example, applications running on the client computing devices can be configured to simply copy client data over to shared network directories or folder instead of having to follow other more restrictive and cumbersome backup procedures.

Information Management System Overview

FIG. 1A shows an information management system 100 (or "system 100"), which generally includes combinations of hardware and software configured to protect and manage data and metadata that are generated and used by computing devices in system 100. System 100 may be referred to in some embodiments as a "storage management system" and the operations it performs may be referred to as "information management operations" or "storage operations" in some circumstances. The organization that employs system 100 may be a corporation or other business entity, non-profit organization, educational institution, household, governmental agency, or the like.

Generally, the systems and associated components described herein may be compatible with and/or provide some or all of the functionality of the systems and corresponding components described in one or more of the following U.S. patents and patent application publications assigned to Commvault Systems, Inc., each of which is hereby incorporated by reference in its entirety herein:

U.S. Pat. No. 7,035,880, entitled "Modular Backup and Retrieval System Used in Conjunction With a Storage Area Network";

U.S. Pat. No. 7,107,298, entitled "System And Method For Archiving Objects In An Information Store";

U.S. Pat. No. 7,246,207, entitled "System and Method for Dynamically Performing Storage Operations in a Computer Network";

U.S. Pat. No. 7,315,923, entitled "System And Method For Combining Data Streams In Pipelined Storage Operations In A Storage Network";

U.S. Pat. No. 7,343,453, entitled "Hierarchical Systems and Methods for Providing a Unified View of Storage Information";

U.S. Pat. No. 7,395,282, entitled "Hierarchical Backup and Retrieval System";

U.S. Pat. No. 7,529,782, entitled "System and Methods for Performing a Snapshot and for Restoring Data";

U.S. Pat. No. 7,617,262, entitled "System and Methods for Monitoring Application Data in a Data Replication System";

U.S. Pat. No. 7,734,669, entitled "Managing Copies Of Data";

U.S. Pat. No. 7,747,579, entitled "Metabase for Facilitating Data Classification";

U.S. Pat. No. 8,156,086, entitled "Systems And Methods For Stored Data Verification";

U.S. Pat. No. 8,170,995, entitled "Method and System for Offline Indexing of Content and Classifying Stored Data";

U.S. Pat. No. 8,230,195, entitled "System And Method For Performing Auxiliary Storage Operations";

U.S. Pat. No. 8,285,681, entitled "Data Object Store and Server for a Cloud Storage Environment, Including Data Deduplication and Data Management Across Multiple Cloud Storage Sites";

U.S. Pat. No. 8,307,177, entitled "Systems And Methods For Management Of Virtualization Data";

U.S. Pat. No. 8,364,652, entitled "Content-Aligned, Block-Based Deduplication";

U.S. Pat. No. 8,578,120, entitled "Block-Level Single Instancing";

U.S. Pat. No. 8,954,446, entitled "Client-Side Repository in a Networked Deduplicated Storage System";

U.S. Pat. No. 9,020,900, entitled "Distributed Deduplicated Storage System";

U.S. Pat. No. 9,098,495, entitled "Application-Aware and Remote Single Instance Data Management";

U.S. Pat. No. 9,239,687, entitled "Systems and Methods for Retaining and Using Data Block Signatures in Data Protection Operations";

U.S. Pat. Pub. No. 2006/0224846, entitled "System and Method to Support Single Instance Storage Operations";

U.S. Pat. Pub. No. 2014/0201170, entitled "High Availability Distributed Deduplicated Storage System";

U.S. patent application Ser. No. 14/721,971, entitled "Replication Using Deduplicated Secondary Copy Data";

U.S. patent application Ser. No. 15/283,033, entitled "Data Protection Operations Based On Network Path Information";

U.S. Patent Application No. 62/265,339 entitled "Live Synchronization and Management of Virtual Machines across Computing and Virtualization Platforms and Using Live Synchronization to Support Disaster Recovery"; and U.S. Patent Application No. 62/273,286 entitled "Redundant and Robust Distributed Deduplication Data Storage System";

U.S. Patent Application No. 62/294,920, entitled "Data Protection Operations Based on Network Path Information";

U.S. Patent Application No. 62/297,057, entitled "Data Restoration Operations Based on Network Path Information"; and U.S. Patent Application No. 62/387,384, entitled "Application-Level Live Synchronization Across Computing Platforms Including Synchronizing Co-Resident Applications To Disparate Standby Destinations And Selectively Synchronizing Some Applications And Not Others".

Information management system 100 can include a variety of computing devices and computing technologies. For instance, system 100 can include one or more client computing devices 102 and secondary storage computing devices 106, as well as storage manager 140 or a host computing device for it. Computing devices can include, without limitation, one or more: workstations, personal computers, desktop computers, or other types of generally fixed computing systems such as mainframe computers, servers, and minicomputers. Other computing devices can include mobile or portable computing devices, such as one or more laptops, tablet computers, personal data assistants, mobile phones (such as smartphones), and other mobile or portable computing devices such as embedded computers, set top boxes, vehicle-mounted devices, wearable computers, etc. Servers can include mail servers, file servers, database servers, and web servers. Computing devices may comprise one or more processors (e.g., CPU and/or single-core or multi-core processors), as well as non-transitory computer-readable memory (e.g., random-access memory (RAM)) for storing computer programs to be executed by the one or more processors. Other computer-readable memory for mass storage of data may be packaged/configured with the computing device (e.g., an internal hard disk) and/or may be external and accessible by the computing device (e.g., network-attached storage).

In some cases, a computing device includes cloud computing resources, which may be virtual machines. For instance, one or more virtual machines may be provided to the organization by a third-party cloud service vendor. In some embodiments, computing devices can include one or more virtual machine(s) running on a physical host computing device (or "host machine") operated by the organization. As one example, the organization may use one virtual machine as a database server and another virtual machine as a mail server, both virtual machines operating on the same host machine.

A virtual machine includes an operating system and associated virtual resources, and is hosted simultaneously with another operating system on a physical host computer (or host machine). A hypervisor (typically software, and also known in the art as a virtual machine monitor or a virtual machine manager or "VMM") sits between the virtual machine and the hardware of the physical host machine. Examples of hypervisors as virtualization software include ESX Server, by VMware, Inc. of Palo Alto, Calif.; Microsoft Virtual Server and Microsoft Windows Server Hyper-V, both by Microsoft Corporation of Redmond, Wash.; and Sun xVM by Oracle America Inc. of Santa Clara, Calif. In some embodiments, the hypervisor may be firmware or hardware or a combination of software and/or firmware and/or hardware. The hypervisor provides resources to each virtual operating system such as a virtual processor, virtual memory, a virtual network device, and a virtual disk. Each virtual machine has one or more virtual disks. The hypervisor typically stores the data of virtual disks in files on the file system of the physical host machine, called virtual machine disk files (in VMware lingo) or virtual hard disk image files (in Microsoft lingo). For example, VMware's ESX Server provides the Virtual Machine File System (VMFS) for the storage of virtual machine disk files. A virtual machine reads data from and writes data to its virtual disk much the way that a physical machine reads data from and writes data to a physical disk. Examples of techniques for implementing information management in a cloud computing environment are described in U.S. Pat. No. 8,285,681. Examples of techniques for implementing information management in a virtualized computing environment are described in U.S. Pat. No. 8,307,177.

Information management system 100 can also include a variety of electronic data storage devices, generally used for mass storage of data, including, e.g., primary storage devices 104 and secondary storage devices 108. Storage devices can generally be of any suitable type including, without limitation, disk drives, storage arrays (e.g., storage-area network (SAN) and/or network-attached storage (NAS) technology), semiconductor memory (e.g., solid state storage devices), network attached storage (NAS) devices, tape libraries or other magnetic, non-tape storage devices, optical media storage devices, DNA/RNA-based memory technology, combinations of the same, etc. In some embodiments, storage devices can form part of a distributed file system. In some cases, storage devices are provided in a cloud storage environment (e.g., a private cloud or one operated by a third-party vendor), whether for primary data or secondary copies or both.

Figure 1C:
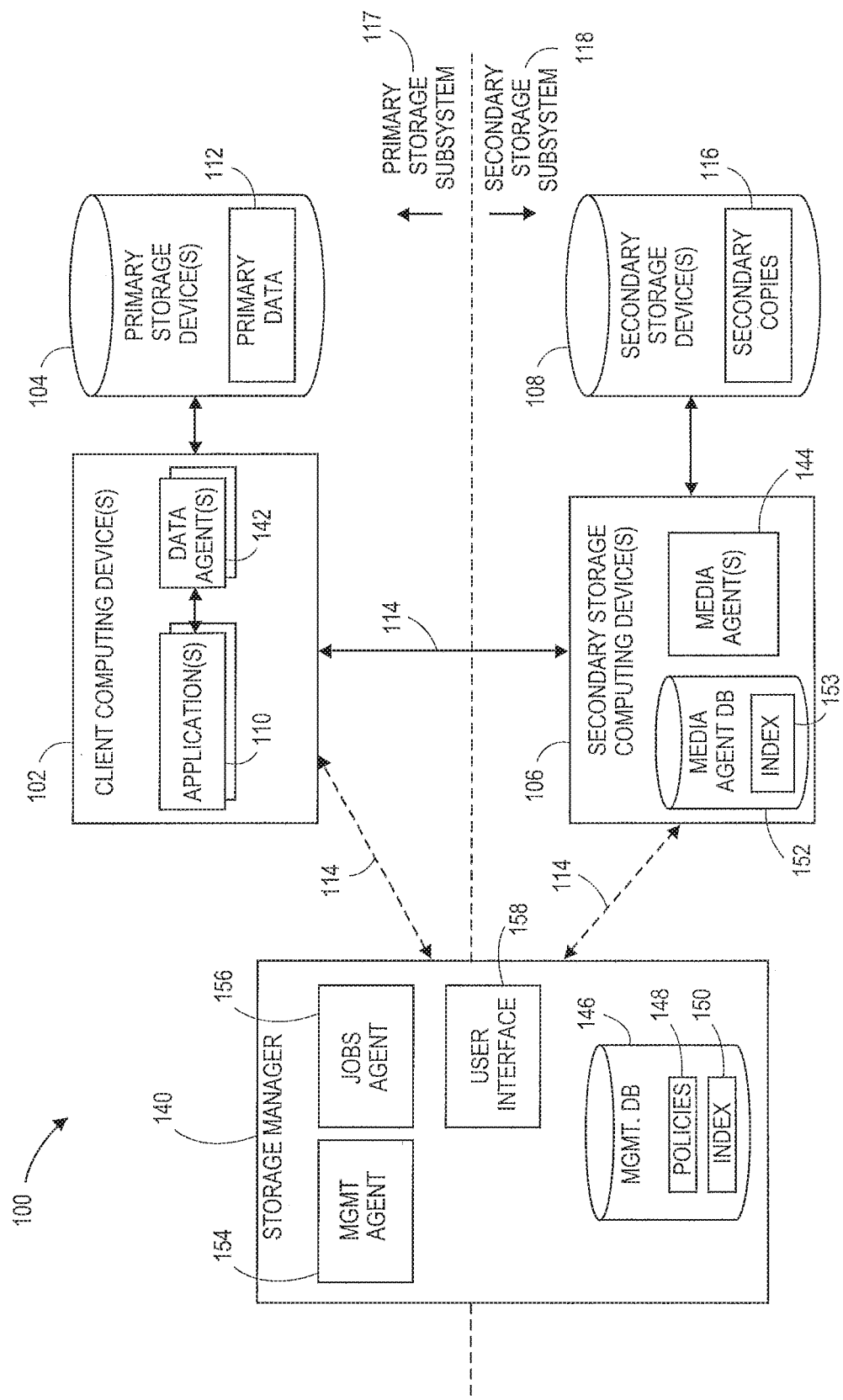
FIG. 1C is a block diagram of an exemplary information management system including a storage manager, one or more data agents, and one or more media agents.

Depending on context, the term "information management system" can refer to generally all of the illustrated hardware and software components in FIG. 1C, or the term may refer to only a subset of the illustrated components. For instance, in some cases, system 100 generally refers to a combination of specialized components used to protect, move, manage, manipulate, analyze, and/or process data and metadata generated by client computing devices 102. However, system 100 in some cases does not include the underlying components that generate and/or store primary data 112, such as the client computing devices 102 themselves, and the primary storage devices 104. Likewise secondary storage devices 108 (e.g., a third-party provided cloud storage environment) may not be part of system 100. As an example, "information management system" may sometimes refer to one or more of the following components, which will be described in further detail below: storage manager, data agent, and media agent.

Information management system 100 includes one or more client computing devices 102 having an operating system and at least one application 110 executing thereon; and one or more primary storage devices 104 storing primary data 112. Client computing device(s) 102 and primary storage devices 104 may generally be referred to in some cases as primary storage subsystem 117.

Client Computing Devices, Clients, and Subclients

Typically, a variety of sources in an organization produce data to be protected and managed. As just one illustrative example, in a corporate environment such data sources can be employee workstations and company servers such as a mail server, a web server, a database server, a transaction server, or the like. In system 100, data generation sources include one or more client computing devices 102. A computing device that has a data agent 142 installed and operating on it is generally referred to as a "client computing device" 102, and may include any type of computing device, without limitation. A client computing device 102 may be associated with one or more users and/or user accounts.

A "client" is a logical component of information management system 100, which may represent a logical grouping of one or more data agents installed on a client computing device 102. Storage manager 140 recognizes a client as a component of system 100, and in some embodiments, may automatically create a client component the first time a data agent 142 is installed on a client computing device 102. Because data generated by executable component(s) 110 is tracked by the associated data agent 142 so that it may be properly protected in system 100, a client may be said to generate data and to store the generated data to primary storage, such as primary storage device 104. However, the terms "client" and "client computing device" as used herein do not imply that a client computing device 102 is necessarily configured in the client/server sense relative to another computing device such as a mail server, or that a client computing device 102 cannot be a server in its own right. As just a few examples, a client computing device 102 can be and/or include mail servers, file servers, database servers, and web servers.

Each client computing device 102 may have application(s) 110 executing thereon which generate and manipulate the data that is to be protected from loss and managed in system 100. Applications 110 generally facilitate the operations of an organization, and can include, without limitation, mail server applications (e.g., Microsoft Exchange Server), file server applications, mail client applications (e.g., Microsoft Exchange Client), database applications or database management systems (e.g., SQL, Oracle, SAP, Lotus Notes Database), word processing applications (e.g., Microsoft Word), spreadsheet applications, financial applications, presentation applications, graphics and/or video applications, browser applications, mobile applications, entertainment applications, and so on. Each application 110 may be accompanied by an application-specific data agent 142. A file system, e.g., Microsoft Windows Explorer, may be considered an application 110 and may be accompanied by its own data agent 142. Client computing devices 102 can have at least one operating system (e.g., Microsoft Windows, Mac OS X, iOS, IBM z/OS, Linux, other Unix-based operating systems, etc.) installed thereon, which may support or host one or more file systems and other applications 110. In some embodiments, a virtual machine that executes on a host client computing device 102 may be considered an application 110 and may be accompanied by a specific data agent 142 (e.g., virtual server data agent).

Client computing devices 102 and other components in system 100 can be connected to one another via one or more electronic communication pathways 114. For example, a first communication pathway 114 may communicatively couple client computing device 102 and secondary storage computing device 106; a second communication pathway 114 may communicatively couple storage manager 140 and client computing device 102; and a third communication pathway 114 may communicatively couple storage manager 140 and secondary storage computing device 106, etc. (see, e.g., FIG. 1A and FIG. 1C). A communication pathway 114 can include one or more networks or other connection types including one or more of the following, without limitation: the Internet, a wide area network (WAN), a local area network (LAN), a Storage Area Network (SAN), a Fibre Channel (FC) connection, a Small Computer System Interface (SCSI) connection, a virtual private network (VPN), a token ring or TCP/IP based network, an intranet network, a point-to-point link, a cellular network, a wireless data transmission system, a two-way cable system, an interactive kiosk network, a satellite network, a broadband network, a baseband network, a neural network, a mesh network, an ad hoc network, other appropriate computer or telecommunications networks, combinations of the same or the like. Communication pathways 114 in some cases may also include application programming interfaces (APIs) including, e.g., cloud service provider APIs, virtual machine management APIs, and hosted service provider APIs. The underlying infrastructure of communication pathways 114 may be wired and/or wireless, analog and/or digital, or any combination thereof; and the facilities used may be private, public, third-party provided, or any combination thereof, without limitation.

A "subclient" is a logical grouping of all or part of a client's primary data 112. In general a subclient may be defined according to how the subclient data is to be protected as a unit in system 100. For example, a subclient may be associated with a certain storage policy. A given client may thus comprise several subclients, each subclient associated with a different storage policy. For example, some files may form a first subclient that requires compression and deduplication and is associated with a first storage policy. Other files of the client may form a second subclient that requires a different retention schedule as well as encryption, and may be associated with a different, second storage policy. As a result, though the primary data may be generated by the same application 110, and may belong to one given client, portions of the data may be assigned to different subclients for distinct treatment by the information management system. More detail on subclients is given in regard to storage policies below.

Primary Data and Exemplary Primary Storage Devices

Primary data 112 is generally production data or other "live" data generated by the operating system and/or applications 110 executing on client computing device 102. Primary data 112 is generally stored on primary storage device(s) 104 and is organized via a file system operating on the client computing device 102. Thus, client computing device(s) 102 and corresponding applications 110 may create, access, modify, write, delete, and otherwise use primary data 112. Primary data 112 is generally in the native format of the source application 110. According to certain aspects, primary data 112 is an initial or first stored body of data generated by the source application 110. Primary data 112 in some cases is created substantially directly from data generated by the corresponding source application 110.

Primary storage devices 104 storing primary data 112 may be relatively fast and/or expensive technology (e.g., a disk drive, a hard-disk storage array, solid state memory, etc.), typically because they must support high-performance live production environments. Primary data 112 may be highly changeable and/or may be intended for relatively short term retention (e.g., hours, days, or weeks). According to some embodiments, client computing device 102 can access primary data 112 stored in primary storage device 104 by making conventional file system calls via the operating system. Primary data 112 may include structured data (e.g., database files), unstructured data (e.g., documents), and/or semi-structured data. See, e.g., FIG. 1B.

It can be useful in performing certain tasks to organize primary data 112 into units of different granularities. In general, primary data 112 can include files, directories, file system volumes, data blocks, extents, or any other hierarchies or organizations of data objects. As used herein, a "data object" can refer to (i) any file that is currently addressable by a file system or that was previously addressable by the file system (e.g., an archive file), and (ii) a subset of such a file (e.g., a data block, an extent, etc.).

It can also be useful in performing certain functions of system 100 to access and modify metadata within primary data 112. Metadata generally includes information about data objects and/or characteristics associated with the data objects. For simplicity herein, it is to be understood that, unless expressly stated otherwise, any reference to primary data 112 generally also includes its associated metadata, but references to metadata generally do not include the primary data. Metadata can include, without limitation, one or more of the following: the data owner (e.g., the client or user that generates the data), the last modified time (e.g., the time of the most recent modification of the data object), a data object name (e.g., a file name), a data object size (e.g., a number of bytes of data), information about the content (e.g., an indication as to the existence of a particular search term), user-supplied tags, to/from information for email (e.g., an email sender, recipient, etc.), creation date, file type (e.g., format or application type), last accessed time, application type (e.g., type of application that generated the data object), location/network (e.g., a current, past or future location of the data object and network pathways to/from the data object), geographic location (e.g., GPS coordinates), frequency of change (e.g., a period in which the data object is modified), business unit (e.g., a group or department that generates, manages or is otherwise associated with the data object), aging information (e.g., a schedule, such as a time period, in which the data object is migrated to secondary or long term storage), boot sectors, partition layouts, file location within a file folder directory structure, user permissions, owners, groups, access control lists (ACLs), system metadata (e.g., registry information), combinations of the same or other similar information related to the data object. In addition to metadata generated by or related to file systems and operating systems, some applications 110 and/or other components of system 100 maintain indices of metadata for data objects, e.g., metadata associated with individual email messages. The use of metadata to perform classification and other functions is described in greater detail below.

Each client computing device 102 is generally associated with and/or in communication with one or more primary storage devices 104 storing corresponding primary data 112. A client computing device 102 may be considered to be associated with or in communication with a primary storage device 104 if it is capable of one or more of: routing and/or storing data (e.g., primary data 112) to the particular primary storage device 104, coordinating the routing and/or storing of data to the particular primary storage device 104, retrieving data from the particular primary storage device 104, coordinating the retrieval of data from the particular primary storage device 104, and modifying and/or deleting data in the particular primary storage device 104. A client computing device 102 may be said to access data stored in an associated storage device 104.

Primary storage device 104 may be dedicated or shared. In some cases, each primary storage device 104 is dedicated to an associated client computing device 102, e.g., a local disk drive. In other cases, one or more primary storage devices 104 can be shared by multiple client computing devices 102, e.g., via a local network, in a cloud storage implementation, etc. As one example, primary storage device 104 can be a storage array shared by a group of client computing devices 102, such as EMC Clariion, EMC Symmetrix, EMC Celerra, Dell EqualLogic, IBM XIV, NetApp FAS, HP EVA, and HP 3PAR.

Information management system 100 may also include hosted services (not shown), which may be hosted in some cases by an entity other than the organization that employs the other components of system 100. For instance, the hosted services may be provided by online service providers. Such service providers can provide social networking services, hosted email services, or hosted productivity applications or other hosted applications such as software-as-a-service (SaaS), platform-as-a-service (PaaS), application service providers (ASPs), cloud services, or other mechanisms for delivering functionality via a network. As it services users, each hosted service may generate additional data and metadata, which may be managed by system 100, e.g., as primary data 112. In some cases, the hosted services may be accessed using one of the applications 110. As an example, a hosted mail service may be accessed via browser running on a client computing device 102.

Secondary Copies and Exemplary Secondary Storage Devices

Primary data 112 stored on primary storage devices 104 may be compromised in some cases, such as when an employee deliberately or accidentally deletes or overwrites primary data 112. Or primary storage devices 104 can be damaged, lost, or otherwise corrupted. For recovery and/or regulatory compliance purposes, it is therefore useful to generate and maintain copies of primary data 112. Accordingly, system 100 includes one or more secondary storage computing devices 106 and one or more secondary storage devices 108 configured to create and store one or more secondary copies 116 of primary data 112 including its associated metadata. The secondary storage computing devices 106 and the secondary storage devices 108 may be referred to as secondary storage subsystem 118.

Creation of secondary copies 116 can help in search and analysis efforts and meet other information management goals as well, such as: restoring data and/or metadata if an original version is lost (e.g., by deletion, corruption, or disaster); allowing point-in-time recovery; complying with regulatory data retention and electronic discovery (e-discovery) requirements; reducing utilized storage capacity in the production system and/or in secondary storage; facilitating organization and search of data; improving user access to data files across multiple computing devices and/or hosted services; and implementing data retention policies.

A secondary copy 116 can comprise a separate stored copy of data that is derived from one or more earlier-created stored copies (e.g., derived from primary data 112 or from another secondary copy 116). Secondary copies 116 can include point-in-time data, and may be intended for relatively long-term retention, before some or all of the data is moved to other storage or discarded. In some cases, a secondary copy 116 may be in a different storage device than other previously stored copies; and/or may be remote from other previously stored copies. Secondary copies 116 can be stored in the same storage device as primary data 112. For example, a disk array capable of performing hardware snapshots stores primary data 112 and creates and stores hardware snapshots of the primary data 112 as secondary copies 116. Secondary copies 116 may be stored in relatively slow and/or lower cost storage (e.g., magnetic tape). A secondary copy 116 may be stored in a backup or archive format, or in some other format different from the native source application format or other format of primary data 112.

Secondary storage computing devices 106 may index secondary copies 116 (e.g., using a media agent 144), so that users can browse and restore at a later time. After creation of a secondary copy 116 representative of certain primary data 112, a pointer or other location indicia (e.g., a stub) may be placed in primary data 112, or be otherwise associated with primary data 112, to indicate the current location on secondary storage device(s) 108 of a particular secondary copy 116.

Since an instance of a data object or metadata in primary data 112 may change over time as it is modified by application 110 (or hosted service or the operating system), system 100 may create and manage multiple secondary copies 116 of a particular data object or metadata, each copy representing the state of the data object in primary data 112 at a particular point in time. Moreover, since an instance of a data object in primary data 112 may eventually be deleted from primary storage device 104 and the file system, system 100 may continue to manage point-in-time representations of that data object, even though the instance in primary data 112 no longer exists.

For virtual machines, the operating system and other applications 110 of client computing device(s) 102 may execute within or under the management of virtualization software (e.g., a VMM), and the primary storage device(s) 104 may comprise a virtual disk created on a physical storage device. System 100 may create secondary copies 116 of the files or other data objects in a virtual disk file and/or secondary copies 116 of the entire virtual disk file itself (e.g., of an entire .vmdk file).

Secondary copies 116 may be distinguished from corresponding primary data 112. First, secondary copies 116 can be stored in a different format (e.g., backup, archive, or other non-native format) than primary data 112. For this or other reasons, secondary copies 116 may not be directly useable by applications 110 or client computing device 102 (e.g., via standard system calls or otherwise) without modification, processing, or other intervention by system 100 which may be referred to as "restore" operations. Secondary copies 116 may have been processed by data agent 142 and/or media agent 144 in the course of being created (e.g., compression, deduplication, encryption, integrity markers, indexing, formatting, etc.), and thus secondary copy 116 may represent source primary data 112 without necessarily being exactly identical to the source.

Second, secondary copies 116 may be stored on a secondary storage device 108 that is inaccessible to application 110 running on client computing device 102 and/or hosted service. Some secondary copies 116 may be "offline copies," in that they are not readily available (e.g., not mounted to tape or disk). Offline copies can include copies of data that system 100 can access without human intervention (e.g., tapes within an automated tape library, but not yet mounted in a drive), and copies that the system 100 can access only with some human intervention (e.g., tapes located at an offsite storage site).

Using Intermediate Devices for Creating Secondary Copies—Secondary Storage Computing Devices Creating secondary copies can be challenging. For instance, hundreds or thousands of client computing devices 102 may be continually generating large volumes of primary data 112 to be protected. Also, there can be significant overhead involved in the creation of secondary copies 116. Moreover, secondary storage devices 108 may be special-purpose components, and devices that write to, read from, or otherwise interact with secondary storage devices 108, such as secondary storage computing devices 106 and corresponding media agents 144, may require specialized programmed intelligence and/or hardware capability. Client computing devices 102 may interact directly with a secondary storage device 108 to create secondary copies 116; however, in view of the factors described above, this approach can negatively impact the ability of client computing device 102 to serve/service application 110 and produce primary data 112. Further, any given client computing device 102 may not be optimized for interaction with certain secondary storage devices 108.

Thus, information management system 100 may include one or more software and/or hardware components which generally act as intermediaries between client computing devices 102 (that generate primary data 112) and secondary storage devices 108 (that store secondary copies 116). In addition to off-loading certain responsibilities from client computing devices 102, these intermediate components can provide other benefits. For instance, as discussed further below with respect to FIG. 1D, distributing some of the work involved in creating secondary copies 116 can enhance scalability and improve system performance. For instance, using specialized secondary storage computing devices 106 and media agents 144 for interfacing with secondary storage devices 108 and/or for performing certain data processing operations can greatly improve the speed with which system 100 performs information management operations and can also improve the capacity of the system to handle large numbers of such operations, while reducing the computational load on the production environment of client computing devices 102. The intermediate components can include one or more secondary storage computing devices 106 as shown in FIG. 1A and/or one or more media agents 144. Media agents are discussed further below (e.g., with respect to FIGS. 1C-1E).

Secondary storage computing device(s) 106 can comprise any of the computing devices described above, without limitation. In some cases, secondary storage computing device(s) 106 also include specialized hardware and/or software componentry for interacting with certain secondary storage device(s) 108 with which they may be specially associated.

To create a secondary copy 116 involving the copying of data from primary storage subsystem 117 to secondary storage subsystem 118, client computing device 102 may communicate the primary data 112 to be copied (or a processed version thereof) to the designated secondary storage computing device 106, via a communication pathway 114. Secondary storage computing device 106 in turn may perform further processing and may convey the data (or a processed version thereof) to secondary storage device 108. One or more secondary copies 116 may be created from existing secondary copies 116, such as in the case of an auxiliary copy operation, described further below.

Exemplary Primary Data and an Exemplary Secondary Copy

FIG. 1B is a detailed view showing some specific examples of primary data stored on primary storage device(s) 104 and secondary copy data stored on secondary storage device(s) 108, with other components of the system removed for the purposes of illustration. Stored on the primary storage device(s) 104 are primary data 112 objects including word processing documents 119A-B, spreadsheets 120, presentation documents 122, video files 124, image files 126, email mailboxes 128 (and corresponding email messages 129A-C), html/xml or other types of markup language files 130, databases 132 and corresponding tables or other data structures 133A-133C). Some or all primary data 112 objects are associated with corresponding metadata (e.g., "Meta1-11"), which may include file system metadata and/or application-specific metadata. Stored on the secondary storage device(s) 108 are secondary copy 116 data objects 134A-C which may include copies of or may otherwise represent corresponding primary data 112.

Secondary copy data objects 134A-C can individually represent more than one primary data object. For example, secondary copy data object 134A represents three separate primary data objects 133C, 122, and 129C (represented as 133C', 122', and 129C', respectively, and accompanied by corresponding metadata Meta11, Meta3, and Meta8, respectively). Moreover, as indicated by the prime mark ('), secondary storage computing devices 106 or other components in secondary storage subsystem 118 may process the data received from primary storage subsystem 117 and store a secondary copy including a transformed and/or supplemented representation of a primary data object and/or metadata that is different from the original format, e.g., in a compressed, encrypted, deduplicated, or other modified format. For instance, secondary storage computing devices 106 can generate new metadata or other information based on said processing, and store the newly generated information along with the secondary copies. Secondary copy data object 1346 represents primary data objects 120, 133B, and 119A as 120', 133B', and 119A', respectively, accompanied by corresponding metadata Meta2, Meta10, and Meta1, respectively. Also, secondary copy data object 134C represents primary data objects 133A, 119B, and 129A as 133A', 119B', and 129A', respectively, accompanied by corresponding metadata Meta9, Meta5, and Meta6, respectively.

Exemplary Information Management System Architecture

Information management system 100 can incorporate a variety of different hardware and software components, which can in turn be organized with respect to one another in many different configurations, depending on the embodiment. There are critical design choices involved in specifying the functional responsibilities of the components and the role of each component in system 100. Such design choices can impact performance as well as the adaptability of system 100 to data growth and other changing circumstances.

FIG. 1C shows an information management system 100 designed according to these considerations and which includes: storage manager 140, one or more data agents 142 executing on client computing device(s) 102 and configured to process primary data 112, and one or more media agents 144 executing on the one or more secondary storage computing devices 106 for performing tasks involving the secondary storage devices 108.

Storage Manager

Storage manager 140 is a centralized storage and/or information manager that is configured to perform certain control functions and also to store certain critical information about system 100. As noted, the number of components in system 100 and the amount of data under management can be large. Managing the components and data is therefore a significant task, which can grow unpredictably as the number of components and data scale to meet the needs of the organization. For these and other reasons, according to certain embodiments, responsibility for controlling system 100, or at least a significant portion of that responsibility, is allocated to storage manager 140. Storage manager 140 can be adapted independently according to changing circumstances, without having to replace or re-design the remainder of the system. Moreover, a computing device for hosting and/or operating as storage manager 140 can be selected to best suit the functions and networking needs of storage manager 140. These and other advantages are described in further detail below and with respect to FIG. 1D.

Storage manager 140 may be a software module or other application, which, in some embodiments operates in conjunction with one or more associated data structures such as a dedicated database (e.g., management database 146). In some embodiments, storage manager 140 is itself a computing device that performs the functions described herein. The storage manager generally initiates, performs, coordinates and/or controls storage and other information management operations performed by the system 100, e.g., to protect and control primary data 112 and secondary copies 116. In general, storage manager 100 may be said to manage information management system 100, which includes managing constituent components such as data agents and media agents, etc.

As shown by the dashed arrowed lines 114 in FIG. 1C, storage manager 140 may communicate with and/or control some or all elements of the information management system 100, such as data agents 142 and media agents 144. In this manner, storage manager 140 may control the operation of various hardware and software components in system 100. In certain embodiments, control information originates from storage manager 140 and status as well as index reporting is transmitted to storage manager 140 by the managed components, whereas payload data and metadata are generally communicated between data agents 142 and media agents 144 (or otherwise between client computing device(s) 102 and secondary storage computing device(s) 106), e.g., at the direction of and under the management of storage manager 140. Control information can generally include parameters and instructions for carrying out information management operations, such as, without limitation, instructions to perform a task associated with an operation, timing information specifying when to initiate a task, data path information specifying what components to communicate with or access in carrying out an operation, and the like. In other embodiments, some information management operations are controlled or initiated by other components of system 100 (e.g., by media agents 144 or data agents 142), instead of or in combination with storage manager 140.

According to certain embodiments, storage manager 140 provides one or more of the following functions:

- communicating with data agents 142 and media agents 144, including transmitting instructions, messages, and/or queries, as well as receiving status reports, index information, messages, and/or queries, and responding to same;
- initiating execution of information management operations;
- initiating restore and recovery operations;
- managing secondary storage devices 108 and inventory/capacity of the same;
- allocating secondary storage devices 108 for secondary copy operations;
- reporting, searching, and/or classification of data in system 100;
- monitoring completion of and status reporting related to information management operations and jobs;
- tracking movement of data within system 100;
- tracking age information relating to secondary copies 116, secondary storage devices 108, comparing the age information against retention guidelines, and initiating data pruning when appropriate;
- tracking logical associations between components in system 100;
- protecting metadata associated with system 100, e.g., in management database 146;
- implementing job management, schedule management, event management, alert management, reporting, job history maintenance, user security management, disaster recovery management, and/or user interfacing for system administrators and/or end users of system 100;
- sending, searching, and/or viewing of log files; and
- implementing operations management functionality.

Storage manager 140 may maintain an associated database 146 (or "storage manager database 146" or "management database 146") of management-related data and information management policies 148. Database 146 can be stored in computer memory accessible by storage manager 140. Database 146 may include a management index 150 (or "index 150") or other data structure(s) that may store: logical associations between components of the system; user preferences and/or profiles (e.g., preferences regarding encryption, compression, or deduplication of primary data or secondary copies; preferences regarding the scheduling, type, or other aspects of secondary copy or other operations; mappings of particular information management users or user accounts to certain computing devices or other components, etc.; management tasks; media containerization; or other useful data. For example, storage manager 140 may use index 150 to track logical associations between media agents 144 and secondary storage devices 108 and/or movement of data from primary storage devices 104 to secondary storage devices 108. For instance, index 150 may store data associating a client computing device 102 with a particular media agent 144 and/or secondary storage device 108, as specified in an information management policy 148.

Administrators and others may configure and initiate certain information management operations on an individual basis. But while this may be acceptable for some recovery operations or other infrequent tasks, it is often not workable for implementing on-going organization-wide data protection and management. Thus, system 100 may utilize information management policies 148 for specifying and executing information management operations on an automated basis. Generally, an information management policy 148 can include a stored data structure or other information source that specifies parameters (e.g., criteria and rules) associated with storage management or other information management operations. Storage manager 140 can process an information management policy 148 and/or index 150 and, based on the results, identify an information management operation to perform, identify the appropriate components in system 100 to be involved in the operation (e.g., client computing devices 102 and corresponding data agents 142, secondary storage computing devices 106 and corresponding media agents 144, etc.), establish connections to those components and/or between those components, and/or instruct and control those components to carry out the operation. In this manner, system 100 can translate stored information into coordinated activity among the various computing devices in system 100.

Management database 146 may maintain information management policies 148 and associated data, although information management policies 148 can be stored in computer memory at any appropriate location outside management database 146. For instance, an information management policy 148 such as a storage policy may be stored as metadata in a media agent database 152 or in a secondary storage device 108 (e.g., as an archive copy) for use in restore or other information management operations, depending on the embodiment. Information management policies 148 are described further below. According to certain embodiments, management database 146 comprises a relational database (e.g., an SQL database) for tracking metadata, such as metadata associated with secondary copy operations (e.g., what client computing devices 102 and corresponding subclient data were protected and where the secondary copies are stored and which media agent 144 performed the secondary storage). This and other metadata may additionally be stored in other locations, such as at secondary storage computing device 106 or on the secondary storage device 108, allowing data recovery without the use of storage manager 140 in some cases. Thus, management database 146 may comprise data needed to kick off secondary copy operations (e.g., storage policies), status and reporting information about completed jobs (e.g., status on yesterday's backup jobs), and additional information sufficient to enable restore and disaster recovery operations (e.g., media agent associations, location indexing, content indexing, etc.)

Storage manager 140 may include a jobs agent 156, a user interface 158, and a management agent 154, all of which may be implemented as interconnected software modules or application programs. These are described further below.

Jobs agent 156 in some embodiments initiates, controls, and/or monitors the status of some or all information management operations previously performed, currently being performed, or scheduled to be performed by system 100. A job may be a logical grouping of information management operations such as generating backup copies of a primary data 112 subclient at a certain time every day. Thus, jobs agent 156 may access information management policies 148 (e.g., in management database 146) to determine when and how to initiate/control jobs in system 100.

Storage Manager User Interfaces

User interface 158 may include information processing and display software, such as a graphical user interface (GUI), an application program interface (API), and/or other interactive interface(s) through which users and system processes can retrieve information about the status of information management operations or issue instructions to system 100 and/or its constituent components. Via user interface 158, users may issue instructions to the components in system 100 regarding performance of secondary copy and recovery operations. For example, a user may modify a schedule concerning the number of pending secondary copy operations. As another example, a user may employ the GUI to view the status of pending secondary copy jobs or to monitor the status of certain components in system 100 (e.g., the amount of capacity left in a storage device). Storage manager 140 may track information that permits it to select, designate, or otherwise identify content indices, deduplication databases, or similar databases or resources or data sets within its information management cell (or another cell) to be searched in response to certain queries. Such queries may be entered by the user by interacting with user interface 158.

Various embodiments of information management system 100 may be configured and/or designed to generate user interface data useable for rendering the various interactive user interfaces described. The user interface data may be used by system 100 and/or by another system, device, and/or software program (for example, a browser program), to render the interactive user interfaces. The interactive user interfaces may be displayed on, for example, electronic displays (including, for example, touch-enabled displays), consoles, etc., whether direct-connected to storage manager 140 or communicatively coupled remotely, e.g., via an internet connection. The present disclosure describes various embodiments of interactive and dynamic user interfaces, some of which may be generated by user interface agent 158, and which are the result of significant technological development. The user interfaces described herein may provide improved human-computer interactions, allowing for significant cognitive and ergonomic efficiencies and advantages over previous systems, including reduced mental workloads, improved decision-making, and the like. User interface 158 may operate in a single integrated view or console (not shown). The console may support a reporting capability for generating a variety of reports, which may be tailored to a particular aspect of information management.

User interfaces are not exclusive to storage manager 140 and in some embodiments a user may access information locally from a computing device component of system 100. For example, some information pertaining to installed data agents 142 and associated data streams may be available from client computing device 102. Likewise, some information pertaining to media agents 144 and associated data streams may be available from secondary storage computing device 106.

Storage Manager Management Agent

Management agent 154 can provide storage manager 140 with the ability to communicate with other components within information management system 100 and/or with other information management cells via network protocols and application programming interfaces (APIs) including, e.g., HTTP, HTTPS, FTP, REST, virtualization software APIs, cloud service provider APIs, and hosted service provider APIs.

Management agent 154 also allows multiple information management cells to communicate with one another. For example, system 100 in some cases may be one information management cell in a network of multiple cells adjacent to one another or otherwise logically related, e.g., in a WAN or LAN. With this arrangement, the cells may communicate with one another through respective management agents 154. Inter-cell communication and hierarchy is described in greater detail in e.g., U.S. Pat. No. 7,343,453.

Information Management Cell

An "information management cell" (or "storage operation cell" or "cell") may generally include a logical and/or physical grouping of a combination of hardware and software components associated with performing information management operations on electronic data, typically one storage manager 140 and at least one data agent 142 (executing on a client computing device 102) and at least one media agent 144 (executing on a secondary storage computing device 106). For instance, the components shown in FIG. 1C may together form an information management cell. Thus, in some configurations, a system 100 may be referred to as an information management cell. A given cell may be identified by the identity of its storage manager 140, which is generally responsible for managing the cell.

Multiple cells may be organized hierarchically, so that cells may inherit properties from hierarchically superior cells or be controlled by other cells in the hierarchy (automatically or otherwise). Alternatively, in some embodiments, cells may inherit or otherwise be associated with information management policies, preferences, information management operational parameters, or other properties or characteristics according to their relative position in a hierarchy of cells. Cells may also be organized hierarchically according to function, geography, architectural considerations, or other factors useful or desirable in performing information management operations. For example, a first cell may represent a geographic segment of an enterprise, such as a Chicago office, and a second cell may represent a different geographic segment, such as a New York City office. Other cells may represent departments within a particular office, e.g., human resources, finance, engineering, etc. Where delineated by function, a first cell may perform one or more first types of information management operations (e.g., one or more first types of secondary copies at a certain frequency), and a second cell may perform one or more second types of information management operations (e.g., one or more second types of secondary copies at a different frequency and under different retention rules). In general, the hierarchical information is maintained by one or more storage managers 140 that manage the respective cells (e.g., in corresponding management database(s) 146).

Data Agents

A variety of different applications 110 can operate on a given client computing device 102, including operating systems, file systems, database applications, e-mail applications, and virtual machines, just to name a few. And, as part of the process of creating and restoring secondary copies 116, the client computing device 102 may be tasked with processing and preparing the primary data 112 generated by these various applications 110. Moreover, the nature of the processing/preparation can differ across application types, e.g., due to inherent structural, state, and formatting differences among applications 110 and/or the operating system of client computing device 102. Each data agent 142 is therefore advantageously configured in some embodiments to assist in the performance of information management operations based on the type of data that is being protected at a client-specific and/or application-specific level.

Data agent 142 is a component of information system 100 and is generally directed by storage manager 140 in creating or restoring secondary copies 116. Data agent 142 may be a software program (e.g., a set of executable binary files) that executes on the same client computing device 102 as the associated application 110 that data agent 142 is configured to protect. Data agent 142 is generally responsible for managing, initiating, or otherwise assisting in the performance of information management operations in reference to its associated application(s) 110 and corresponding primary data 112 which is generated/accessed by the particular application(s). For instance, data agent 142 may take part in copying, archiving, migrating, and/or replicating of primary data 112 stored in the primary storage device(s) 104. Data agent 142 may receive control information from storage manager 140, such as commands to transfer copies of data objects and/or metadata to one or more media agents 144. Data agent 142 also may compress, deduplicate, and encrypt primary data 112 before transmitting it to media agent 144. Data agent 142 also may receive instructions from storage manager 140 to restore (or assist in restoring) a secondary copy 116 from secondary storage device 108 to primary storage 104, such that the restored data may be accessed by application 110.

Each data agent 142 may be specialized for a particular application 110. For instance, different individual data agents 142 may be designed to handle Microsoft Exchange data, Lotus Notes data, Microsoft Windows file system data, Microsoft Active Directory Objects data, SQL Server data, SharePoint data, Oracle database data, SAP database data, virtual machines and/or associated data, and other types of data. A file system data agent, for example, may handle data files and/or other file system information. If a client computing device 102 has two or more types of data 112, a specialized data agent 142 may be used for each data type. For example, to backup, migrate, and/or restore all of the data on a Microsoft Exchange server, the client computing device 102 may use: a Microsoft Exchange Mailbox data agent 142 to back up the Exchange mailboxes; a Microsoft Exchange Database data agent 142 to back up the Exchange databases; a Microsoft Exchange Public Folder data agent 142 to back up the Exchange Public Folders; and a Microsoft Windows File System data agent 142 to back up the file system of client computing device 102. In such embodiments, these specialized data agents 142 may be treated as four separate data agents 142 even though they operate on the same client computing device 102. Other examples may include archive management data agents such as a migration archiver or a compliance archiver, Quick Recovery® agents, and continuous data replication agents. Application-specific data agents 142 can provide improved performance as compared to generic agents. For instance, because application-specific data agents 142 may only handle data for a single software application, the design of the data agent 142 can be streamlined. The data agent 142 may therefore execute faster and consume less persistent storage and/or operating memory than data agents designed to generically accommodate multiple different software applications 110.

Each data agent 142 may be configured to access data and/or metadata stored in the primary storage device(s) 104 associated with data agent 142 and its host client computing device 102, and process the data appropriately. For example, during a secondary copy operation, data agent 142 may arrange or assemble the data and metadata into one or more files having a certain format (e.g., a particular backup or archive format) before transferring the file(s) to a media agent 144 or other component. The file(s) may include a list of files or other metadata.

In some embodiments, a data agent 142 may be distributed between client computing device 102 and storage manager 140 (and any other intermediate components) or may be deployed from a remote location or its functions approximated by a remote process that performs some or all of the functions of data agent 142. In addition, a data agent 142 may perform some functions provided by media agent 144. Other embodiments may employ one or more generic data agents 142 that can handle and process data from two or more different applications 110, or that can handle and process multiple data types, instead of or in addition to using specialized data agents 142. For example, one generic data agent 142 may be used to back up, migrate and restore Microsoft Exchange Mailbox data and Microsoft Exchange Database data, while another generic data agent may handle Microsoft Exchange Public Folder data and Microsoft Windows File System data.

Media Agents

As noted, off-loading certain responsibilities from client computing devices 102 to intermediate components such as secondary storage computing device(s) 106 and corresponding media agent(s) 144 can provide a number of benefits including improved performance of client computing device 102, faster information management operations, and enhanced scalability. In one example which will be discussed further below, media agent 144 can act as a local cache of recently-copied data and/or metadata that it stored to secondary storage device(s) 108, thus improving restore capabilities and performance.

Media agent 144 is a component of information system 100 and is generally directed by storage manager 140 in creating or restoring secondary copies 116. Whereas storage manager 140 generally manages information management system 100, media agent 144 provides a portal to secondary storage devices 108. Media agent 144 may be a software program (e.g., a set of executable binary files) that executes on a secondary storage computing device 106. Media agent 144 generally manages, coordinates, and facilitates the transmission of data between a client computing device 102 (executing a data agent 142) and secondary storage device(s) 108. For instance, other components in the system may interact with media agent 144 to gain access to data stored on secondary storage device(s) 108, (e.g., to browse, read, write, modify, delete, or restore data). Moreover, media agents 144 can generate and store information relating to characteristics of the stored data and/or metadata, or can generate and store other types of information that generally provides insight into the contents of the secondary storage devices 108—generally referred to as indexing of the stored secondary copies 116.

Media agents 144 can comprise separate nodes of system 100 (e.g., nodes that are separate from client computing devices 102, storage manager 140, and/or secondary storage devices 108). In general, a node can be a logically and/or physically separate component, and in some cases is a component that is individually addressable or otherwise identifiable. In addition, each media agent 144 may operate on a dedicated secondary storage computing device 106, while in other embodiments a plurality of media agents 144 may operate on the same secondary storage computing device 106.

A media agent 144 may be associated with a particular secondary storage device 108 if that media agent 144 is capable of one or more of: routing and/or storing data to the particular secondary storage device 108; coordinating the routing and/or storing of data to the particular secondary storage device 108; retrieving data from the particular secondary storage device 108; coordinating the retrieval of data from the particular secondary storage device 108; and modifying and/or deleting data retrieved from the particular secondary storage device 108. Media agent 144 in certain embodiments is physically separate from the associated secondary storage device 108. For instance, a media agent 144 may operate on a secondary storage computing device 106 in a distinct housing, package, and/or location from the associated secondary storage device 108. In one example, a media agent 144 operates on a first server computer and is in communication with a secondary storage device(s) 108 operating in a separate rack-mounted RAID-based system.

A media agent 144 associated with a particular secondary storage device 108 may instruct secondary storage device 108 to perform an information management task. For instance, a media agent 144 may instruct a tape library to use a robotic arm or other retrieval means to load or eject a certain storage media, and to subsequently archive, migrate, or retrieve data to or from that media, e.g., for the purpose of restoring data to a client computing device 102. As another example, a secondary storage device 108 may include an array of hard disk drives or solid state drives organized in a RAID configuration, and media agent 144 may forward a logical unit number (LUN) and other appropriate information to the array, which uses the received information to execute the desired secondary copy operation. Media agent 144 may communicate with a secondary storage device 108 via a suitable communications link, such as a SCSI or Fiber Channel link.

Each media agent 144 may maintain an associated media agent database 152. Media agent database 152 may be stored to a disk or other storage device (not shown) that is local to the secondary storage computing device 106 on which media agent 144 operates. In other cases, media agent database 152 is stored separately from the host secondary storage computing device 106. Media agent database 152 can include, among other things, a media agent index 153 (see, e.g., FIG. 1C). In some cases, media agent index 153 does not form a part of and is instead separate from media agent database 152.

Media agent index 153 (or "index 153") may be a data structure associated with the particular media agent 144 that includes information about the stored data associated with the particular media agent and which may be generated in the course of performing a secondary copy operation or a restore. Index 153 provides a fast and efficient mechanism for locating/browsing secondary copies 116 or other data stored in secondary storage devices 108 without having to access secondary storage device 108 to retrieve the information from there. For instance, for each secondary copy 116, index 153 may include metadata such as a list of the data objects (e.g., files/subdirectories, database objects, mailbox objects, etc.), a logical path to the secondary copy 116 on the corresponding secondary storage device 108, location information (e.g., offsets) indicating where the data objects are stored in the secondary storage device 108, when the data objects were created or modified, etc. Thus, index 153 includes metadata associated with the secondary copies 116 that is readily available for use from media agent 144. In some embodiments, some or all of the information in index 153 may instead or additionally be stored along with secondary copies 116 in secondary storage device 108. In some embodiments, a secondary storage device 108 can include sufficient information to enable a "bare metal restore," where the operating system and/or software applications of a failed client computing device 102 or another target may be automatically restored without manually reinstalling individual software packages (including operating systems).

Because index 153 may operate as a cache, it can also be referred to as an "index cache." In such cases, information stored in index cache 153 typically comprises data that reflects certain particulars about relatively recent secondary copy operations. After some triggering event, such as after some time elapses or index cache 153 reaches a particular size, certain portions of index cache 153 may be copied or migrated to secondary storage device 108, e.g., on a least-recently-used basis. This information may be retrieved and uploaded back into index cache 153 or otherwise restored to media agent 144 to facilitate retrieval of data from the secondary storage device(s) 108. In some embodiments, the cached information may include format or containerization information related to archives or other files stored on storage device(s) 108.

In some alternative embodiments media agent 144 generally acts as a coordinator or facilitator of secondary copy operations between client computing devices 102 and secondary storage devices 108, but does not actually write the data to secondary storage device 108. For instance, storage manager 140 (or media agent 144) may instruct a client computing device 102 and secondary storage device 108 to communicate with one another directly. In such a case, client computing device 102 transmits data directly or via one or more intermediary components to secondary storage device 108 according to the received instructions, and vice versa. Media agent 144 may still receive, process, and/or maintain metadata related to the secondary copy operations, i.e., may continue to build and maintain index 153. In these embodiments, payload data can flow through media agent 144 for the purposes of populating index 153, but not for writing to secondary storage device 108.

Media agent 144 and/or other components such as storage manager 140 may in some cases incorporate additional functionality, such as data classification, content indexing, deduplication, encryption, compression, and the like. Further details regarding these and other functions are described below.

Distributed, Scalable Architecture

As described, certain functions of system 100 can be distributed amongst various physical and/or logical components. For instance, one or more of storage manager 140, data agents 142, and media agents 144 may operate on computing devices that are physically separate from one another. This architecture can provide a number of benefits. For instance, hardware and software design choices for each distributed component can be targeted to suit its particular function. The secondary computing devices 106 on which media agents 144 operate can be tailored for interaction with associated secondary storage devices 108 and provide fast index cache operation, among other specific tasks. Similarly, client computing device(s) 102 can be selected to effectively service applications 110 in order to efficiently produce and store primary data 112.

Moreover, in some cases, one or more of the individual components of information management system 100 can be distributed to multiple separate computing devices. As one example, for large file systems where the amount of data stored in management database 146 is relatively large, database 146 may be migrated to or may otherwise reside on a specialized database server (e.g., an SQL server) separate from a server that implements the other functions of storage manager 140. This distributed configuration can provide added protection because database 146 can be protected with standard database utilities (e.g., SQL log shipping or database replication) independent from other functions of storage manager 140. Database 146 can be efficiently replicated to a remote site for use in the event of a disaster or other data loss at the primary site. Or database 146 can be replicated to another computing device within the same site, such as to a higher performance machine in the event that a storage manager host computing device can no longer service the needs of a growing system 100.

Figure 1D:
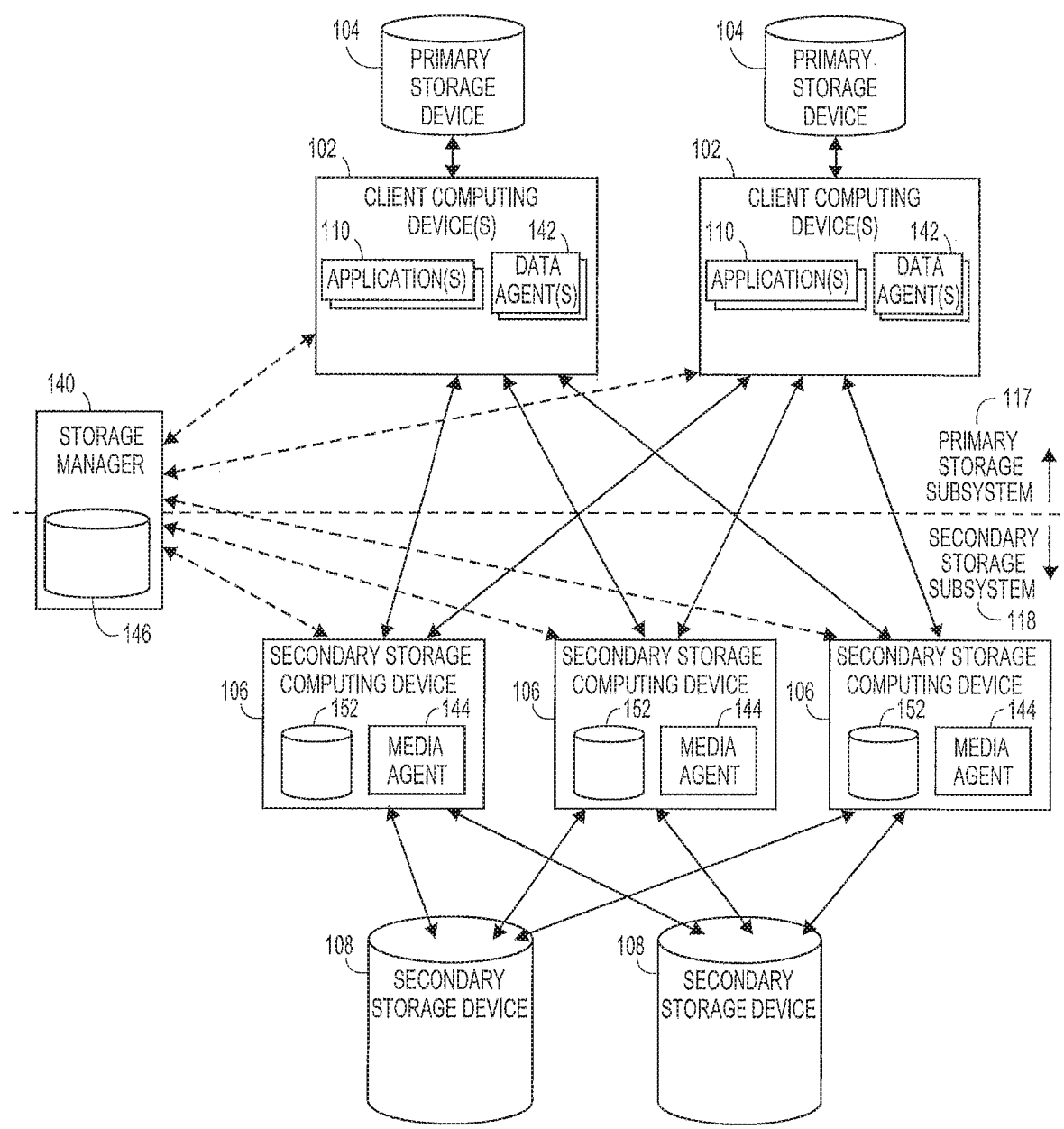
FIG. 1D is a block diagram illustrating a scalable information management system.

The distributed architecture also provides scalability and efficient component utilization. FIG. 1D shows an embodiment of information management system 100 including a plurality of client computing devices 102 and associated data agents 142 as well as a plurality of secondary storage computing devices 106 and associated media agents 144. Additional components can be added or subtracted based on the evolving needs of system 100. For instance, depending on where bottlenecks are identified, administrators can add additional client computing devices 102, secondary storage computing devices 106, and/or secondary storage devices 108. Moreover, where multiple fungible components are available, load balancing can be implemented to dynamically address identified bottlenecks. As an example, storage manager 140 may dynamically select which media agents 144 and/or secondary storage devices 108 to use for storage operations based on a processing load analysis of media agents 144 and/or secondary storage devices 108, respectively.

Where system 100 includes multiple media agents 144 (see, e.g., FIG. 1D), a first media agent 144 may provide failover functionality for a second failed media agent 144. In addition, media agents 144 can be dynamically selected to provide load balancing. Each client computing device 102 can communicate with, among other components, any of the media agents 144, e.g., as directed by storage manager 140. And each media agent 144 may communicate with, among other components, any of secondary storage devices 108, e.g., as directed by storage manager 140. Thus, operations can be routed to secondary storage devices 108 in a dynamic and highly flexible manner, to provide load balancing, failover, etc. Further examples of scalable systems capable of dynamic storage operations, load balancing, and failover are provided in U.S. Pat. No. 7,246,207.

While distributing functionality amongst multiple computing devices can have certain advantages, in other contexts it can be beneficial to consolidate functionality on the same computing device. In alternative configurations, certain components may reside and execute on the same computing device. As such, in other embodiments, one or more of the components shown in FIG. 1C may be implemented on the same computing device. In one configuration, a storage manager 140, one or more data agents 142, and/or one or more media agents 144 are all implemented on the same computing device. In other embodiments, one or more data agents 142 and one or more media agents 144 are implemented on the same computing device, while storage manager 140 is implemented on a separate computing device, etc. without limitation.

Exemplary Types of Information Management Operations

In order to protect and leverage stored data, system 100 can be configured to perform a variety of information management operations, which may also be referred to in some cases as storage management operations or storage operations. These operations can generally include (i) data movement operations, (ii) processing and data manipulation operations, and (iii) analysis, reporting, and management operations.

Data Movement Operations, Including Secondary Copy Operations

Data movement operations are generally operations that involve the copying or migration of data between different locations in system 100. For example, data movement operations can include operations in which stored data is copied, migrated, or otherwise transferred from one or more first storage devices to one or more second storage devices, such as from primary storage device(s) 104 to secondary storage device(s) 108, from secondary storage device(s) 108 to different secondary storage device(s) 108, from secondary storage devices 108 to primary storage devices 104, or from primary storage device(s) 104 to different primary storage device(s) 104, or in some cases within the same primary storage device 104 such as within a storage array.

Data movement operations can include by way of example, backup operations, archive operations, information lifecycle management operations such as hierarchical storage management operations, replication operations (e.g., continuous data replication), snapshot operations, deduplication or single-instancing operations, auxiliary copy operations, disaster-recovery copy operations, and the like. As will be discussed, some of these operations do not necessarily create distinct copies. Nonetheless, some or all of these operations are generally referred to as "secondary copy operations" for simplicity. Data movement also comprises restoring secondary copies.

Backup Operations

A backup operation creates a copy of a version of primary data 112 at a particular point in time (e.g., one or more files or other data units). Each subsequent backup copy 116 (which is a form of secondary copy 116) may be maintained independently of the first. A backup generally involves maintaining a version of the copied primary data 112 as well as backup copies 116. Further, a backup copy in some embodiments is generally stored in a form that is different from the native format, e.g., a backup format. This contrasts to the version in primary data 112 which may instead be stored in a native format of the source application(s) 110. In various cases, backup copies can be stored in a format in which the data is compressed, encrypted, deduplicated, and/or otherwise modified from the original native application format. For example, a backup copy may be stored in a compressed backup format that facilitates efficient long-term storage.

Backup copies 116 can have relatively long retention periods as compared to primary data 112, which is generally highly changeable. Backup copies 116 may be stored on media with slower retrieval times than primary storage device 104. Some backup copies may have shorter retention periods than some other types of secondary copies 116, such as archive copies (described below). Backups may be stored at an offsite location.

Backup operations can include full backups, differential backups, incremental backups, "synthetic full" backups, and/or creating a "reference copy." A full backup (or "standard full backup") in some embodiments is generally a complete image of the data to be protected. However, because full backup copies can consume a relatively large amount of storage, it can be useful to use a full backup copy as a baseline and only store changes relative to the full backup copy for subsequent backup copies.

A differential backup operation (or cumulative incremental backup operation) tracks and stores changes that occurred since the last full backup. Differential backups can grow quickly in size, but can restore relatively efficiently because a restore can be completed in some cases using only the full backup copy and the latest differential copy.

An incremental backup operation generally tracks and stores changes since the most recent backup copy of any type, which can greatly reduce storage utilization. In some cases, however, restoring can be lengthy compared to full or differential backups because completing a restore operation may involve accessing a full backup in addition to multiple incremental backups.

Synthetic full backups generally consolidate data without directly backing up data from the client computing device. A synthetic full backup is created from the most recent full backup (i.e., standard or synthetic) and subsequent incremental and/or differential backups. The resulting synthetic full backup is identical to what would have been created had the last backup for the subclient been a standard full backup. Unlike standard full, incremental, and differential backups, however, a synthetic full backup does not actually transfer data from primary storage to the backup media, because it operates as a backup consolidator. A synthetic full backup extracts the index data of each participating subclient. Using this index data and the previously backed up user data images, it builds new full backup images (e.g., bitmaps), one for each subclient. The new backup images consolidate the index and user data stored in the related incremental, differential, and previous full backups into a synthetic backup file that fully represents the subclient (e.g., via pointers) but does not comprise all its constituent data.

Any of the above types of backup operations can be at the volume level, file level, or block level. Volume level backup operations generally involve copying of a data volume (e.g., a logical disk or partition) as a whole. In a file-level backup, information management system 100 generally tracks changes to individual files and includes copies of files in the backup copy. For block-level backups, files are broken into constituent blocks, and changes are tracked at the block level. Upon restore, system 100 reassembles the blocks into files in a transparent fashion. Far less data may actually be transferred and copied to secondary storage devices 108 during a file-level copy than a volume-level copy. Likewise, a block-level copy may transfer less data than a file-level copy, resulting in faster execution. However, restoring a relatively higher-granularity copy can result in longer restore times. For instance, when restoring a block-level copy, the process of locating constituent blocks can sometimes take longer than restoring file-level backups.

A reference copy may comprise copy(ies) of selected objects from backed up data, typically to help organize data by keeping contextual information from multiple sources together, and/or help retain specific data for a longer period of time, such as for legal hold needs. A reference copy generally maintains data integrity, and when the data is restored, it may be viewed in the same format as the source data. In some embodiments, a reference copy is based on a specialized client, individual subclient and associated information management policies (e.g., storage policy, retention policy, etc.) that are administered within system 100.

Archive Operations

Because backup operations generally involve maintaining a version of the copied primary data 112 and also maintaining backup copies in secondary storage device(s) 108, they can consume significant storage capacity. To reduce storage consumption, an archive operation according to certain embodiments creates an archive copy 116 by both copying and removing source data. Or, seen another way, archive operations can involve moving some or all of the source data to the archive destination. Thus, data satisfying criteria for removal (e.g., data of a threshold age or size) may be removed from source storage. The source data may be primary data 112 or a secondary copy 116, depending on the situation. As with backup copies, archive copies can be stored in a format in which the data is compressed, encrypted, deduplicated, and/or otherwise modified from the format of the original application or source copy. In addition, archive copies may be retained for relatively long periods of time (e.g., years) and, in some cases are never deleted. Archive copies are generally retained for longer periods of time than backup copies. In certain embodiments, archive copies may be made and kept for extended periods in order to meet compliance regulations.

Archiving can also serve the purpose of freeing up space in primary storage device(s) 104 and easing the demand on computational resources on client computing device 102. Similarly, when a secondary copy 116 is archived, the archive copy can therefore serve the purpose of freeing up space in the source secondary storage device(s) 108. Examples of data archiving operations are provided in U.S. Pat. No. 7,107,298.

Snapshot Operations

Snapshot operations can provide a relatively lightweight, efficient mechanism for protecting data. From an end-user viewpoint, a snapshot may be thought of as an "instant" image of primary data 112 at a given point in time, and may include state and/or status information relative to an application 110 that creates/manages primary data 112. In one embodiment, a snapshot may generally capture the directory structure of an object in primary data 112 such as a file or volume or other data set at a particular moment in time and may also preserve file attributes and contents. A snapshot in some cases is created relatively quickly, e.g., substantially instantly, using a minimum amount of file space, but may still function as a conventional file system backup.

A "hardware snapshot" (or "hardware-based snapshot") operation can be a snapshot operation where a target storage device (e.g., a primary storage device 104 or a secondary storage device 108) performs the snapshot operation in a self-contained fashion, substantially independently, using hardware, firmware and/or software operating on the storage device itself. For instance, the storage device may perform snapshot operations generally without intervention or oversight from any of the other components of the system 100, e.g., a storage array may generate an "array-created" hardware snapshot and may also manage its storage, integrity, versioning, etc. In this manner, hardware snapshots can off-load other components of system 100 from processing involved in creating and managing snapshots.

A "software snapshot" (or "software-based snapshot") operation, on the other hand, can be a snapshot operation in which one or more other components in information management system 100 (e.g., client computing devices 102, data agents 142, etc.) implement a software layer that manages the snapshot operation via interaction with the target storage device. For instance, the component executing the snapshot management software layer may derive a set of pointers and/or data that represents the snapshot. The snapshot management software layer may then transmit the same to the target storage device, along with appropriate instructions for writing the snapshot. One example of a software snapshot product may be Microsoft Volume Snapshot Service (VSS), which is part of the Microsoft Windows operating system.

Some types of snapshots do not actually create another physical copy of all the data as it existed at the particular point in time, but may simply create pointers that are able to map files and directories to specific memory locations (e.g., to specific disk blocks) where the data resides, as it existed at the particular point in time. For example, a snapshot copy may include a set of pointers derived from the file system or from an application. In some other cases, the snapshot may be created at the block-level, such that creation of the snapshot occurs without awareness of the file system. Each pointer points to a respective stored data block, so that collectively, the set of pointers reflect the storage location and state of the data object (e.g., file(s) or volume(s) or data set(s)) at the particular point in time when the snapshot copy was created.

An initial snapshot may use only a small amount of disk space needed to record a mapping or other data structure representing or otherwise tracking the blocks that correspond to the current state of the file system. Additional disk space is usually required only when files and directories change later on. Furthermore, when files change, typically only the pointers which map to blocks are copied, not the blocks themselves. For example for "copy-on-write" snapshots, when a block changes in primary storage, the block is copied to secondary storage or cached in primary storage before the block is overwritten in primary storage, and the pointer to that block is changed to reflect the new location of that block. The snapshot mapping of file system data may also be updated to reflect the changed block(s) at that particular point in time. In some other cases, a snapshot includes a full physical copy of all or substantially all of the data represented by the snapshot. Further examples of snapshot operations are provided in U.S. Pat. No. 7,529,782.

A snapshot copy in many cases can be made quickly and without significantly impacting primary computing resources because large amounts of data need not be copied or moved. In some embodiments, a snapshot may exist as a virtual file system, parallel to the actual file system. Users in some cases gain read-only access to the record of files and directories of the snapshot. By electing to restore primary data 112 from a snapshot taken at a given point in time, users may also return the current file system to the state of the file system that existed when the snapshot was taken.

Replication Operations

Another type of secondary copy operation is a replication operation. Some types of secondary copies 116 are used to periodically capture images of primary data 112 at particular points in time (e.g., backups, archives, and snapshots). However, it can also be useful for recovery purposes to protect primary data 112 in a more continuous fashion, by replicating primary data 112 substantially as changes occur. In some cases a replication copy can be a mirror copy, for instance, where changes made to primary data 112 are mirrored or substantially immediately copied to another location (e.g., to secondary storage device(s) 108). By copying each write operation to the replication copy, two storage systems are kept synchronized or substantially synchronized so that they are virtually identical at approximately the same time. Where entire disk volumes are mirrored, however, mirroring can require significant amount of storage space and utilizes a large amount of processing resources.

According to some embodiments secondary copy operations are performed on replicated data that represents a recoverable state, or "known good state" of a particular application running on the source system. For instance, in certain embodiments, known good replication copies may be viewed as copies of primary data 112. This feature allows the system to directly access, copy, restore, backup or otherwise manipulate the replication copies as if the data were the "live" primary data 112. This can reduce access time, storage utilization, and impact on source applications 110, among other benefits. Based on known good state information, system 100 can replicate sections of application data that represent a recoverable state rather than rote copying of blocks of data. Examples of replication operations (e.g., continuous data replication) are provided in U.S. Pat. No. 7,617,262.

Deduplication/Single-Instancing Operations

Deduplication or single-instance storage is useful to reduce the amount of non-primary data. For instance, some or all of the above-described secondary copy operations can involve deduplication in some fashion. New data is read, broken down into data portions of a selected granularity (e.g., sub-file level blocks, files, etc.), compared with corresponding portions that are already in secondary storage, and only new portions are stored. Portions that already exist are represented as pointers to the already-stored data. Thus, a deduplicated secondary copy 116 may comprise actual data portions copied from primary data 112 and may further comprise pointers to already-stored data, which is generally more storage-efficient than a full copy.

In order to streamline the comparison process, information management system 100 may calculate and/or store signatures (e.g., hashes or cryptographically unique IDs) corresponding to the individual data portions in the source data and compare the signatures instead of comparing entire data portions. In some cases, only a single instance of each data portion is stored, and deduplication operations may therefore be referred to interchangeably as "single-instancing" operations. Depending on the implementation, however, deduplication operations can store more than one instance of certain data portions, but nonetheless significantly reduce stored-data redundancy. Depending on the embodiment, deduplication portions such as data blocks can be of fixed or variable length. Using variable length blocks can enhance deduplication by responding to changes in the data stream, but can involve complex processing. In some cases, system 100 utilizes a technique for dynamically aligning deduplication blocks based on changing content in the data stream, as described in U.S. Pat. No. 8,364,652.

Information management system 100 can perform deduplication in a variety of manners at a variety of locations. For instance, in some embodiments, system 100 implements "target-side" deduplication by deduplicating data at the media agent 144 after being received from data agent 142. In some such cases, the media agents 144 are generally configured to manage the deduplication process. For instance, one or more of the media agents 144 maintain a corresponding deduplication database that stores deduplication information (e.g., datablock signatures). Examples of such a configuration are provided in U.S. Pat. No. 9,020,900. Instead of or in combination with "target-side" deduplication, deduplication can also be performed on the "source-side" (or "client-side"), e.g., to reduce the amount of data to be transmitted by data agent 142 to media agent 144. Storage manager 140 may communicate with other components within system 100 via network protocols and cloud service provider APIs to facilitate cloud-based deduplication/single instancing, as exemplified in U.S. Pat. No. 8,954,446. Some other deduplication/single instancing techniques are described in U.S. Pat. Pub. No. 2006/0224846 and U.S. Pat. No. 9,098,495.

Information Lifecycle Management and Hierarchical Storage Management

In some embodiments, files and other data over their lifetime move from more expensive quick-access storage to less expensive slower-access storage. Operations associated with moving data through various tiers of storage are sometimes referred to as information lifecycle management (ILM) operations.

One type of ILM operation is a hierarchical storage management (HSM) operation, which generally automatically moves data between classes of storage devices, such as from high-cost to low-cost storage devices. For instance, an HSM operation may involve movement of data from primary storage devices 104 to secondary storage devices 108, or between tiers of secondary storage devices 108. With each tier, the storage devices may be progressively cheaper, have relatively slower access/restore times, etc. For example, movement of data between tiers may occur as data becomes less important over time. In some embodiments, an HSM operation is similar to archiving in that creating an HSM copy may (though not always) involve deleting some of the source data, e.g., according to one or more criteria related to the source data. For example, an HSM copy may include primary data 112 or a secondary copy 116 that is larger than a given size threshold or older than a given age threshold. Often, and unlike some types of archive copies, HSM data that is removed or aged from the source is replaced by a logical reference pointer or stub. The reference pointer or stub can be stored in the primary storage device 104 or other source storage device, such as a secondary storage device 108 to replace the deleted source data and to point to or otherwise indicate the new location in (another) secondary storage device 108.

According to one example, files are generally moved between higher and lower cost storage depending on how often the files are accessed. When a user requests access to HSM data that has been removed or migrated, system 100 uses the stub to locate the data and may make recovery of the data appear transparent, even though the HSM data may be stored at a location different from other source data. In this manner, the data appears to the user (e.g., in file system browsing windows and the like) as if it still resides in the source location (e.g., in a primary storage device 104). The stub may also include some metadata associated with the corresponding data, so that a file system and/or application can provide some information about the data object and/or a limited-functionality version (e.g., a preview) of the data object.

An HSM copy may be stored in a format other than the native application format (e.g., compressed, encrypted, deduplicated, and/or otherwise modified). In some cases, copies which involve the removal of data from source storage and the maintenance of stub or other logical reference information on source storage may be referred to generally as "on-line archive copies." On the other hand, copies which involve the removal of data from source storage without the maintenance of stub or other logical reference information on source storage may be referred to as "off-line archive copies." Examples of HSM and ILM techniques are provided in U.S. Pat. No. 7,343,453.

Auxiliary Copy Operations

An auxiliary copy is generally a copy of an existing secondary copy 116. For instance, an initial secondary copy 116 may be derived from primary data 112 or from data residing in secondary storage subsystem 118, whereas an auxiliary copy is generated from the initial secondary copy 116. Auxiliary copies provide additional standby copies of data and may reside on different secondary storage devices 108 than the initial secondary copies 116. Thus, auxiliary copies can be used for recovery purposes if initial secondary copies 116 become unavailable. Exemplary auxiliary copy techniques are described in further detail in U.S. Pat. No. 8,230,195.

Disaster-Recovery Copy Operations

Information management system 100 may also make and retain disaster recovery copies, often as secondary, high-availability disk copies. System 100 may create secondary disk copies and store the copies at disaster recovery locations using auxiliary copy or replication operations, such as continuous data replication technologies. Depending on the particular data protection goals, disaster recovery locations can be remote from the client computing devices 102 and primary storage devices 104, remote from some or all of the secondary storage devices 108, or both.

Data Manipulation, Including Encryption and Compression

Data manipulation and processing may include encryption and compression as well as integrity marking and checking, formatting for transmission, formatting for storage, etc. Data may be manipulated "client-side" by data agent 142 as well as "target-side" by media agent 144 in the course of creating secondary copy 116.

Encryption Operations

Information management system 100 in some cases is configured to process data (e.g., files or other data objects, primary data 112, secondary copies 116, etc.), according to an appropriate encryption algorithm (e.g., Blowfish, Advanced Encryption Standard (AES), Triple Data Encryption Standard (3-DES), etc.) to limit access and provide data security. System 100 in some cases encrypts the data at the client level, such that client computing devices 102 (e.g., data agents 142) encrypt the data prior to transferring it to other components, e.g., before sending the data to media agents 144 during a secondary copy operation. In such cases, client computing device 102 may maintain or have access to an encryption key or passphrase for decrypting the data upon restore. Encryption can also occur when media agent 144 creates auxiliary copies or archive copies. Encryption may be applied in creating a secondary copy 116 of a previously unencrypted secondary copy 116, without limitation. In further embodiments, secondary storage devices 108 can implement built-in, high performance hardware-based encryption.

Compression Operations

Similar to encryption, system 100 may also or alternatively compress data in the course of generating a secondary copy 116. Compression encodes information such that fewer bits are needed to represent the information as compared to the original representation. Compression techniques are well known in the art. Compression operations may apply one or more data compression algorithms. Compression may be applied in creating a secondary copy 116 of a previously uncompressed secondary copy, e.g., when making archive copies or disaster recovery copies. The use of compression may result in metadata that specifies the nature of the compression, so that data may be uncompressed on restore if appropriate.

Data Analysis, Reporting, and Management Operations

Data analysis, reporting, and management operations can differ from data movement operations in that they do not necessarily involve copying, migration or other transfer of data between different locations in the system. For instance, data analysis operations may involve processing (e.g., offline processing) or modification of already stored primary data 112 and/or secondary copies 116. However, in some embodiments data analysis operations are performed in conjunction with data movement operations. Some data analysis operations include content indexing operations and classification operations which can be useful in leveraging the data under management to provide enhanced search and other features. Other data analysis operations such as compression and encryption can provide data reduction and security benefits, respectively.

Classification Operations/Content Indexing

In some embodiments, information management system 100 analyzes and indexes characteristics, content, and metadata associated with primary data 112 ("online content indexing") and/or secondary copies 116 ("off-line content indexing"). Content indexing can identify files or other data objects based on content (e.g., user-defined keywords or phrases, other keywords/phrases that are not defined by a user, etc.), and/or metadata (e.g., email metadata such as "to," "from," "cc," "bcc," attachment name, received time, etc.). Content indexes may be searched and search results may be restored.

Information management system 100 generally organizes and catalogues the results into a content index, which may be stored within media agent database 152, for example. The content index can also include the storage locations of or pointer references to indexed data in primary data 112 or secondary copies 116, as appropriate. The results may also be stored elsewhere in system 100 (e.g., in primary storage device 104 or in secondary storage device 108). Such content index data provides storage manager 140 or other components with an efficient mechanism for locating primary data 112 and/or secondary copies 116 of data objects that match particular criteria, thus greatly increasing the search speed capability of system 100. For instance, search criteria can be specified by a user through user interface 158 of storage manager 140. Moreover, when system 100 analyzes data and/or metadata in secondary copies 116 to create an "off-line content index," this operation has no significant impact on the performance of client computing devices 102 and thus does not take a toll on the production environment. Examples of content indexing techniques are provided in U.S. Pat. No. 8,170,995.

One or more components, such as a content index engine, can be configured to scan data and/or associated metadata for classification purposes to populate a database (or other data structure) of information, which can be referred to as a "data classification database" or a "metabase." Depending on the embodiment, the data classification database(s) can be organized in a variety of different ways, including centralization, logical sub-divisions, and/or physical sub-divisions. For instance, one or more data classification databases may be associated with different subsystems or tiers within system 100. As an example, there may be a first metabase associated with primary storage subsystem 117 and a second metabase associated with secondary storage subsystem 118. In other cases, there may be one or more metabases associated with individual components, e.g., client computing devices 102 and/or media agents 144. In some embodiments, a data classification database may reside as one or more data structures within management database 146, or may be otherwise associated with storage manager 140 or may reside as a separate component.

In some cases, metabase(s) may be included in separate database(s) and/or on separate storage device(s) from primary data 112 and/or secondary copies 116, such that operations related to the metabase(s) do not significantly impact performance on other components of information management system 100. In other cases, metabase(s) may be stored along with primary data 112 and/or secondary copies 116. Files or other data objects can be associated with identifiers (e.g., tag entries, etc.) to facilitate searches of stored data objects. Among a number of other benefits, the metabase can also allow efficient, automatic identification of files or other data objects to associate with secondary copy or other information management operations. For instance, a metabase can dramatically improve the speed with which the information management system can search through and identify data as compared to other approaches which can involve scanning an entire file system. Examples of metabases and data classification operations are provided in U.S. Pat. Nos. 7,734,669 and 7,747,579.

Management and Reporting Operations

Certain embodiments leverage the integrated ubiquitous nature of information management system 100 to provide useful system-wide management and reporting functions. Operations management can generally include monitoring and managing the health and performance of system 100 by, without limitation, performing error tracking, generating granular storage/performance metrics (e.g., job success/failure information, deduplication efficiency, etc.), generating storage modeling and costing information, and the like. As an example, storage manager 140 or other component in system 100 may analyze traffic patterns and suggest and/or automatically route data to minimize congestion. In some embodiments, the system can generate predictions relating to storage operations or storage operation information. Such predictions, which may be based on a trending analysis, may predict various network operations or resource usage, such as network traffic levels, storage media use, use of bandwidth of communication links, use of media agent components, etc. Further examples of traffic analysis, trend analysis, prediction generation, and the like are described in U.S. Pat. No. 7,343,453.

In some configurations having a hierarchy of storage operation cells, a master storage manager 140 may track the status of subordinate cells, such as the status of jobs, system components, system resources, and other items, by communicating with storage managers 140 (or other components) in the respective storage operation cells. Moreover, the master storage manager 140 may also track status by receiving periodic status updates from the storage managers 140 (or other components) in the respective cells regarding jobs, system components, system resources, and other items. In some embodiments, a master storage manager 140 may store status information and other information regarding its associated storage operation cells and other system information in its management database 146 and/or index 150 (or in another location). The master storage manager 140 or other component may also determine whether certain storage-related or other criteria are satisfied, and may perform an action or trigger event (e.g., data migration) in response to the criteria being satisfied, such as where a storage threshold is met for a particular volume, or where inadequate protection exists for certain data. For instance, data from one or more storage operation cells is used to dynamically and automatically mitigate recognized risks, and/or to advise users of risks or suggest actions to mitigate these risks. For example, an information management policy may specify certain requirements (e.g., that a storage device should maintain a certain amount of free space, that secondary copies should occur at a particular interval, that data should be aged and migrated to other storage after a particular period, that data on a secondary volume should always have a certain level of availability and be restorable within a given time period, that data on a secondary volume may be mirrored or otherwise migrated to a specified number of other volumes, etc.). If a risk condition or other criterion is triggered, the system may notify the user of these conditions and may suggest (or automatically implement) a mitigation action to address the risk. For example, the system may indicate that data from a primary copy 112 should be migrated to a secondary storage device 108 to free space on primary storage device 104. Examples of the use of risk factors and other triggering criteria are described in U.S. Pat. No. 7,343,453.

In some embodiments, system 100 may also determine whether a metric or other indication satisfies particular storage criteria sufficient to perform an action. For example, a storage policy or other definition might indicate that a storage manager 140 should initiate a particular action if a storage metric or other indication drops below or otherwise fails to satisfy specified criteria such as a threshold of data protection. In some embodiments, risk factors may be quantified into certain measurable service or risk levels. For example, certain applications and associated data may be considered to be more important relative to other data and services. Financial compliance data, for example, may be of greater importance than marketing materials, etc. Network administrators may assign priority values or "weights" to certain data and/or applications corresponding to the relative importance. The level of compliance of secondary copy operations specified for these applications may also be assigned a certain value. Thus, the health, impact, and overall importance of a service may be determined, such as by measuring the compliance value and calculating the product of the priority value and the compliance value to determine the "service level" and comparing it to certain operational thresholds to determine whether it is acceptable. Further examples of the service level determination are provided in U.S. Pat. No. 7,343,453, which is incorporated by reference herein.

System 100 may additionally calculate data costing and data availability associated with information management operation cells. For instance, data received from a cell may be used in conjunction with hardware-related information and other information about system elements to determine the cost of storage and/or the availability of particular data. Exemplary information generated could include how fast a particular department is using up available storage space, how long data would take to recover over a particular pathway from a particular secondary storage device, costs over time, etc. Moreover, in some embodiments, such information may be used to determine or predict the overall cost associated with the storage of certain information. The cost associated with hosting a certain application may be based, at least in part, on the type of media on which the data resides, for example. Storage devices may be assigned to a particular cost categories, for example. Further examples of costing techniques are described in U.S. Pat. No. 7,343,453.

Any of the above types of information (e.g., information related to trending, predictions, job, cell or component status, risk, service level, costing, etc.) can generally be provided to users via user interface 158 in a single integrated view or console (not shown). Report types may include: scheduling, event management, media management and data aging. Available reports may also include backup history, data aging history, auxiliary copy history, job history, library and drive, media in library, restore history, and storage policy, etc., without limitation. Such reports may be specified and created at a certain point in time as a system analysis, forecasting, or provisioning tool. Integrated reports may also be generated that illustrate storage and performance metrics, risks and storage costing information. Moreover, users may create their own reports based on specific needs. User interface 158 can include an option to show a "virtual view" of the system that graphically depicts the various components in the system using appropriate icons. As one example, user interface 158 may provide a graphical depiction of primary storage devices 104, secondary storage devices 108, data agents 142 and/or media agents 144, and their relationship to one another in system 100.

In general, the operations management functionality of system 100 can facilitate planning and decision-making. For example, in some embodiments, a user may view the status of some or all jobs as well as the status of each component of information management system 100. Users may then plan and make decisions based on this data. For instance, a user may view high-level information regarding secondary copy operations for system 100, such as job status, component status, resource status (e.g., communication pathways, etc.), and other information. The user may also drill down or use other means to obtain more detailed information regarding a particular component, job, or the like. Further examples are provided in U.S. Pat. No. 7,343,453.

Information management system 100 can also be configured to perform system-wide e-discovery operations in some embodiments. In general, e-discovery operations provide a unified collection and search capability for data in the system, such as data stored in secondary storage devices 108 (e.g., backups, archives, or other secondary copies 116). For example, system 100 may construct and maintain a virtual repository for data stored in system 100 that is integrated across source applications 110, different storage device types, etc. According to some embodiments, e-discovery utilizes other techniques described herein, such as data classification and/or content indexing.

Information Management Policies

An information management policy 148 can include a data structure or other information source that specifies a set of parameters (e.g., criteria and rules) associated with secondary copy and/or other information management operations.

One type of information management policy 148 is a "storage policy." According to certain embodiments, a storage policy generally comprises a data structure or other information source that defines (or includes information sufficient to determine) a set of preferences or other criteria for performing information management operations. Storage policies can include one or more of the following: (1) what data will be associated with the storage policy, e.g., subclient; (2) a destination to which the data will be stored; (3) datapath information specifying how the data will be communicated to the destination; (4) the type of secondary copy operation to be performed; and (5) retention information specifying how long the data will be retained at the destination (see, e.g., FIG. 1E). Data associated with a storage policy can be logically organized into subclients, which may represent primary data 112 and/or secondary copies 116. A subclient may represent static or dynamic associations of portions of a data volume. Subclients may represent mutually exclusive portions. Thus, in certain embodiments, a portion of data may be given a label and the association is stored as a static entity in an index, database or other storage location. Subclients may also be used as an effective administrative scheme of organizing data according to data type, department within the enterprise, storage preferences, or the like. Depending on the configuration, subclients can correspond to files, folders, virtual machines, databases, etc. In one exemplary scenario, an administrator may find it preferable to separate e-mail data from financial data using two different subclients.

A storage policy can define where data is stored by specifying a target or destination storage device (or group of storage devices). For instance, where the secondary storage device 108 includes a group of disk libraries, the storage policy may specify a particular disk library for storing the subclients associated with the policy. As another example, where the secondary storage devices 108 include one or more tape libraries, the storage policy may specify a particular tape library for storing the subclients associated with the storage policy, and may also specify a drive pool and a tape pool defining a group of tape drives and a group of tapes, respectively, for use in storing the subclient data. While information in the storage policy can be statically assigned in some cases, some or all of the information in the storage policy can also be dynamically determined based on criteria, which can be set forth in the storage policy. For instance, based on such criteria, a particular destination storage device(s) or other parameter of the storage policy may be determined based on characteristics associated with the data involved in a particular secondary copy operation, device availability (e.g., availability of a secondary storage device 108 or a media agent 144), network status and conditions (e.g., identified bottlenecks), user credentials, and the like.

Datapath information can also be included in the storage policy. For instance, the storage policy may specify network pathways and components to utilize when moving the data to the destination storage device(s). In some embodiments, the storage policy specifies one or more media agents 144 for conveying data associated with the storage policy between the source and destination. A storage policy can also specify the type(s) of operations associated with the storage policy, such as a backup, archive, snapshot, auxiliary copy, or the like. Furthermore, retention parameters can specify how long the resulting secondary copies 116 will be kept (e.g., a number of days, months, years, etc.), perhaps depending on organizational needs and/or compliance criteria.

Another type of information management policy 148 is a "scheduling policy," which specifies when and how often to perform operations. Scheduling parameters may specify with what frequency (e.g., hourly, weekly, daily, event-based, etc.) or under what triggering conditions secondary copy or other information management operations are to take place. Scheduling policies in some cases are associated with particular components, such as a subclient, client computing device 102, and the like.

When adding a new client computing device 102, administrators can manually configure information management policies 148 and/or other settings, e.g., via user interface 158. However, this can be an involved process resulting in delays, and it may be desirable to begin data protection operations quickly, without awaiting human intervention. Thus, in some embodiments, system 100 automatically applies a default configuration to client computing device 102. As one example, when one or more data agent(s) 142 are installed on a client computing device 102, the installation script may register the client computing device 102 with storage manager 140, which in turn applies the default configuration to the new client computing device 102. In this manner, data protection operations can begin substantially immediately. The default configuration can include a default storage policy, for example, and can specify any appropriate information sufficient to begin data protection operations. This can include a type of data protection operation, scheduling information, a target secondary storage device 108, data path information (e.g., a particular media agent 144), and the like.

Another type of information management policy 148 is an "audit policy" (or security policy), which comprises preferences, rules and/or criteria that protect sensitive data in information management system 100. For example, an audit policy may define "sensitive objects" which are files or data objects that contain particular keywords (e.g., "confidential," or "privileged") and/or are associated with particular keywords (e.g., in metadata) or particular flags (e.g., in metadata identifying a document or email as personal, confidential, etc.). An audit policy may further specify rules for handling sensitive objects. As an example, an audit policy may require that a reviewer approve the transfer of any sensitive objects to a cloud storage site, and that if approval is denied for a particular sensitive object, the sensitive object should be transferred to a local primary storage device 104 instead. To facilitate this approval, the audit policy may further specify how a secondary storage computing device 106 or other system component should notify a reviewer that a sensitive object is slated for transfer.

Another type of information management policy 148 is a "provisioning policy," which can include preferences, priorities, rules, and/or criteria that specify how client computing devices 102 (or groups thereof) may utilize system resources, such as available storage on cloud storage and/or network bandwidth. A provisioning policy specifies, for example, data quotas for particular client computing devices 102 (e.g., a number of gigabytes that can be stored monthly, quarterly or annually). Storage manager 140 or other components may enforce the provisioning policy. For instance, media agents 144 may enforce the policy when transferring data to secondary storage devices 108. If a client computing device 102 exceeds a quota, a budget for the client computing device 102 (or associated department) may be adjusted accordingly or an alert may trigger.

While the above types of information management policies 148 have been described as separate policies, one or more of these can be generally combined into a single information management policy 148. For instance, a storage policy may also include or otherwise be associated with one or more scheduling, audit, or provisioning policies or operational parameters thereof. Moreover, while storage policies are typically associated with moving and storing data, other policies may be associated with other types of information management operations. The following is a non-exhaustive list of items that information management policies 148 may specify:

- schedules or other timing information, e.g., specifying when and/or how often to perform information management operations;
- the type of secondary copy 116 and/or copy format (e.g., snapshot, backup, archive, HSM, etc.);
- a location or a class or quality of storage for storing secondary copies 116 (e.g., one or more particular secondary storage devices 108);
- preferences regarding whether and how to encrypt, compress, deduplicate, or otherwise modify or transform secondary copies 116;
- which system components and/or network pathways (e.g., preferred media agents 144) should be used to perform secondary storage operations;
- resource allocation among different computing devices or other system components used in performing information management operations (e.g., bandwidth allocation, available storage capacity, etc.);

whether and how to synchronize or otherwise distribute files or other data objects across multiple computing devices or hosted services; and retention information specifying the length of time primary data 112 and/or secondary copies 116 should be retained, e.g., in a particular class or tier of storage devices, or within the system 100.

Information management policies 148 can additionally specify or depend on historical or current criteria that may be used to determine which rules to apply to a particular data object, system component, or information management operation, such as:

frequency with which primary data 112 or a secondary copy 116 of a data object or metadata has been or is predicted to be used, accessed, or modified;

time-related factors (e.g., aging information such as time since the creation or modification of a data object);

deduplication information (e.g., hashes, data blocks, deduplication block size, deduplication efficiency or other metrics);

an estimated or historic usage or cost associated with different components (e.g., with secondary storage devices 108);

the identity of users, applications 110, client computing devices 102 and/or other computing devices that created, accessed, modified, or otherwise utilized primary data 112 or secondary copies 116;

a relative sensitivity (e.g., confidentiality, importance) of a data object, e.g., as determined by its content and/or metadata;

the current or historical storage capacity of various storage devices;

the current or historical network capacity of network pathways connecting various components within the storage operation cell;

access control lists or other security information; and the content of a particular data object (e.g., its textual content) or of metadata associated with the data object.

Exemplary Storage Policy and Secondary Copy Operations

Figure 1E:
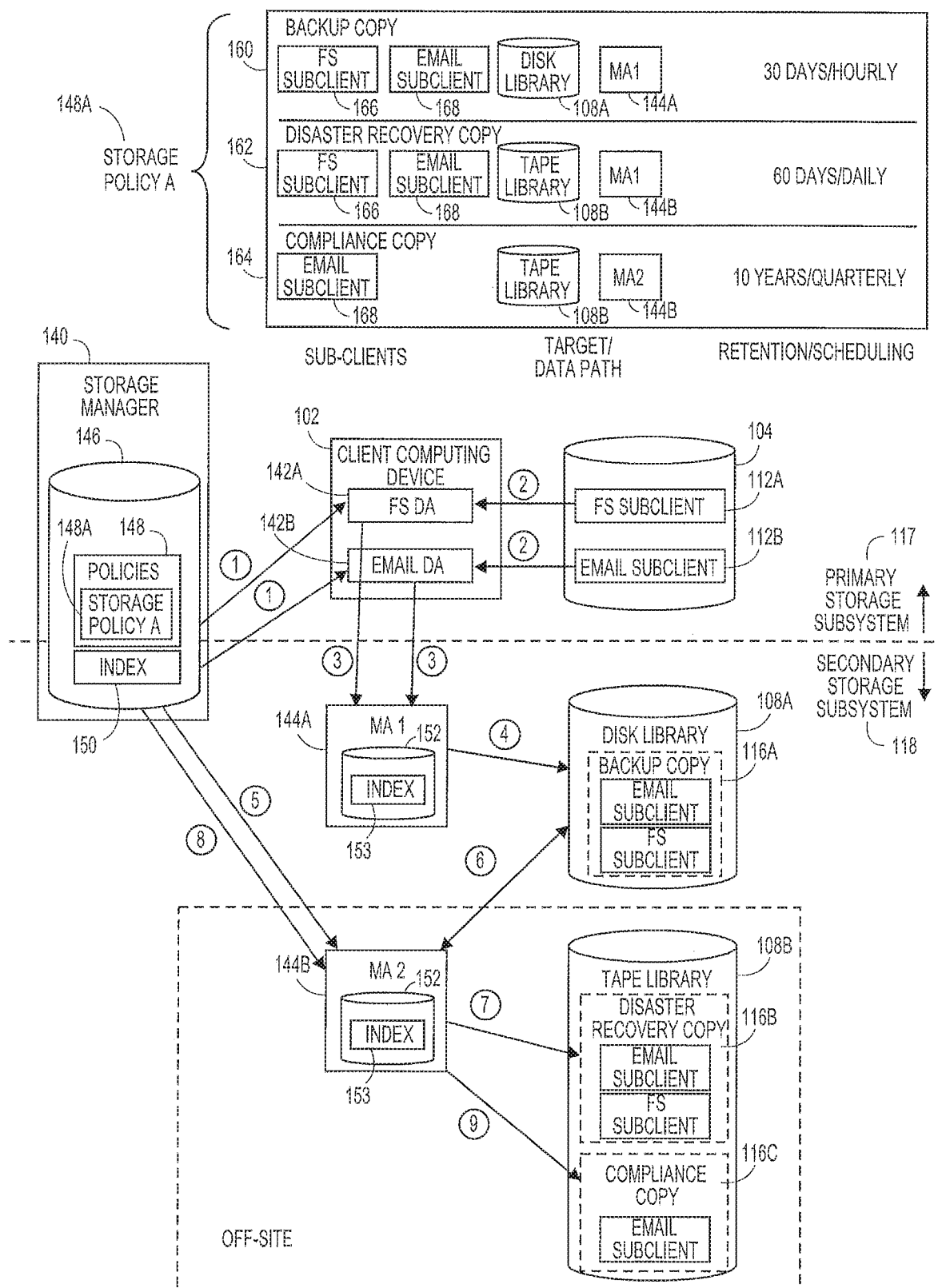
FIG. 1E illustrates certain secondary copy operations according to an exemplary storage policy.

FIG. 1E includes a data flow diagram depicting performance of secondary copy operations by an embodiment of information management system 100, according to an exemplary storage policy 148A. System 100 includes a storage manager 140, a client computing device 102 having a file system data agent 142A and an email data agent 142B operating thereon, a primary storage device 104, two media agents 144A, 144B, and two secondary storage devices 108: a disk library 108A and a tape library 108B. As shown, primary storage device 104 includes primary data 112A, which is associated with a logical grouping of data associated with a file system ("file system subclient"), and primary data 112B, which is a logical grouping of data associated with email ("email subclient"). The techniques described with respect to FIG. 1E can be utilized in conjunction with data that is otherwise organized as well.

As indicated by the dashed box, the second media agent 144B and tape library 108B are "off-site," and may be remotely located from the other components in system 100 (e.g., in a different city, office building, etc.). Indeed, "off-site" may refer to a magnetic tape located in remote storage, which must be manually retrieved and loaded into a tape drive to be read. In this manner, information stored on the tape library 108B may provide protection in the event of a disaster or other failure at the main site(s) where data is stored.

The file system subclient 112A in certain embodiments generally comprises information generated by the file system and/or operating system of client computing device 102, and can include, for example, file system data (e.g., regular files, file tables, mount points, etc.), operating system data (e.g., registries, event logs, etc.), and the like. The e-mail subclient 112B can include data generated by an e-mail application operating on client computing device 102, e.g., mailbox information, folder information, emails, attachments, associated database information, and the like. As described above, the subclients can be logical containers, and the data included in the corresponding primary data 112A and 112B may or may not be stored contiguously.

The exemplary storage policy 148A includes backup copy preferences (or rule set) 160, disaster recovery copy preferences or rule set 162, and compliance copy preferences or rule set 164. Backup copy rule set 160 specifies that it is associated with file system subclient 166 and email subclient 168. Each of subclients 166 and 168 are associated with the particular client computing device 102. Backup copy rule set 160 further specifies that the backup operation will be written to disk library 108A and designates a particular media agent 144A to convey the data to disk library 108A. Finally, backup copy rule set 160 specifies that backup copies created according to rule set 160 are scheduled to be generated hourly and are to be retained for 30 days. In some other embodiments, scheduling information is not included in storage policy 148A and is instead specified by a separate scheduling policy.

Disaster recovery copy rule set 162 is associated with the same two subclients 166 and 168. However, disaster recovery copy rule set 162 is associated with tape library 108B, unlike backup copy rule set 160. Moreover, disaster recovery copy rule set 162 specifies that a different media agent, namely 144B, will convey data to tape library 108B. Disaster recovery copies created according to rule set 162 will be retained for 60 days and will be generated daily. Disaster recovery copies generated according to disaster recovery copy rule set 162 can provide protection in the event of a disaster or other catastrophic data loss that would affect the backup copy 116A maintained on disk library 108A.

Compliance copy rule set 164 is only associated with the email subclient 168, and not the file system subclient 166. Compliance copies generated according to compliance copy rule set 164 will therefore not include primary data 112A from the file system subclient 166. For instance, the organization may be under an obligation to store and maintain copies of email data for a particular period of time (e.g., 10 years) to comply with state or federal regulations, while similar regulations do not apply to file system data. Compliance copy rule set 164 is associated with the same tape library 108B and media agent 144B as disaster recovery copy rule set 162, although a different storage device or media agent could be used in other embodiments. Finally, compliance copy rule set 164 specifies that copies generated under compliance copy rule set 164 will be retained for 10 years and will be generated quarterly.

Secondary Copy Jobs

A logical grouping of secondary copy operations governed by a rule set and being initiated at a point in time may be referred to as a "secondary copy job" and sometimes may be called a "backup job," even though it is not necessarily limited to creating backup copies. Secondary copy jobs may be initiated on demand as well. Steps 1-9 below illustrate three secondary copy jobs based on storage policy 148A.

At step 1, storage manager 140 initiates a backup job according to the backup copy rule set 160, which logically comprises all the secondary copy operations necessary to effectuate rules 160 in storage policy 148A every hour, including steps 1-4occurring hourly. For instance, a scheduling service running on storage manager 140 accesses backup copy rule set 160 or a separate scheduling policy associated with client computing device 102 and initiates a backup job on an hourly basis. Thus, at the scheduled time, storage manager 140 sends instructions to client computing device 102 (i.e., to both data agent 142A and data agent 142B) to begin the backup job.

At step 2, file system data agent 142A and email data agent 142B operating on client computing device 102 respond to the instructions received from storage manager 140 by accessing and processing the respective subclient primary data 112A and 112B involved in the backup copy operation, which can be found in primary storage device 104. Because the secondary copy operation is a backup copy operation, the data agent(s) 142A, 142B may format the data into a backup format or otherwise process the data suitable for a backup copy.

At step 3, client computing device 102 (e.g., using file system data agent 142A) communicates the processed data to the first media agent 144A according to backup copy rule set 160, as directed by storage manager 140. Storage manager 140 may further keep a record in management database 146 of the association between media agent 144A and one or more of: client computing device 102, file system data agent 142A, and/or backup copy 116A.

The target media agent 144A receives the data-agent-processed data from client computing device 102, and at step 4generates and conveys backup copy 116A to disk library 108A to be stored as backup copy 116A, again at the direction of storage manager 140 and according to backup copy rule set 160. Media agent 144A can also update its index 153 to include data and/or metadata related to backup copy 116A, such as information indicating where the backup copy 116A resides on disk library 108A, data and metadata for cache retrieval, etc. Storage manager 140 may similarly update its index 150 to include information relating to the secondary copy operation, such as information relating to the type of operation, a physical location associated with one or more copies created by the operation, the time the operation was performed, status information relating to the operation, the components involved in the operation, and the like. In some cases, storage manager 140 may update its index 150 to include some or all of the information stored in index 153 of media agent 144A. At this point, the backup job may be considered complete. After the 30-day retention period expires, storage manager 140 instructs media agent 144A to delete backup copy 116A from disk library 108A and indexes 150 and/or 153 are updated accordingly.

At step 5, storage manager 140 initiates another backup job according to the disaster recovery rule set 162. Illustratively this includes steps 5-7 occurring daily for creating disaster recovery copy 116B. Disaster recovery copy 116B will be based on backup copy 116A and not on primary data 112A and 112B.

At step 6, illustratively based on instructions received from storage manager 140 at step 5, the specified media agent 144B retrieves the most recent backup copy 116A from disk library 108A.

At step 7, again at the direction of storage manager 140 and as specified in disaster recovery copy rule set 162, media agent 144B uses the retrieved data to create a disaster recovery copy 116B and store it to tape library 108B. In some cases, disaster recovery copy 116B is a direct, mirror copy of backup copy 116A, and remains in the backup format. In other embodiments, disaster recovery copy 1166 may be generated in some other manner, such as by using primary data 112A, 112B from primary storage device 104 as source data. The disaster recovery copy operation is initiated once a day and disaster recovery copies 1166 are deleted after 60 days; indexes 153 and/or 150 are updated accordingly when/after each information management operation is executed and/or completed. The present backup job may be considered to be complete.

At step 8, storage manager 140 initiates another backup job according to compliance rule set 164, which includes steps 8-9 occurring quarterly for creating compliance copy 116C. For instance, storage manager 140 instructs media agent 144B to create compliance copy 116C on tape library 108B, as specified in the compliance copy rule set 164.

At step 9 in the example, compliance copy 116C is generated using disaster recovery copy 116B as the source. In other embodiments, compliance copy 116C is instead generated using primary data 112B corresponding to the email subclient or using backup copy 116A from disk library 108A as source data. As specified in the illustrated example, compliance copies 116C are created quarterly, and are deleted after ten years, and indexes 153 and/or 150 are kept up-to-date accordingly.

Exemplary Applications of Storage Policies—Information Governance Policies and Classification Storage manager 140 may permit a user to specify aspects of storage policy 148A. For example, the storage policy can be modified to include information governance policies to define how data should be managed in order to comply with a certain regulation or business objective. The various policies may be stored, for example, in management database 146. An information governance policy may align with one or more compliance tasks that are imposed by regulations or business requirements. Examples of information governance policies might include a Sarbanes-Oxley policy, a HIPAA policy, an electronic discovery (e-discovery) policy, and so on.

Information governance policies allow administrators to obtain different perspectives on an organization's online and offline data, without the need for a dedicated data silo created solely for each different viewpoint. As described previously, the data storage systems herein build an index that reflects the contents of a distributed data set that spans numerous clients and storage devices, including both primary data and secondary copies, and online and offline copies. An organization may apply multiple information governance policies in a top-down manner over that unified data set and indexing schema in order to view and manipulate the data set through different lenses, each of which is adapted to a particular compliance or business goal. Thus, for example, by applying an e-discovery policy and a Sarbanes-Oxley policy, two different groups of users in an organization can conduct two very different analyses of the same underlying physical set of data/copies, which may be distributed throughout the information management system.

An information governance policy may comprise a classification policy, which defines a taxonomy of classification terms or tags relevant to a compliance task and/or business objective. A classification policy may also associate a defined tag with a classification rule. A classification rule defines a particular combination of criteria, such as users who have created, accessed or modified a document or data object; file or application types; content or metadata keywords; clients or storage locations; dates of data creation and/or access; review status or other status within a workflow (e.g., reviewed or un-reviewed); modification times or types of modifications; and/or any other data attributes in any combination, without limitation. A classification rule may also be defined using other classification tags in the taxonomy. The various criteria used to define a classification rule may be combined in any suitable fashion, for example, via Boolean operators, to define a complex classification rule. As an example, an e-discovery classification policy might define a classification tag "privileged" that is associated with documents or data objects that (1) were created or modified by legal department staff, or (2) were sent to or received from outside counsel via email, or (3) contain one of the following keywords: "privileged" or "attorney" or "counsel," or other like terms. Accordingly, all these documents or data objects will be classified as "privileged."

One specific type of classification tag, which may be added to an index at the time of indexing, is an "entity tag." An entity tag may be, for example, any content that matches a defined data mask format. Examples of entity tags might include, e.g., social security numbers (e.g., any numerical content matching the formatting mask XXX-XX-XXXX), credit card numbers (e.g., content having a 13-16 digit string of numbers), SKU numbers, product numbers, etc. A user may define a classification policy by indicating criteria, parameters or descriptors of the policy via a graphical user interface, such as a form or page with fields to be filled in, pull-down menus or entries allowing one or more of several options to be selected, buttons, sliders, hypertext links or other known user interface tools for receiving user input, etc. For example, a user may define certain entity tags, such as a particular product number or project ID code that is relevant in the organization. In some implementations, the classification policy can be implemented using cloud-based techniques. For example, the storage devices may be cloud storage devices, and the storage manager 140 may execute cloud service provider API over a network to classify data stored on cloud storage devices.

Restore Operations from Secondary Copies

While not shown in FIG. 1E, at some later point in time, a restore operation can be initiated involving one or more of secondary copies 116A, 116B, 116C. A restore operation logically takes a selected secondary copy 116, reverses the effects of the secondary copy operation that created it, and stores the restored data to primary storage where a client computing device 102 may properly access it as primary data. A media agent 144 and an appropriate data agent 142 (e.g., executing on the client computing device 102) perform the tasks needed to complete a restore operation. For example, data that was encrypted, compressed, and/or deduplicated in the creation of secondary copy 116 will be correspondingly rehydrated (reversing deduplication), uncompressed, and unencrypted into a format appropriate to primary data. In general, restored data should be indistinguishable from other primary data 112. Preferably, the restored data has fully regained the native format that may make it immediately usable by application 110.

As one example, a user may manually initiate a restore of backup copy 116A, e.g., by interacting with user interface 158 of storage manager 140 or with a web-based console with access to system 100. Storage manager 140 may accesses data in its index 150 and/or management database 146 (and/or the respective storage policy 148A) associated with the selected backup copy 116A to identify the appropriate media agent 144A and/or secondary storage device 108A where the secondary copy resides. The user may be presented with a representation (e.g., stub, thumbnail, listing, etc.) and metadata about the selected secondary copy, in order to determine whether this is the appropriate copy to be restored, e.g., date that the original primary data was created. Storage manager 140 will then instruct media agent 144A and an appropriate data agent 142 to restore secondary copy 116A to primary storage device 104. A media agent may be selected for use in the restore operation based on a load balancing algorithm, an availability based algorithm, or other criteria. The selected media agent, e.g., 144A, retrieves secondary copy 116A from disk library 108A. For instance, media agent 144A may access its index 153 to identify a location of backup copy 116A on disk library 108A, or may access location information residing on disk library 108A itself.

In some cases when backup copy 116A was recently created or accessed, caching may speed up the restore operation. In such a case, media agent 144A accesses a cached version of backup copy 116A residing in index 153, without having to access disk library 108A for some or all of the data. Once it has retrieved backup copy 116A, the media agent 144A communicates the data to the requesting client computing device 102. Upon receipt, file system data agent 142A and email data agent 142B may unpackage (e.g., restore from a backup format to the native application format) the data in backup copy 116A and restore the unpackaged data to primary storage device 104. In general, secondary copies 116 may be restored to the same volume or folder in primary storage device 104 from which the secondary copy was derived; to another storage location or client computing device 102; to shared storage. In some cases the data may be restored so that it may be used by an application 110 of a different version/vintage from the application that created the original primary data 112.

Exemplary Secondary Copy Formatting

The formatting and structure of secondary copies 116 can vary depending on the embodiment. In some cases, secondary copies 116 are formatted as a series of logical data units or "chunks" (e.g., 512 MB, 1 GB, 2 GB, 4 GB, or 8 GB chunks). This can facilitate efficient communication and writing to secondary storage devices 108, e.g., according to resource availability. For example, a single secondary copy 116 may be written on a chunk-by-chunk basis to one or more secondary storage devices 108. In some cases, users can select different chunk sizes, e.g., to improve throughput to tape storage devices. Generally, each chunk can include a header and a payload. The payload can include files (or other data units) or subsets thereof included in the chunk, whereas the chunk header generally includes metadata relating to the chunk, some or all of which may be derived from the payload. For example, during a secondary copy operation, media agent 144, storage manager 140, or other component may divide files into chunks and generate headers for each chunk by processing the files. The headers can include a variety of information such as file identifier(s), volume(s), offset(s), or other information associated with the payload data items, a chunk sequence number, etc. Importantly, in addition to being stored with secondary copy 116 on secondary storage device 108, the chunk headers can also be stored to index 153 of the associated media agent(s) 144 and/or to index 150 associated with storage manager 140. This can be useful in some cases for providing faster processing of secondary copies 116 during browsing, restores, or other operations. In some cases, once a chunk is successfully transferred to a secondary storage device 108, the secondary storage device 108 returns an indication of receipt, e.g., to media agent 144 and/or storage manager 140, which may update their respective indexes 153, 150 accordingly. During restore, chunks may be processed (e.g., by media agent 144) according to the information in the chunk header to reassemble the files.

Data can also be communicated within system 100 in data channels that connect client computing devices 102 to secondary storage devices 108. These data channels can be referred to as "data streams," and multiple data streams can be employed to parallelize an information management operation, improving data transfer rate, among other advantages. Example data formatting techniques including techniques involving data streaming, chunking, and the use of other data structures in creating secondary copies are described in U.S. Pat. Nos. 7,315,923 8,156,086, and 8,578,120.

Figure 1F:
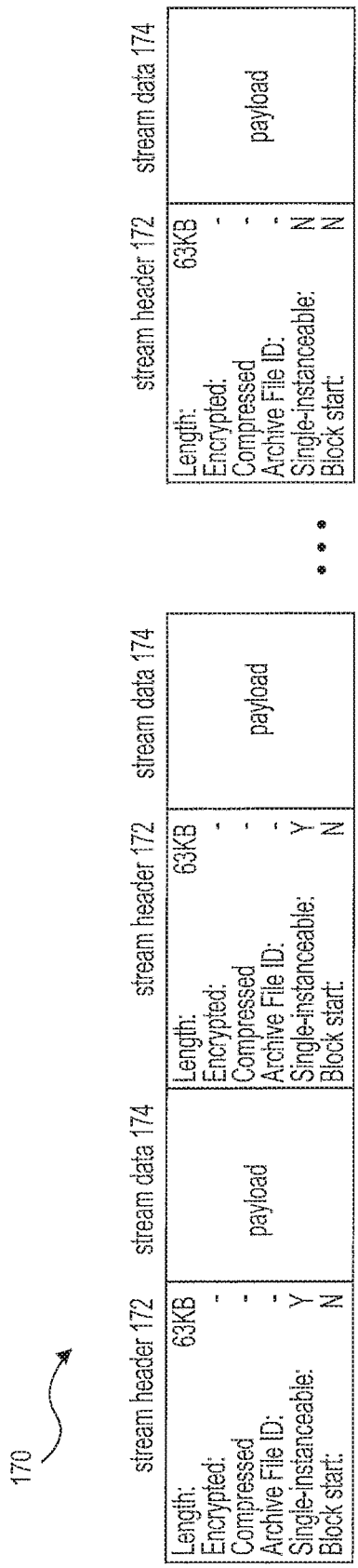
FIGS. 1F-1H are block diagrams illustrating suitable data structures that may be employed by the information management system.
Figure 1G:
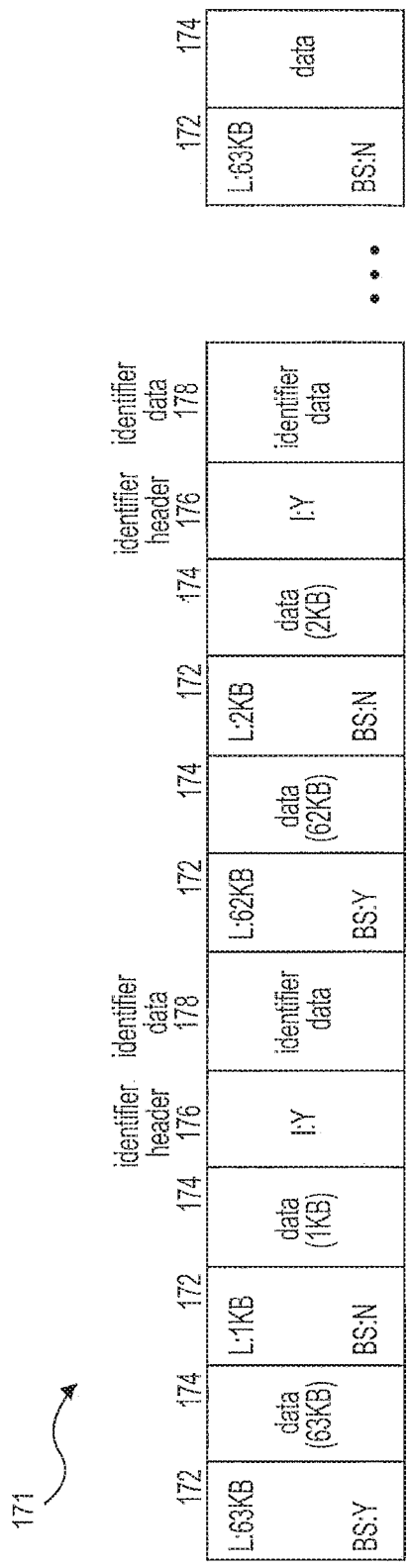

FIGS. 1F and 1G are diagrams of example data streams 170 and 171, respectively, which may be employed for performing information management operations. Referring to FIG. 1F, data agent 142 forms data stream 170 from source data associated with a client computing device 102 (e.g., primary data 112). Data stream 170 is composed of multiple pairs of stream header 172 and stream data (or stream payload) 174. Data streams 170 and 171 shown in the illustrated example are for a single-instanced storage operation, and a stream payload 174 therefore may include both single-instance (SI) data and/or non-SI data. A stream header 172 includes metadata about the stream payload 174. This metadata may include, for example, a length of the stream payload 174, an indication of whether the stream payload 174 is encrypted, an indication of whether the stream payload 174 is compressed, an archive file identifier (ID), an indication of whether the stream payload 174 is single instanceable, and an indication of whether the stream payload 174 is a start of a block of data.

Referring to FIG. 1G, data stream 171 has the stream header 172 and stream payload 174 aligned into multiple data blocks. In this example, the data blocks are of size 64 KB. The first two stream header 172 and stream payload 174 pairs comprise a first data block of size 64 KB. The first stream header 172 indicates that the length of the succeeding stream payload 174 is 63 KB and that it is the start of a data block. The next stream header 172 indicates that the succeeding stream payload 174 has a length of 1 KB and that it is not the start of a new data block. Immediately following stream payload 174 is a pair comprising an identifier header 176 and identifier data 178. The identifier header 176 includes an indication that the succeeding identifier data 178 includes the identifier for the immediately previous data block. The identifier data 178 includes the identifier that the data agent 142 generated for the data block. The data stream 171 also includes other stream header 172 and stream payload 174 pairs, which may be for SI data and/or non-SI data.

Figure 1H:
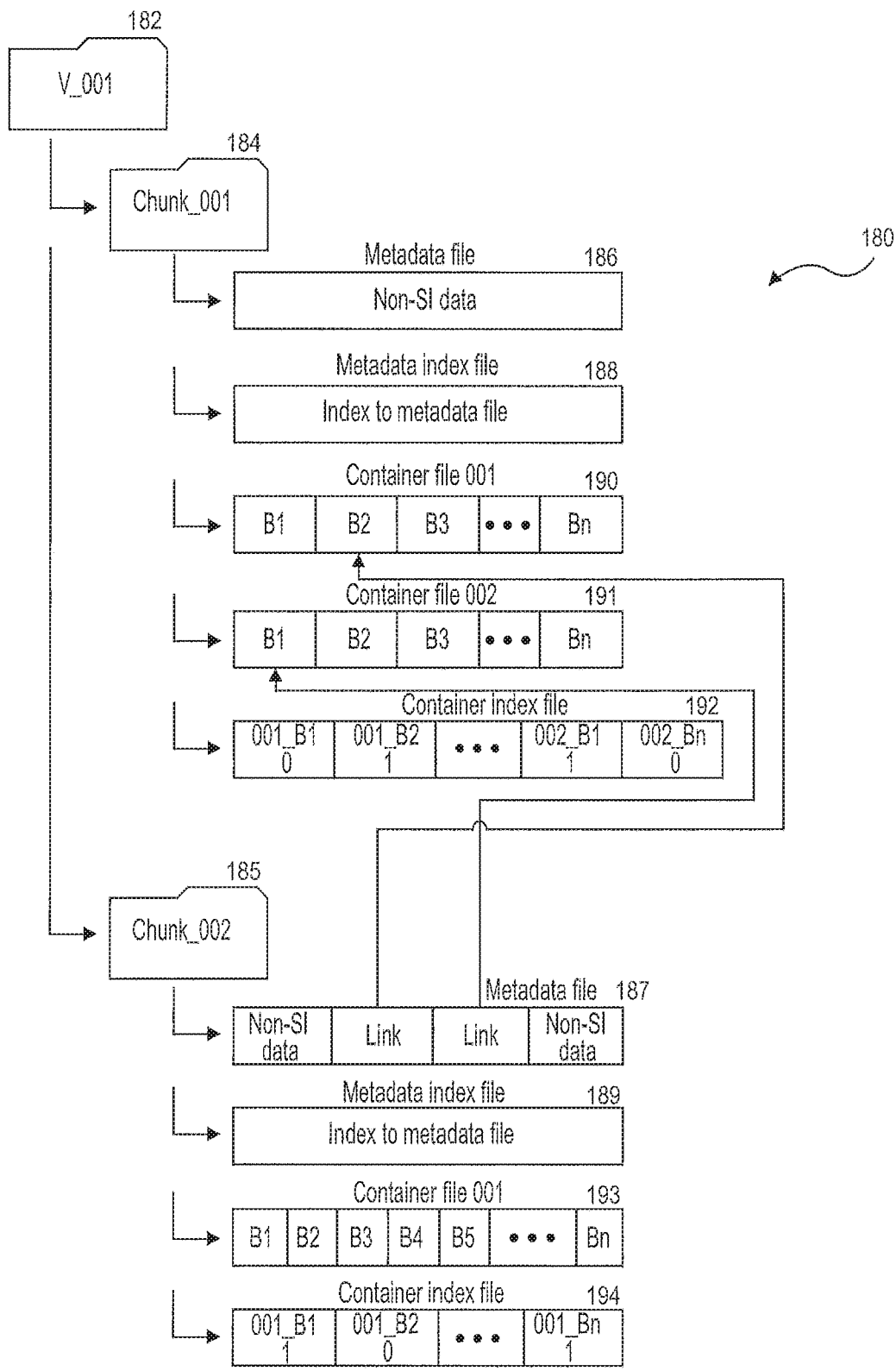

FIG. 1H is a diagram illustrating data structures 180 that may be used to store blocks of SI data and non-SI data on a storage device (e.g., secondary storage device 108). According to certain embodiments, data structures 180 do not form part of a native file system of the storage device. Data structures 180 include one or more volume folders 182, one or more chunk folders 184/185 within the volume folder 182, and multiple files within chunk folder 184. Each chunk folder 184/185 includes a metadata file 186/187, a metadata index file 188/189, one or more container files 190/191/193, and a container index file 192/194. Metadata file 186/187 stores non-SI data blocks as well as links to SI data blocks stored in container files. Metadata index file 188/189 stores an index to the data in the metadata file 186/187. Container files 190/191/193 store SI data blocks. Container index file 192/194 stores an index to container files 190/191/193. Among other things, container index file 192/194 stores an indication of whether a corresponding block in a container file 190/191/193 is referred to by a link in a metadata file 186/187. For example, data block B2 in the container file 190 is referred to by a link in metadata file 187 in chunk folder 185. Accordingly, the corresponding index entry in container index file 192 indicates that data block B2 in container file 190 is referred to. As another example, data block B1 in container file 191 is referred to by a link in metadata file 187, and so the corresponding index entry in container index file 192 indicates that this data block is referred to.

As an example, data structures 180 illustrated in FIG. 1H may have been created as a result of separate secondary copy operations involving two client computing devices 102. For example, a first secondary copy operation on a first client computing device 102 could result in the creation of the first chunk folder 184, and a second secondary copy operation on a second client computing device 102 could result in the creation of the second chunk folder 185. Container files 190/191 in the first chunk folder 184 would contain the blocks of SI data of the first client computing device 102. If the two client computing devices 102 have substantially similar data, the second secondary copy operation on the data of the second client computing device 102 would result in media agent 144 storing primarily links to the data blocks of the first client computing device 102 that are already stored in the container files 190/191. Accordingly, while a first secondary copy operation may result in storing nearly all of the data subject to the operation, subsequent secondary storage operations involving similar data may result in substantial data storage space savings, because links to already stored data blocks can be stored instead of additional instances of data blocks.

If the operating system of the secondary storage computing device 106 on which media agent 144 operates supports sparse files, then when media agent 144 creates container files 190/191/193, it can create them as sparse files. A sparse file is a type of file that may include empty space (e.g., a sparse file may have real data within it, such as at the beginning of the file and/or at the end of the file, but may also have empty space in it that is not storing actual data, such as a contiguous range of bytes all having a value of zero). Having container files 190/191/193 be sparse files allows media agent 144 to free up space in container files 190/191/193 when blocks of data in container files 190/191/193 no longer need to be stored on the storage devices. In some examples, media agent 144 creates a new container file 190/191/193 when a container file 190/191/193 either includes 100 blocks of data or when the size of the container file 190 exceeds 50 MB. In other examples, media agent 144 creates a new container file 190/191/193 when a container file 190/191/193 satisfies other criteria (e.g., it contains from approximately 100 to approximately 1000 blocks or when its size exceeds approximately 50 MB to 1 GB). In some cases, a file on which a secondary copy operation is performed may comprise a large number of data blocks. For example, a 100 MB file may comprise 400 data blocks of size 256 KB. If such a file is to be stored, its data blocks may span more than one container file, or even more than one chunk folder. As another example, a database file of 20 GB may comprise over 40,000 data blocks of size 512 KB. If such a database file is to be stored, its data blocks will likely span multiple container files, multiple chunk folders, and potentially multiple volume folders. Restoring such files may require accessing multiple container files, chunk folders, and/or volume folders to obtain the requisite data blocks.

Using Backup Data for Replication and Disaster Recovery ("Live Synchronization")

There is an increased demand to offload resource intensive information management tasks (e.g., data replication tasks) away from production devices (e.g., physical or virtual client computing devices) in order to maximize production efficiency. At the same time, enterprises expect access to readily available, up-to-date recovery copies in the event of failure, with little or no production downtime.

Figure 2A:
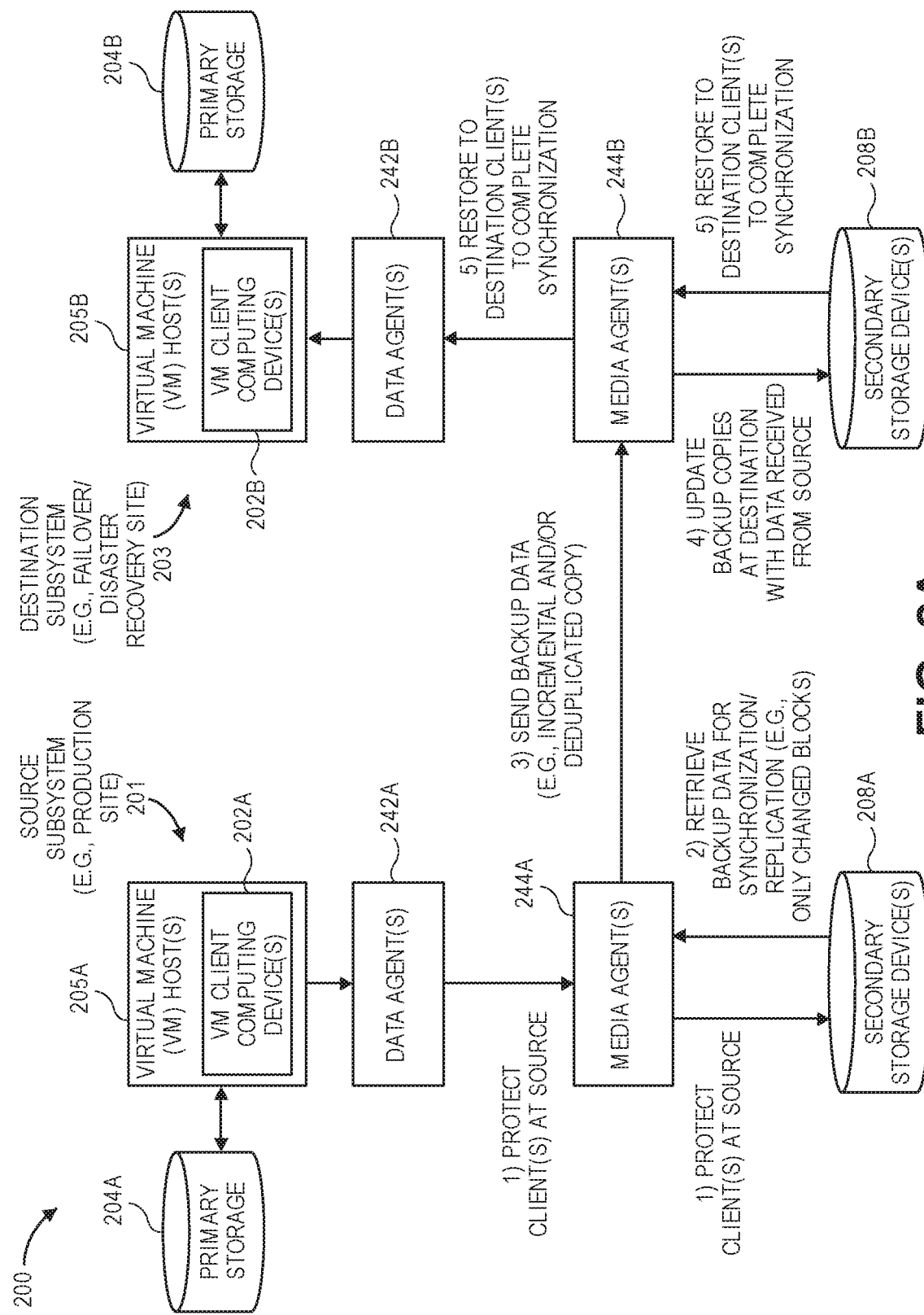
FIG. 2A illustrates a system and technique for synchronizing primary data to a destination such as a failover site using secondary copy data.

FIG. 2A illustrates a system 200 configured to address these and other issues by using backup or other secondary copy data to synchronize a source subsystem 201 (e.g., a production site) with a destination subsystem 203 (e.g., a failover site). Such a technique can be referred to as "live synchronization" and/or "live synchronization replication." In the illustrated embodiment, the source client computing devices 202a include one or more virtual machines (or "VMs") executing on one or more corresponding VM host computers 205a. The destination site 203 may be at a location that is remote from the production site 201, for example, but may be located in the same data center, without limitation. One or more of the production site 201 and destination site 203 may reside at data centers at known geographic locations, or alternatively may operate "in the cloud."

The synchronization can be achieved by generally applying an ongoing stream of incremental backups from the source subsystem 201 to the destination subsystem 203, such as according to what can be referred to as an "incremental forever" approach. FIG. 2A illustrates an embodiment of a data flow which may be orchestrated at the direction of one or more storage managers (not shown). At step 1 the source data agent(s) 242a and source media agent(s) 244a work together to write backup or other secondary copies of the primary data generated by the source client computing devices 202a into the source secondary storage device(s) 208a. At step 2 the backup data is retrieved by the source media agent(s) 244a, and at step 3 the source media agent(s) 244a communicate the backup data across a network to the destination media agent(s) 244b in the destination subsystem 203.

As shown, the data can be copied in an incremental fashion, such that only changed blocks are transmitted. An example of live synchronization of virtual machines is found in U.S. Patent Application No. 62/265,339 entitled "Live Synchronization and Management of Virtual Machines across Computing and Virtualization Platforms and Using Live Synchronization to Support Disaster Recovery," which is incorporated by reference in its entirety herein. Moreover, a deduplicated copy can be employed. For instance, the system can utilize one or more of the deduplicated copy techniques described in U.S. Pat. No. 9,239,687, entitled "Systems and Methods for Retaining and Using Data Block Signatures in Data Protection Operations," which is incorporated by reference herein in its entirety. At step 4 the destination media agent(s) 244b write the backup data to the destination secondary storage device(s) 208b. At step 5 the synchronization is completed when the destination media agent(s) and destination data agent(s) 242 restore the backup data to the client computing device(s) 202b. This synchronization/replication process can incorporate the techniques described in U.S. patent application Ser. No. 14/721,971, entitled "Replication Using Deduplicated Secondary Copy Data," which is incorporated by reference herein in its entirety.

Where the incremental backups are applied on a frequent, on-going basis, the synchronized copies can be viewed as mirror or replication copies. Moreover, by applying the incremental backups to the destination site 203 using backup data (or other secondary copy data), the production site 201 is not burdened with the synchronization operations. Because the failover site 203 can be maintained in a synchronized, "warm" state, the downtime for switching over from the production site 201 to the destination site 203 is substantially less than with a typical restore from secondary storage. Thus, the production site 201 may flexibly and efficiently fail over, with minimal downtime and with relatively up-to-date data, to a destination site 203, such as a cloud-based failover site. The destination site 203 can then be reverse synchronized back to the production site 201, such as after repairs have been implemented or after the failure has passed.

Highly Scalable Managed Data Pool Architecture

Figure 2B:
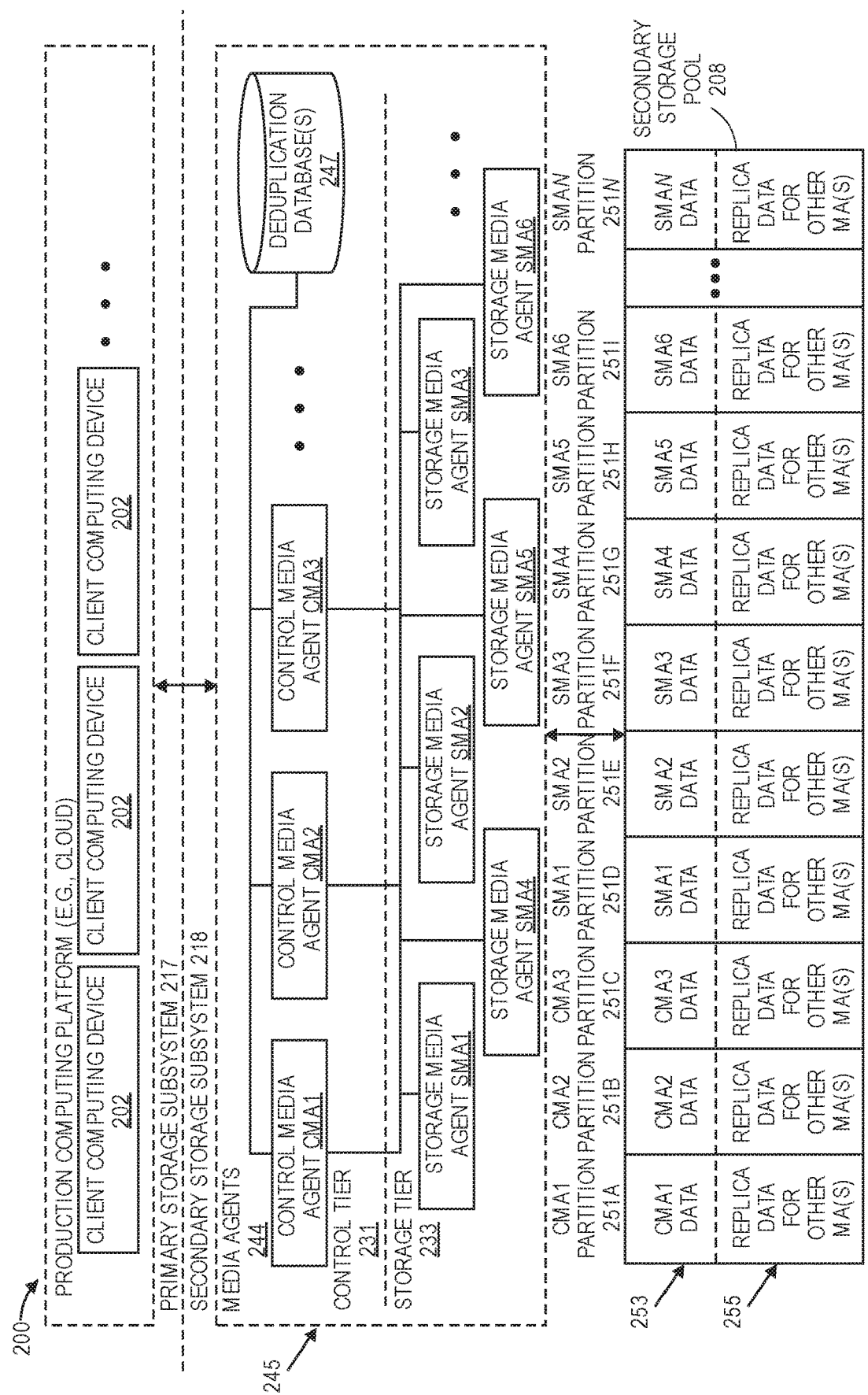
FIG. 2B is a block diagram of an example of a highly scalable managed data pool architecture.

Enterprises are seeing explosive data growth in recent years, often from various applications running in geographically distributed locations. FIG. 2B shows a block diagram of an example of a highly scalable, managed data pool architecture useful in accommodating such data growth. The illustrated system 200, which may be referred to as a "web-scale" architecture according to certain embodiments, can be readily incorporated into both open compute/storage and common-cloud architectures.

The illustrated system 200 includes a grid 245 of media agents 244 logically organized into a control tier 231 and a secondary or storage tier 233. Media agents assigned to the storage tier 233 can be configured to manage a secondary storage pool 208 as a deduplication store, and be configured to receive client write and read requests from the primary storage subsystem 217, and direct those requests to the secondary tier 233 for servicing. For instance, media agents CMA1-CMA3 in the control tier 231 maintain and consult one or more deduplication databases 247, which can include deduplication information (e.g., data block hashes, data block links, file containers for deduplicated files, etc.) sufficient to read deduplicated files from the secondary storage pool 208 and write deduplicated files to the secondary storage pool 208. For instance, the system 200 can incorporate any of the deduplication systems and methods shown and described in greater detail in U.S. Pat. No. 9,020,900, entitled "Distributed Deduplicated Storage System," and U.S. Pat. Pub. No. 2014/0201170, entitled "High Availability Distributed Deduplicated Storage System," the entireties of which are hereby incorporated by reference herein.

Media agents SMA1-SMA6 assigned to the secondary tier 233 receive write and read requests from the media agents CMA1-CMA3 in the control tier 231, and access the secondary storage pool 208 to service those requests. The media agents CMA1-CMA3 in the control tier 231 can also be connected to the secondary storage pool 208, and may execute read and write requests themselves (e.g., in response to requests from other control media agents CMA1-CMA3) in addition to issuing requests to the media agents in the secondary tier 233. Moreover, while shown as separate from the secondary storage pool 208, the deduplication database(s) 247 can in some cases reside in storage devices in the secondary storage pool 208.

As shown, each of the media agents 244 (e.g., CMA1-CMA3 and SMA1-SMA6) in the grid 245 can be allocated a corresponding dedicated partition 251A-251I, respectively, in the secondary storage pool 208. Each partition 251 can include a first portion 253 containing data associated with (e.g., stored by) the media agent 244 corresponding to the respective partition 251. The system 200 can also implement a desired level of replication, thereby providing redundancy in the event of a failure of a media agent 244 in the grid 245. Along these lines, each partition 251 can further include a second portion 255 storing one or more replication copies of the data associated with one or more other media agents 244 in the grid.

The system 200 can also be configured to allow for seamless addition of media agents 244 to the grid 245 via automatic configuration. As one illustrative example, a storage manager (not shown) or other appropriate component may determine that it is appropriate to add an additional node to the control tier 231, and perform some or all of the following: (i) assess the capabilities of a newly added or otherwise available computing device as satisfying a minimum criteria to be configured as or hosting a media agent in the control tier 231; (ii) confirm that a sufficient amount of the appropriate type of storage exists to support an additional node in the control tier 231 (e.g., enough disk drive capacity exists in the storage pool 208 to support an additional deduplication database 247); (iii) install appropriate media agent software on the computing device and configure the computing device according to a pre-determined template; (iv) establish a partition 251 in the storage pool 208 dedicated to the newly established media agent 244; and (v) build any appropriate data structures (e.g., an instance of the deduplication database 247). An example of highly scalable managed data pool architecture or so-called web-scale architecture for storage and data management is found in U.S. Patent Application No. 62/273,286 entitled "Redundant and Robust Distributed Deduplication Data Storage System," which is incorporated by reference in its entirety herein.

The embodiments and components thereof disclosed in FIGS. 2A and 2B, as well as those in FIGS. 1A-1H, may be implemented in any combination and permutation to satisfy data storage management and information management needs at one or more locations and/or data centers.

Overview of Infinite Backup Using Network File System (NFS) Protocol

In some existing implementations, creating a backup of primary data stored on a computing device may be performed or facilitated by special software (e.g., data agent 142 of FIG. 1C) installed on the computing device. As discussed in the present disclosure, one or more data agents can be configured to assist the data protection (or other information management) operations based on the type of data that is being protected, at a client-specific and/or application-specific level. Such data agents may comprise any of the data agent(s) 142 described in the present disclosure.

In some embodiments of the present disclosure, improved data protection operations (also referred to herein as "infinite" backup operations) may be performed by the applications running on the computing device using standard protocols such as the Network File System (NFS) protocol. NFS is a distributed file system protocol that allows access to files over a network as if the files were stored locally. For example, the mount command provided by the NFS protocol may be executed by a computing device (e.g., a client computing device storing client data to be backed up) to mount a shared NFS directory implemented by another computing device (e.g., a secondary storage device onto which the client data is to be backed up) connected to the computing device over a network. In such embodiments, the data agent(s) 142 described in the present disclosure may be remotely located from the computing device running the applications. If the primary storage associated with the computing device is implemented by other computing system(s) (e.g., a cloud storage system), the data agent(s) 142 may be remotely located from such computing system(s).

After the computing device has mounted the shared NFS directory, the computing device can access the shared NFS directory as if the shared NFS directory were a local directory on the computing device. For example, the computing device may copy data files from a local directory (e.g., stored in a primary data storage device attached to the computing device) over to the shared NFS directory. Once such data files have been copied over to the shared NFS directory, another computing device that has access to the shared NFS directory may perform data protection (or other information management) operations such as copying, archiving, migrating, replicating, encrypting, compressing, and/or deduplicating of the data files. For example, the application running on the client computing device can be configured to simply back up client data to the shared NFS directory according to a backup schedule, in response to instructions, or automatically, without being constrained by a fixed backup window or other storage/timing restrictions, thereby achieving an "infinite" backup.

By performing data protection operations using a standard protocol that is supported by various operating systems and applications without installation of special software, the need to install such special software on the client computing device to facilitate the data protection operations associated with such operating systems and applications can be eliminated. According to the various embodiments described herein, such operating systems and applications can store the data that is to be protected in a shared network directory that has been mounted (or otherwise made accessible/available) using a standard protocol, and data agents and/or media agents described herein can cause the data to be stored in a secondary storage location.

Although the NFS protocol is used as an example protocol that may be used to perform the infinite backup (or other information management) operations described herein, the techniques of the present disclosure may be extended to any other standard protocols used for data transfer and/or data sharing. Certain example embodiments for implementing the improved backup process are described below with reference to FIGS. 3-6.

An Exemplary System for Implementing Improved Backup Process

FIG. 3 is a block diagram illustrating an exemplary system 300 configured to implement a data backup process in accordance with one or more embodiments disclosed herein. As illustrated, the exemplary system 300 includes a client computing device 302, a cloud storage system 304, a storage manager 306, a data agent 308, a media agent 310, and a secondary storage device 312. The client computing device 302 and/or the cloud storage system 304 may generally be referred to in some cases as a primary storage subsystem 300A, and some or all of the storage manager 306, the data agent 308, the media agent 310, and the secondary storage device 312 may sometimes be referred to as a secondary storage subsystem 300B. In some embodiments, the storage manager 306 may be part of the primary storage subsystem 300A instead of the secondary storage subsystem 300B, or may be part of neither the primary storage subsystem 300A nor the secondary storage subsystem 300B.

The client computing device 302 includes an application 314, NFS path data 318, and a primary storage device 316 storing data associated with the application 314. In some embodiments, the client computing device 302 may be a virtual machine running the application 314. Although not illustrated in FIG. 3, the client computing device 302 may further include one or more additional applications.

The application 314 may be a database application, a mail application, or any other application that may be installed on the client computing device 302. The application 314 may generate application data (e.g., files containing information generated or processed by the application 314) and store such application data in the primary storage device 316. The application data stored in the primary storage device 316 may be referred to herein as primary data. Alternatively, or additionally, a secondary copy of the application data may be created by causing the application data to be transferred over a network connection and stored at least partially on a secondary storage device (e.g., the secondary storage device 312), via a backup copy operation or another type of appropriate secondary copy operation. Such a secondary copy may be referred to herein as secondary data.

The application 314 may be capable of executing commands according to standard protocols such as the NFS protocol. For example, the application 314 may be configured to execute a series of commands to export the application data associated with the application 314 to a local directory or a remote storage location. In such an example, the application 314 may execute a mount command provided by the NFS protocol to mount a shared NFS directory implemented by another computing device (e.g., the data agent 308, the media agent 310, or the secondary storage device 312) and copy or export its application data onto the mounted NFS directory according to a storage policy specified by the storage manager 306. In this example, the application 314 operates as the NFS client, and the computing device implementing the NFS directory operates as the NFS server. The parameters needed to execute the mount command (e.g., host name, path name, etc.) may be provided to the application 314 by the storage manager 306.

In some embodiments, the local directory storing the application data processed or generated by the application 314 is shared across a network or on the cloud (e.g., via the cloud storage system 304). In such embodiments, the data stored in the local directory may be modified and/or overwritten by other computing systems that also have access to the local directory. For example, when a user on a client computing device modifies a local copy of the database stored in such a shared directory, the modification may be propagated to the corresponding copies of the database on other client computing devices. In such an example, any one of the users having access to the shared directory may modify or delete the shared data, causing the data to become permanently lost. Thus, to prevent such an outcome, it may be desirable to periodically back up the local copy of the data stored in such a directory onto a secondary storage device.

The NFS path data 318 may include information used by the application 314 to cause the infinite backup operations described herein to be performed using the NFS protocol. For example, the NFS path data 318 may include one or more of the identity of the data agent 308, the identity of the media agent 310, the identity of the secondary storage device 312, the backup location (e.g., the path name of the directory on the NFS server) at which the application data generated by the application 314 is to be backed up, or other metadata that may be used by the NFS server to determine the identity and/or the type of the client computing device 302, the application 314, and/or the data to be protected (e.g., so that the infinite backup operation can be performed in a client-specific, application-specific, and/or data-specific manner). The backup location associated with the backup may be referred to herein as network path information (or path information). In a case that multiple applications are installed on the client computing device 302, the NFS path data 318 may include data associating each of such applications with the corresponding network path information.

Otherwise, the client computing device 302 (or one or more components thereof) may be the same or substantially similar to the client computing device 102 (or one or more components thereof) described above with reference FIGS. 1A-1G. For example, the client computing device 302 may further provide one or more functions of the client computing device 102 described above.

The client computing device 302 may be connected to the cloud storage system 304 over a network. The cloud storage system 304 may include a file server 320 and a primary storage device 322. The cloud storage system 304 may be any type of network storage systems that are accessible by the client computing device 302. In some embodiments, the cloud storage system 304 may include multiple file servers and/or multiple primary storage devices. The cloud storage system 304 may be in communication with the client computing device 302 via a wide area network (WAN) connection (e.g., over the Internet). For instance, in some embodiments, some or all of client computing device 302, storage manager 306, data agent 308, and media agent 310 communicate with one another over a local area network (LAN), while some or all of those same components communicate with the cloud storage system 304 over a WAN. The cloud storage system 304 according to certain embodiments may be hosted by a cloud service provider that provides cloud computing and/or cloud storage services. In general, the term "cloud" as referred to in connection with the cloud storage system 304 may refer to network-based (e.g., Internet- or other wide area network (WAN)-based) computing in which large groups of remote servers are networked and available over a WAN to allow centralized data storage and/or online access to computer services or resources. Cloud storage may refer to a model of data storage in which digital data is stored in logical pools, physical storage spans multiple servers and/or locations, and/or where the physical environment is typically owned and managed by a third party that is responsible for keeping the data available and accessible and keeping the physical environment protected and running.

The file server 320 may be a computing device that is attached to the client computing device 302 via a network and is configured to provide shared access (e.g., among various senders and recipients) to a common file repository. The file server 320 may communicate with the primary storage device 322 to store the application data generated by the application 314 onto the primary storage device 322 in the cloud storage system 304. In some embodiments, the file server 320 may be a network-attached storage (NAS) server. The primary storage device 322 may store the data received from the client computing device 302 as well as any other data or software components that may be utilized in order to operate the cloud storage system 304.

In certain cases, the cloud storage system 304 may become unavailable due to power outage, unstable network connection, etc. Further, if the directory storing the primary data in the primary storage device 316 is shared across a network or on the cloud (e.g., via the cloud storage system 304), any one of the computing devices having access to the shared directory may modify or delete the shared data, causing the data to become permanently lost. Thus, to prevent data loss and to ensure compliance with established communication policies or other administrative or legal restrictions, it may be desirable to protect the primary data stored in the primary storage device 316 using the various techniques described herein (e.g., by causing the primary data to be backed up to a secondary storage device using a standard protocol).

The storage manager 306 may configure the application 314 to back up its data using a standard protocol (e.g., NFS protocol). For example, the storage manager 306 may configure the application 314 to copy some or all of the application data associated with the application 314 to a shared NFS directory that has been mounted on the client computing device 302 and made available/accessible by the application 314.

As illustrated in FIG. 3, the storage manger 306 includes a pseudo-client manager 324. The pseudo-client manager 324 may manage and store data associated with pseudo-clients created on behalf of the client computing device 302. In a case that the system 300 includes multiple client computing devices, the pseudo-client manager 324 may create and maintain a pseudo-client for each of such client computing devices. Alternatively, the pseudo-client manager 324 may create and maintain a pseudo-client for each application (e.g., application 314). In some embodiments, the pseudo-client manager 324 may create and maintain a pseudo-client for each of a subset of applications that generates data that needs to be backed up to a secondary storage location.

The pseudo-client manager 324 may associate each pseudo-client with one or more parameters such as pseudo-client ID, identity and/or type of the client computing device, identity and/or type of the application, identity and/or type of the application data (e.g., database ID), and/or location of application data (e.g., a local directory in which the application data processed or generated by the application is stored). The pseudo-client manager 324 may further create and maintain a storage policy for each pseudo-client. Such a storage policy may specify how frequently the data associated with the pseudo-client is to be backed up. For example, the storage policy may specify that the application 314 is to export its application data to a designated local directory or a shared NFS directory every hour, at a specific time of day (e.g., 10:00 PM every night), every month, or at any other time interval. Alternatively, or additionally, the storage policy may specify that the application 314 is to back up its application data every time a change is made.

Otherwise, the storage manager 306 (or one or more components thereof) may be the same or substantially similar to the storage manager 140 (or one or more components thereof) described above with reference FIGS. 1A-1G. For example, the storage manager 306 may further provide one or more functions of the storage manager 140 described above.

Although a backup operation is used as an example data protection operation in connection with some embodiments of the present disclosure, the techniques described herein may be extended to other data protection (or other information management) operations.

The data agent 308 may be configured to receive data stored in the primary storage device 316 and communicate with the media agent 310 to cause the received data to be stored in the secondary storage device 312. For example, in response to receiving a copy of the application data associated with the application 314 or detecting the presence of the application data in a shared NFS directory, the data agent 308 may identify the media agent associated with the application data and forward the application data to the appropriate media agent.

In one embodiment, the data agent 308 is running on hardware that is physically separated from the client computing device 302 and/or the cloud storage system 304 (or any other physical hardware implementing the client computing device 302 and/or the cloud storage system 304). In another embodiment, the data agent 308 is running on the same physical hardware as the application 314 but on different virtual hardware than the application 314. In yet another embodiment, the data agent 308 is located externally or remotely from the client computing device 302 and/or the cloud storage system 304. In yet another embodiment, the data agent 308 is running on a virtual machine that is different from a virtual machine running the application 314.

The data agent 308 (or one or more components thereof) may further be configured to provide one or more functions of the data agent 142 (or one or more components thereof) described above with reference FIGS. 1A-1G.

The media agent 310 may be implemented as a software module that manages, coordinates, and facilitates the transmission of the application data received from the data agent 308 and/or the client computing device 302 to and/or from the secondary storage device 312 (e.g., between the client computing device 302 and the secondary storage device 312). Although the secondary storage device 312 is shown as a single secondary storage device in the example of FIG. 3, it should be appreciated that any number of secondary storage devices may be used, as described with reference to FIG. 1D. For example, upon receiving the data to be protected from the client computing device 302 or the data agent 308, the media agent 310 may route and/or store the received data to the appropriate secondary storage device 312, or modify or add to the existing copy of the application data stored in the secondary storage device 312.

In some embodiments, the application 314 may export its application data directly to the data agent 308 or the media agent 310 using the NFS protocol (e.g., by copying the application data onto a shared NFS directory hosted by the data agent 308 or the media agent 310). In other embodiments, one of the local directories on the client computing device 302 may be shared (e.g., with a data agent and/or media agent) using a standard protocol (e.g., NFS protocol). In some of such embodiments, the application 314 may be configured to periodically export its application data to such a local directory, and the data agent 308 and/or the media agent 310 may access the application data stored in the directory over a network and cause the application data to be stored in the secondary storage device 312.

The media agent 310 (or one or more components thereof) may further be configured to provide one or more functions of the media agent(s) 144 (or one or more components thereof) described above with reference FIGS. 1A-1G. Although not shown in FIG. 3, the media agent 310 may be implemented on one or more corresponding secondary storage computing devices as described previously (e.g., with respect to FIG. 1C).

Although the data agent 308 and the media agent 310 are illustrated in FIG. 3 as separate components, in some embodiments, both the data agent 308 and the media agent 310 may be implemented by a single component (as indicated by the dashed line encompassing the data agent 308 and the media agent 310). In one example, the data agent 308 and the media agent 310 may be replaced by a media agent that is configured to perform the functions of the data agent 308 and the media agent 310 described herein.

The secondary storage device 312 may store a backup copy of the application data stored in the primary storage device 316. In some embodiments, the secondary storage device 312 may store other data in addition to those described in the present disclosure.

Otherwise, the secondary storage device 312 (or one or more components thereof) may be substantially the same or similar to the secondary storage 108 (or one or more components thereof) described above with reference FIGS. 1A-1G. For example, the secondary storage device 312 may further provide one or more functions of the secondary storage device 108 described above.

The system 300 and corresponding components of FIG. 3 may further be configured to provide one or more functions of the system 100 and similarly named components shown in any of FIGS. 1A-1H, where applicable, such as FIG. 1D. Moreover, depending on the embodiment, the system 300 of FIG. 3 may additionally include any of the other components shown in FIG. 1D that are not specifically shown in FIG. 3. The system 300 may include one or more of each component. All components of the system 300 can be in direct communication with each other or communicate indirectly via the client computing device 302, the storage manager 306, the data agent 308, the media agent 310, or the like. In certain embodiments, some of the components in FIG. 3 shown as separate components can reside on a single computing device. Alternatively, or additionally, one or more components shown in FIG. 3 as residing on a single computing device can be distributed across multiple devices.

Figure 4:
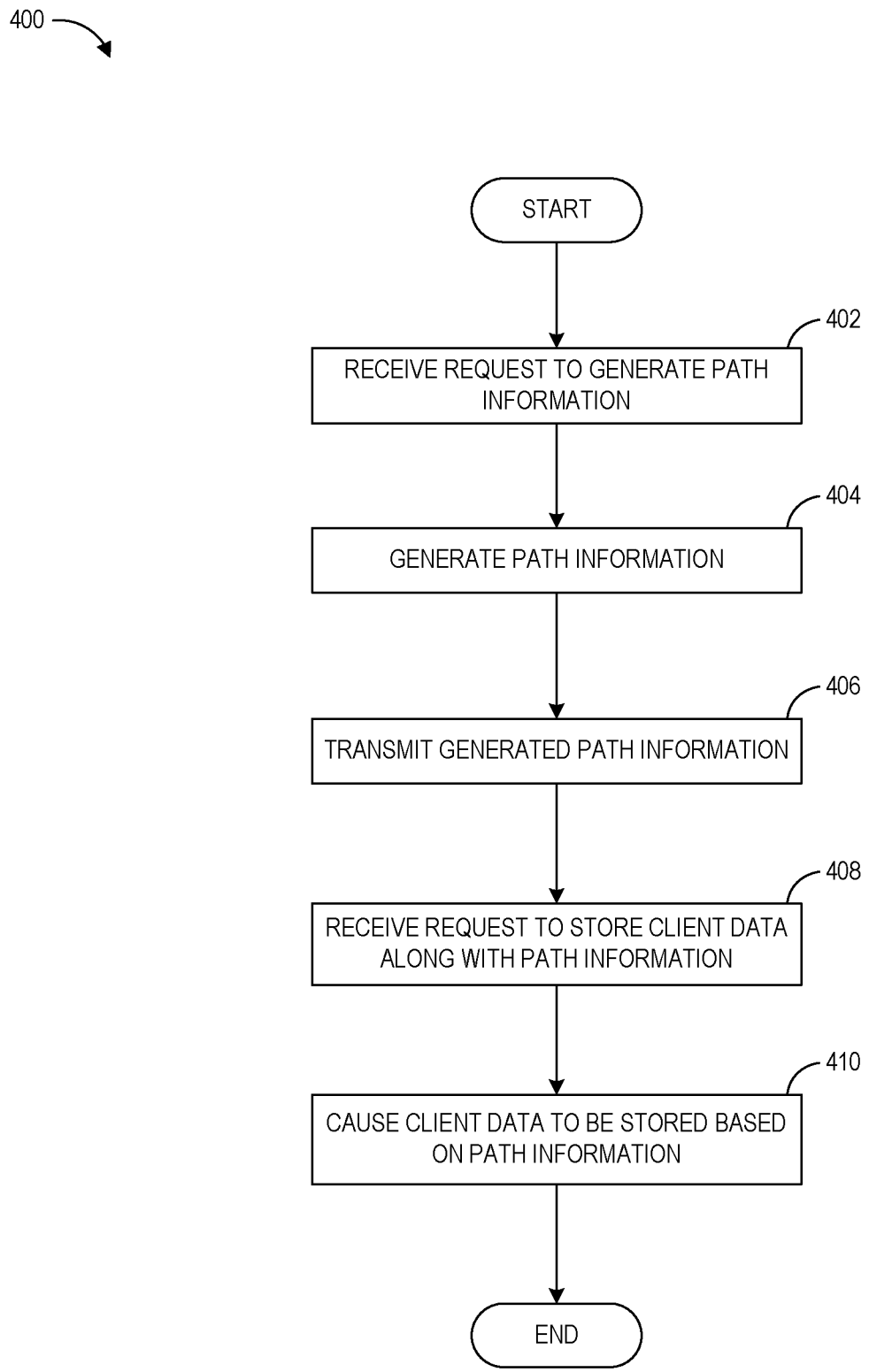
FIG. 4 is a flow diagram illustrative of one embodiment of generating network path information for a client device.

An Example Flow Diagram Illustrating Network Path Information Generation Process FIG. 4 is flow diagram illustrative of one embodiment of a routine 400 for generating network path information associated with a standard protocol. The routine 400 is described with respect to the system 300 of FIG. 3. However, one or more of the steps of routine 400 may be implemented by other information management systems, such as those described in greater detail above with reference to FIG. 1D. The routine 400 can be implemented by any one, or a combination of, a client, a storage manager, a data agent, a media agent, and the like. Although the steps in the routine 400 are described as being performed by the data agent 308 of the system 300, the embodiments discussed herein are not limited as such, and the steps in the routine 400 may be performed by other components of the system 300, either alone or in combination.

At block 402, the data agent 308 receives a request to generate network path information. Such a request may be received from the storage manager 306. Along with the request, the storage manager 306 may provide client information related to the pseudo-client associated with the application 314 of the client computing device 302. For example, such client information may include the identity of the client computing device 302 (e.g., "client_machine_x1," "client_machine_x2," etc.), the identity of the application 314 (e.g., Microsoft Outlook, Oracle, etc.), the application type associated with the application 314 (e.g., mail application, database application, etc.), the data type associated with the application data generated by the application 314 (e.g., mail data, database data, etc.), the identity of the data to be protected (e.g., the name of the mail folder, the name of the database, etc.), and the like.

At block 404, the data agent 308 generates network path information based on the received client information. The network path information may be a unique string that is generated and stored in association with at least some of the received client information (or other metadata generated based on the received client information). The data agent 308 may create and maintain such an association in a mapping table or any other data structure. In some embodiments, the data agent 308 may create or update an index (e.g., index 150) storing data associating a client computing device (or a pseudo-client associated with the client computing device) with a particular media agent and/or secondary storage device. For example, an updated index may include data associating the pseudo-client associated with the generated network path information with the media agent 310 and/or the secondary storage device 312.

In some embodiment, the network path information may be metadata (e.g., a unique string) that may be used by the NFS server (e.g., data agent 308 or media agent 310) to determine the identity and/or the type of the client computing device 302, the application 314, and/or the data to be protected (e.g., so that the infinite backup operation can be performed in a client-specific, application-specific, and/or data-specific manner). In other embodiments, the network path information may identify the path to the shared NFS directory (e.g., on the NFS server hosting the directory) to which the client data associated with the client information is to be stored. For example, the generated network path information may be "/client_machine_x1/app_24/". The data agent 308 may also cause a shared NFS directory corresponding to the network path information to be created. The network path information may identify a location within the secondary storage device (e.g., the secondary storage device 312) in which the client data is stored (e.g., backed up). Alternatively, the network path information may identify a temporary location in which the client data is temporarily stored before a backup copy of the client data is stored in a secondary storage device.

At block 406, the data agent 308 transmits the generated network path information to the storage manager 306. The data agent 308 may further transmit the identity of the media agent 310 that is configured to handle the infinite backup operations associated with the generated network path information. The storage manager 306 may store the received network path information in association with the pseudo-client created on behalf of the client computing device 302 (or the application 314). For example, the information maintained by the storage manager 306 for the pseudo-client corresponding to the application 314 of the client computing device 302 may specify that the application 314 is a database application configured to generate database data, which is to be backed up by sending a request to mount the shared NFS directory "/client_machine_x1/app_24/" to the media agent "media_agent_y3". In some embodiments, the storage manager 306 (or the data agent 308) maintains such information in a storage location accessible by both the storage manager 306 and the data agent 308.

At block 408, the data agent 308 receives, from the client computing device 302, a request to store a copy of the application data currently stored on the primary storage device 316 onto a secondary storage location. For example, the request may be an NFS mount request specifying the network path information previously generated by the data agent 308 and provided to the storage manager 306. Although not shown in FIG. 4, between blocks 406 and 408, the storage manager 306 may provide the client computing device 302 with the network path information and the NFS server information. Using the network path information included in the request, the data agent 308 may determine the details of the client computing device 302 and the nature of the request (e.g., for which client the backup is to be performed, for which application, to which storage location, using which media agent, etc.). After the shared NFS directory has been mounted on the client computing device 302, the application 314 may copy the application data that is to be backed up (e.g., according to instructions provided by the storage manager 306 or a user of the client computing device 302) to the shared NFS directory.

At block 410, the data agent 308 causes a copy of the application data stored in the shared NFS directory to be stored in the secondary computing device 312. In some embodiments, the data agent 308 periodically checks the shared NFS directory to determine whether additional data has been added to the shared NFS directory or changes to the data previously stored in the shared NFS directory have been made. Alternatively, or additionally, the data agent 308 may be notified in response to the application data being placed in the shared NFS directory.

In some embodiments, after the data agent 308 has caused the application data in the shared NFS directory to be stored in the secondary computing device 312, the data agent 308 deletes the application data stored in the shared NFS directory. The data agent 308 may send a notification to the client computing device 302 and/or the storage manager 306 that the requested backup has been completed.

The application 314 sends an NFS mount request to the data agent 308 every time a backup is to be performed (e.g., every hour, every night, every month, or as specified by the storage policy associated with the application 314), and the shared NFS directory is unmounted after the "infinite" backup operations have been performed. Alternatively, the application 314 may keep the shared NFS directory mounted and copy over the application data to be backed up to the shared NFS directory as needed (e.g., according to the storage policy specified by the storage manager 306 or a user of the computing device 302).

Although the routine 400 includes the application 314 copying over the application data to a shared NFS directory, and the data agent 308 causing the application data to be backed up from the shared NFS directory to the secondary storage device 312, the embodiments of the present disclosure are not limited to such a configuration, and in some implementations, the shared NFS directory may be the location in which the backup copy of the application data is stored. For example, the application data copied to the shared NFS directory may be converted to a backup format and stored in the same shared NFS directory or in a different location. Alternatively, or additionally, the application data in the native format may remain in the shared NFS directory.

The routine 400 can include fewer, more, or different blocks than those illustrated in FIG. 4 without departing from the spirit and scope of the description. For example, any of the operations described as performed by the data agent 308 may be performed by the media agent 310 or jointly performed by the data agent 308 and the media agent 310, and vice versa. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

An Example Flow Diagram Illustrating Infinite Backup Process

Figure 5:
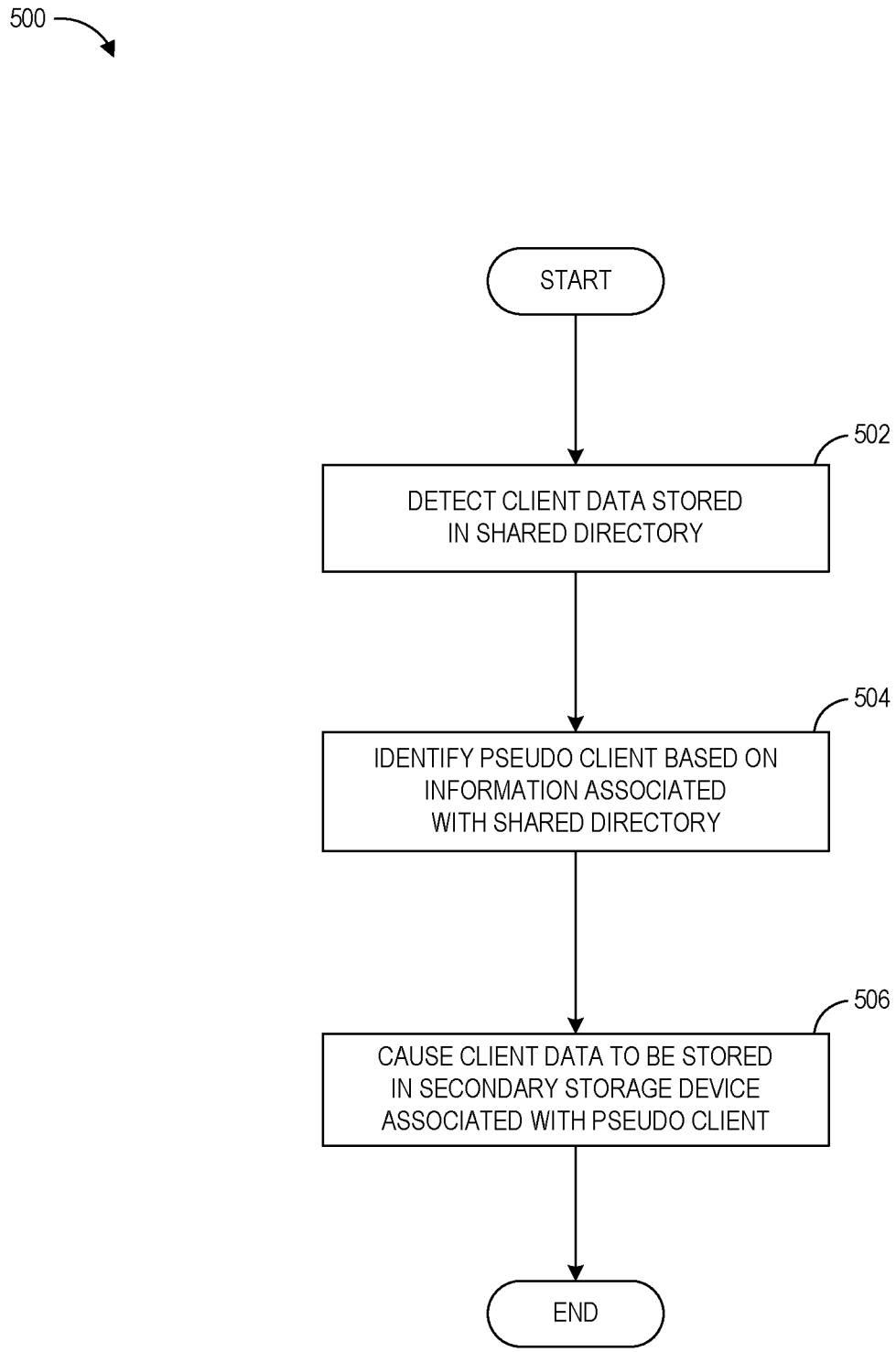
FIG. 5 is a flow diagram illustrative of one embodiment of performing an infinite backup operation based on network path information.

Turning to FIG. 5, an example routine 500 for creating a backup copy of the application data generated by the application 314 is described. The routine 500 is described with respect to the system 300 of FIG. 3. However, one or more of the steps of routine 500 may be implemented by other information management systems, such as those described in greater detail above with reference to FIG. 1D. The routine 500 can be implemented by any one, or a combination of, a client, a storage manager, a data agent, a media agent, and the like. Although the steps in the routine 500 are described as being performed by the data agent 308 of the system 300, the embodiments discussed herein are not limited as such, and the steps in the routine 500 may be performed by other components of the system 300, either alone or in combination.

At block 502, the data agent 308 detects data stored in a shared NFS directory associated with a pseudo-client. For example, the data agent 308 may periodically check the shared NFS directory to determine whether additional data has been added to the shared NFS directory or changes to the data previously stored in the shared NFS directory have been made. In some embodiments, the detection at block 502 occurs only when a change with respect to the most recent state of the directory has occurred. In other embodiments, the detection at block 502 occurs if the data agent 308 determines that the shared NFS directory is not empty (e.g., has data files stored therein). Alternatively, or additionally, a computing system implementing the shared NFS directory may provide an indication to the data agent 308 that some data is ready to be backed up to the secondary storage device 312, when a change has been made to the directory. In yet other embodiments, when the application 314 copies application data to the shared NFS path, the data goes directly to the media agent 310, which, in response to receiving the application data, proceeds to perform the media agent functions described herein (e.g., functions described with respect to the media agent 144).

At block 504, the data agent 308 identifies the pseudo-client associated with the data based on the information associated with the shared NFS directory. For example, the data agent 308 may determine the identity of the pseudo-client (or the client computing device) based on the path name (or other metadata) associated with the shared NFS directory. Further, the data agent 308 may identify (e.g., using an index such as the index 150) the specific media agent and/or secondary storage device based on the identity of the pseudo-client (or the client computing device). In another example, the data agent 308 may identify the specific media agent and/or secondary storage device based on the path name (or other metadata) associated with the shared NFS directory, without first determining the identity of the pseudo-client (or the client computing device) associated with the data.

At block 506, the data agent 308 causes the data stored in the shared NFS directory to be stored in a secondary storage device. After identifying the media agent and/or secondary storage device associated with the pseudo-client or the shared NFS directory, the data agent 308 may communicate, either directly or indirectly, with the identified media agent and/or secondary storage device to cause the data stored in the shared NFS directory to be stored (e.g., by copying, moving, replicating, archiving, migrating, etc.) in the secondary storage device.

The routine 500 can include fewer, more, or different blocks than those illustrated in FIG. 5 without departing from the spirit and scope of the description. For example, any of the operations described as performed by the data agent 308 may be performed by the media agent 310 or jointly performed by the data agent 308 and the media agent 310, and vice versa. Moreover, it will be appreciated by those skilled in the art and others that some or all of the functions described in this disclosure may be embodied in software executed by one or more processors of the disclosed components and mobile communication devices. The software may be persistently stored in any type of non-volatile storage.

An Illustrative Example of NFS Backup Operation

Figure 6:
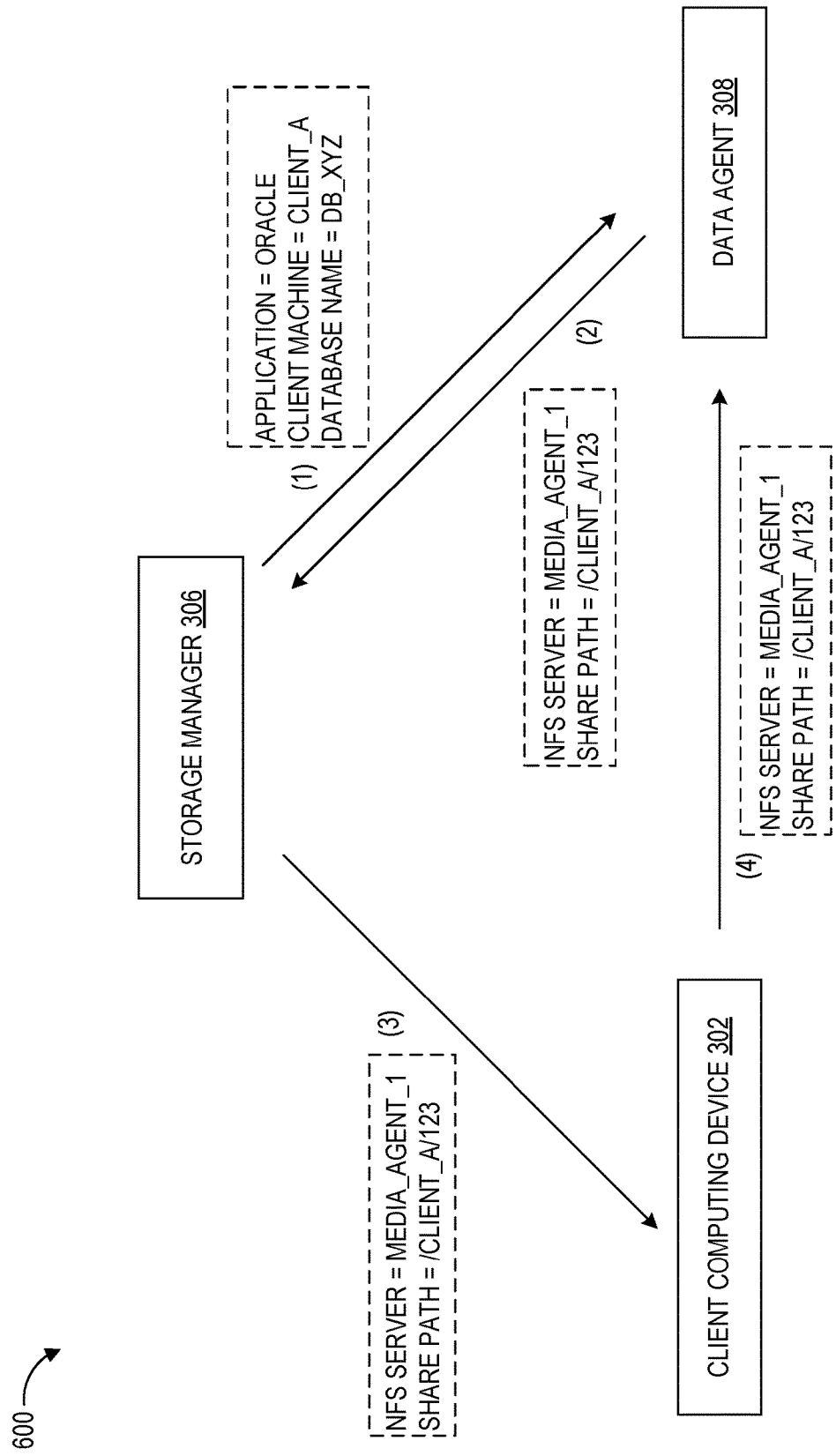
FIG. 6 is an illustrative example of performing an infinite backup operation.

Now a specific, illustrative example will be provided with reference to FIG. 6. FIG. 6 illustrates an example of backing up client data from the primary storage device 316 to the secondary storage device 312 using the NFS protocol.

FIG. 6 illustrates the client computing device 302, the storage manager 306, and the data agent 308. In arrow (1), the storage manager 306 provides some information associated with the client computing device 302 to the data agent 308. For example, the provided information may include the identity of the application installed on the client computing device 302 (e.g., "ORACLE"), the identity of the client computing device 302 (e.g., "CLIENT_A"), and the identity of the application data generated by the application (e.g., "DB_XYZ"). Such information may be included in a request from the storage manager 306 to the data agent 308 to create NFS backup information associated with the pseudo-client.

In arrow (2), upon receiving such information from the storage manager 306, the data agent 308 generates NFS backup information associated with the pseudo-client. For example, the data agent 308 may designate a specific media agent and/or secondary storage device for handling the infinite backup operations associated with the pseudo-client. Further, the data agent 308 may generate a unique path to be associated with the pseudo-client (e.g., "/CLIENT_A/123"). The NFS backup information may include the identity of the designated media agent or NFS server (e.g., "MEDIA_AGENT_1") and the path to be used for performing the NFS backup (e.g., "/CLIENT_A/123"), as illustrated in FIG. 6. The generated NFS backup information is provided to the storage manager 306.

In arrow (3), the storage manager 306 provides the received NFS backup information to the client computing device 302. In arrow (4), the client computing device 302 initiates an NFS mount request using the NFS backup information. For example, the application 314 may execute the mount command provided by the NFS protocol with "MEDIA_AGENT_1" as the name of the NFS server host and "/CLIENT_A/123" as the path name of the directory on the server being mounted. Once the shared NFS directory has been mounted, the application 314 may copy over the application data in the primary storage device 316 onto the shared NFS directory. As described herein, the data placed in the shared NFS directory may be accessed or received by the media agent 310, which, in response to receiving the data, proceeds to perform the media agent functions described herein (e.g., functions described with reference to the media agent 144).

In some embodiments, the application 314 may unmount the shared NFS directory after all the data to be protected has been copied over to the shared NFS directory. The data agent 308 or the media agent 310 may, in response to receiving the unmount request from the application 314, cause the data placed in the shared NFS directory to be stored (e.g., by copying, moving, replicating, archiving, migrating, etc.) in the secondary storage device associated with the application 314, the client computing device 302, and/or the pseudo-client associated with the path name of the shared NFS directory.

As illustrated by FIG. 6, by performing data protection operations using a standard protocol that is supported by various operating systems and applications without installation of special software, the need to install such special software on the client computing device to facilitate the data protection operations associated with such operating systems and applications can be eliminated. According to the various embodiments described herein, such operating systems and applications can store the data that is to be protected in a shared network directory that has been mounted (or otherwise made accessible/available) using a standard protocol, and data agents and/or media agents described herein can cause the data to be stored in a secondary storage location.

Further, some embodiments of the present disclosure may be implemented in an information management system in which the data agent resides in the secondary storage subsystem, such as where a storage manager communicates with a combined data/media agent to facilitate improved data protection operations associated with a client computing device. Such a system can be more easily integrated with existing client computing environments since such a system does not require modification to client computing devices or installation of special software (e.g., installation of a data agent) on the client computing devices, thereby reducing processing requirements and storage footprint on the client computing devices.

Dynamic Management of Expandable Cache Storage for Multiple Network Shares Configured in a File Server Once a file is written to a directory or folder on a specially designated network share, such as one that is configured for "infinite backup," an intermediary (pre-backup) copy of the file is created in an expandable cache configured in the file server that hosts the network share. The illustrative architecture not only provides intermediary file storage for speedy access from client computing devices, which is much quicker than restoring files from secondary copies, but does so expandably by increasing the amount of storage space for the intermediary copies as needed. This expandable as-needed approach advantageously creates flexible storage caches in the file server for each network share (a "network-share-specific" cache), each cache managed independently of other like caches for other network shares on the same file server.

The present expandable cache approach overcomes an existing problem faced by data center operators in the prior art, namely that some file systems do not support real-time expansion of an existing storage volume. Therefore, if a network share needs to grow, a maintenance take-down may be required. To expand the amount of storage space available to such a file system would require a temporary shut down and reconfiguration while a larger volume is configured and/or installed, followed by restarting the file system. This naturally would cause applications that depend on the file system to also pause while the volume expansion is implemented. It is preferable to expand storage flexibly and as needed in a manner that is independent of the particular file system.

The illustrative systems and methods described herein provide a solution, by providing realtime expansion of local cache storage for a network share, and moreover by accommodating any number of different network shares, each one operating under different storage and expansion constraints. By providing any-to-any share-to-volume cache storage according to an illustrative embodiment, more flexibility and expandability is provided within a single file server. Not only can each network share operate and expand independently of other network shares on the same file server, but the solution is also independent of the file system(s) accessing the respective shares. Further details are given in FIGS. 7A-14 and their accompanying text below.

FIG. 7A is a block diagram providing a logical network-share view from a user's perspective of an illustrative system 700 for dynamically managing expandable cache storage for multiple network shares configured in a file server. System 700 illustratively comprises: client computing devices 302 (e.g., 302-1, 302-2, 302-3), each client computing device having one or more NFS paths 718 (e.g., 718-1, 718-2) for access to a corresponding network share provided by file server 702; file server 702, which comprises media agent 744 and M network shares SH1, SH2, . . . , SH-M, each network share comprising a corresponding storage cache 704 (e.g., 704-1, 704-2, . . . , 704-M); index server 722 in communication with file server 702; storage manager 740 in communication with file server 702; and secondary storage device 108, which stores secondary copies 116 and is in communication with file server 702. The components are logically interconnected as shown. The physical communication infrastructure required to support these logical connections is well known in the art and may be any suitable electronic communications infrastructure, such as that described in regard to communication pathways 114.

FIG. 7A provides a view of the network shares from the perspective of a client computing device and its user, i.e., understanding that a network share is available for data storage according to a path, such as NFS paths 718. Additional details on how the network shares and their respective cache storage is managed is shown in FIG. 7B.

System 700 is an information management system analogous to system 100, is managed by storage manager 740, and additionally comprises components and features directed to dynamic management of expandable cache storage for multiple network shares configured in a file server that stores data generated in the system. The cached data is periodically backed up to secondary storage, which is understood to be less accessible and possibly slower than the file server. The cached data also may be pruned as needed when the expandable storage reaches a high-water mark. Notably, each network share configured in the file server operates independently of the other network shares, even if a given share's storage is shared.

File server 702 is illustratively an NFS file server, which is configured to host a number of network shares accessible by client computing devices 302, based on appropriately installed NFS paths configured on the respective client computing devices. Although file servers, including NFS file servers, are well known in the art, file server 702 additionally is configured with and comprises certain software/firmware modules and interfaces (e.g., media agent 744, and share-specific object stores 760) that enable it to operate according to the illustrative embodiment described in detail herein. For example, client computing device 302-1 has an NFS path 718-1 that provides access to network share SH1; likewise client computing device 302-3 also has NFS path 718-1 that provides access to network share SH1. Client computing device 302-2 has an NFS path 718-2 that provides access to network share SH2. Each client computing device 302 may comprise more than one NFS path 718, thus acquiring access to more than one share on file server 702 (or on other files servers). Any number of file servers 702 may be configured in a system 700.

Network shares SH1, SH2, . . . , SH-M, network-share-specific caches 704, and connectivity thereto and therefrom are shown here in dotted outlines and dotted lines to depict the fact that according to the illustrative embodiment they represent logical constructs that are visible to client computing devices 302 (and users) as unified components, but are implemented using some shared and overlapping resources as shown in FIG. 7B (see, e.g., NFS protocol handler 750; expandable cache volume group 770).

Network shares SH1, SH2 . . . SH-M are addressable storage destinations for files generated at a client computing device 302. Corresponding network-share-specific caches 704 are the logical repositories of data that is written by the client computing device 302 to the respective network share. As will be shown later, data written to a given share may end up in one or more particular storage volumes in the file server—all the while appearing as one network share to users. The underlying organization and distribution of data within the cache 704 is handled by a cache manager module 866 (see FIGS. 8A and 8B) and is not visible to client computing devices 302 that use that network share or to their users.

Index server 722 is a computing device, comprising one or more processors and suitable computer memory, that stores index and mapping information for system 700.

Storage manager 740 is analogous to storage manager 140 and further comprises additional functionality for storing information about and interoperating with file server 702 and with the network-share-specific object stores 760 and caches 704 thereon.

Media agent 744 is preferably installed and operating in file server 702 in order to improve system performance in accessing to/from secondary storage. However, in some alternative embodiments a media agent 144 may operate on a secondary storage computing device 106 that is distinct from file server 702.

FIG. 7B is a block diagram of an illustrative implementation of network-share-specific cache and cache management in system 700 using object store and expandable cache storage architectures. In addition to the components enumerated in the preceding figure, file server 702 illustratively comprises: NFS protocol handler 750; network-share-specific object store modules 760—one per network-share (e.g., 760-1, 760-2 . . . 760-M (not shown)); and expandable cache volume group 770 for storing intermediary ("cache") copies. FIG. 7B provides a more detailed implementation view of file server 702, including a number of network-share-specific object stores 760, and expandable cache volume group 770, which comprises the respective storage allocated to network-share-specific caches 704. NFS protocol handler 750 is illustratively a shared resource that serves all object stores configured in file server 702.

Protocol handler 750 is a functional module that executes on file server 702, which handles the communications protocol (e.g., NFS) that governs communications between file server 702 and client computing devices 302. NFS protocol handler 750 can parse incoming read and write requests to determine which network share is targeted by the request (e.g., SH1) and then distribute the request to the respective network-share-specific object store, e.g., 760-1 (SH1).

An object store 760 is a functional module that executes on file server 702, which provides storage to a local cache 704 and also manages interfaces to/from secondary storage for the particular network cache serviced by the object store (e.g., SH1, SH2, etc.). The illustrative object store architecture is, as noted above, specific to each network share configured on a file server 702 and object stores operate autonomously and mutually independently of each other on the same file server 702. Each object store 760 provides expandable cache storage for the associated network share, manages the cache storage, and also provides for backup to and restore from secondary storage in a manner that is not visible to client computing device 302 using the network share. From the perspective of client computing device 302 and its user, data that is stored to a certain network share is automatically backed up in an "infinite backup" scheme and also is speedily available when needed from the network share (extracted from cache).

Expandable cache volume group 770 is a volume group comprising any number of storage volumes configured in file server 702. This shared resource is used to allocate space to and expand storage space for various network-specific caches 704. Additional volumes may be added to volume group 770 by a system administrator or by another administrative resource, e.g., through scripting. However, volume group 770 as a whole is not managed by the network-share-specific object stores 760 or their cache managers 866.

Figure 8A:
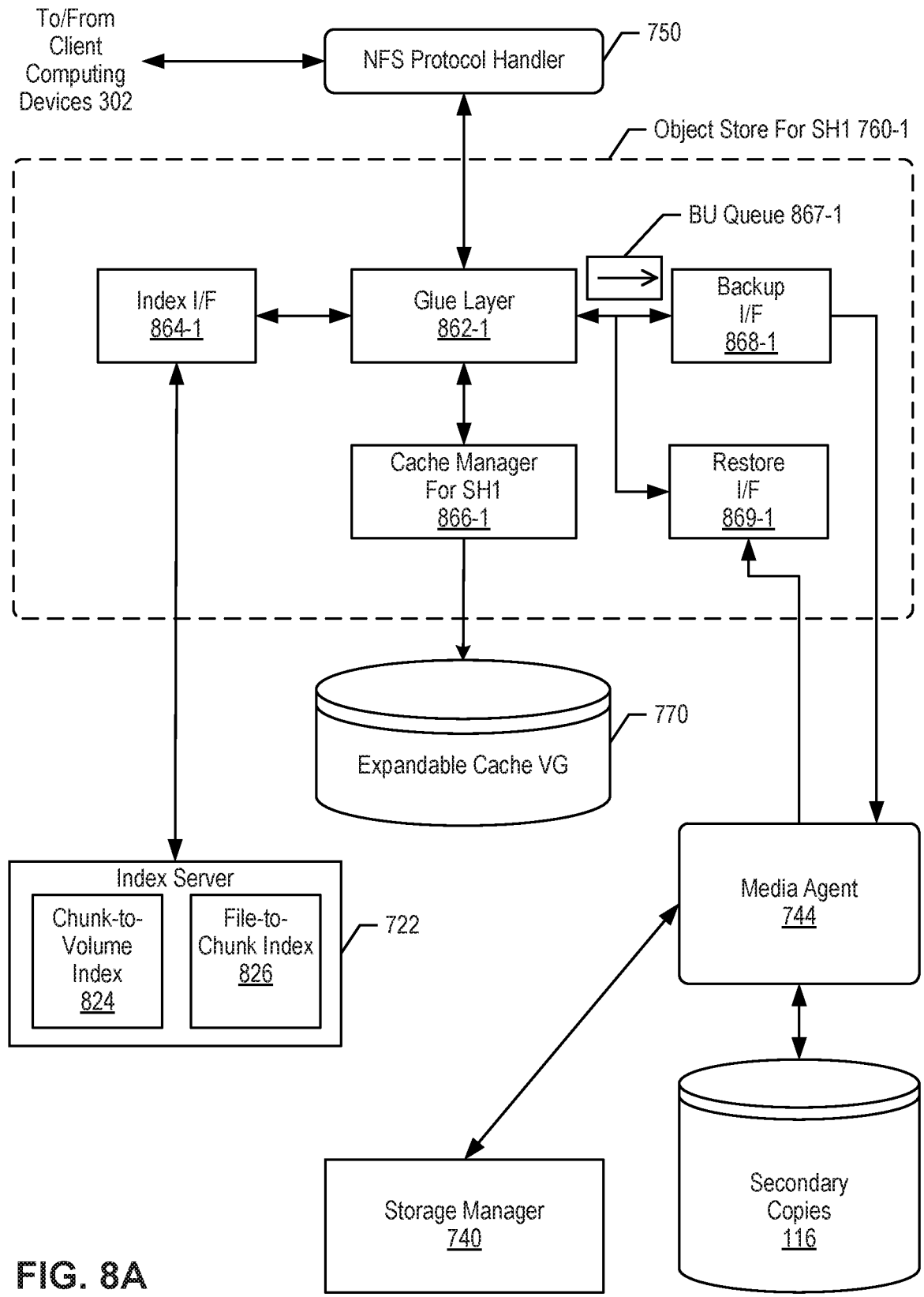
FIG. 8A is a block diagram depicting illustrative detail of an object store for a network-share configured on a file server in system 700.

FIG. 8A is a block diagram depicting illustrative detail of an object store for a network share configured on a file server in system 700. Object store 760-1 illustratively comprises: glue layer 862-1; index interface 864-1; cache manager 866-1; backup queue 867-1; backup interface 868-1; and restore interface 869-1. Object store 760-1, which services network share SH1, is said to be "network-share-specific" or "dedicated" to network share SH1. Other network-share-specific object stores 866 are implemented for other respective network shares, e.g., for SH2 . . . SH-M. Index server 722 illustratively comprises a chunk-to-volume index 824 and a file-to-chunk index 826. Also depicted in FIG. 8A are NFS protocol handler 750, expandable cache volume group 770, media agent 744, storage manager 740, and secondary copies 116.

Glue layer 862 (e.g., 862-1) is a functional module that executes on file server 702 and operates as a central point within the object store that interfaces with the other modules therein as well as with external modules like NFS protocol handler 750. For any given share-specific object store 760, glue layer 862 provides interconnections among other object store components such as cache manager 866, backup interface module 868, restore interface module 869, as well as non-object-store components such as NFS protocol handler 750 and index server 722. Thus glue layer 862 interoperates with index interface module 864, cache manager 866, backup queue 867, backup interface module 868, and restore interface module 869.

Index interface module 864 (e.g., 864-1) is a functional module that executes on file server 702 and enables the object store 760 to exchange information with index server 722.

Cache manager 866 (e.g., 866-1), which is also network-share-specific, handles storage to and retrieval from network-share-specific cache storage 704 (configured in expandable cache volume group 770) in the file server—without regard to how other network-share-specific caches are managed by other respective cache managers. For example, the network-share-specific cache manager 866 receives portions of a file to be written (e.g., uniquely identified chunks), determines which storage volume has a network-share-specific folder with sufficient space to accommodate the respective chunk, determines whether a previously unused volume should be configured with a network-share-specific folder in order to expand the cache storage for the given network share, and/or determines whether pruning of cached data is needed to free up space for storing the file portion(s)—and then stores the chunk to an appropriate network-share-specific folder in an appropriate storage volume; a chunk-to-volume mapping is retained for future reference (illustratively at glue layer 862 or alternatively at cache manager 866), i.e., retaining an indication of which storage volume 870 received the written chunk having a unique identifier, e.g., F1_GUID.1, etc. More details are given in FIG. 12. On read operations, the network-share-specific cache manager 866 determines whether a certain requested chunk is stored in and can be served from the network-share-specific cache 704.

Backup queue 867 (e.g., 867-1) is a data structure that tracks data changes that have been stored to cache 704. The purpose of the queue is to capture these changes into secondary copies that are stored in secondary storage devices 108. Glue layer 862 places entries in backup queue 867 and backup interface 868 creates the corresponding backup copies.

Backup interface module 868 (e.g., 868-1) is responsible for working with designated media agent(s), e.g., 744, to generate secondary copies 116 from cached data and get them stored to secondary storage devices 108.

Restore interface module 869 (e.g., 869-1) is responsible for working with designated media agent(s), e.g., 744, to generate restored versions of data that is in secondary copy form 116 in secondary storage 108. Taken together, backup interface module 868 and restore interface module 869 collectively comprise the functionality of a data agent 142.

Expandable cache volume group 770 is shown and described in more detail in the next figure.

Figure 8B:
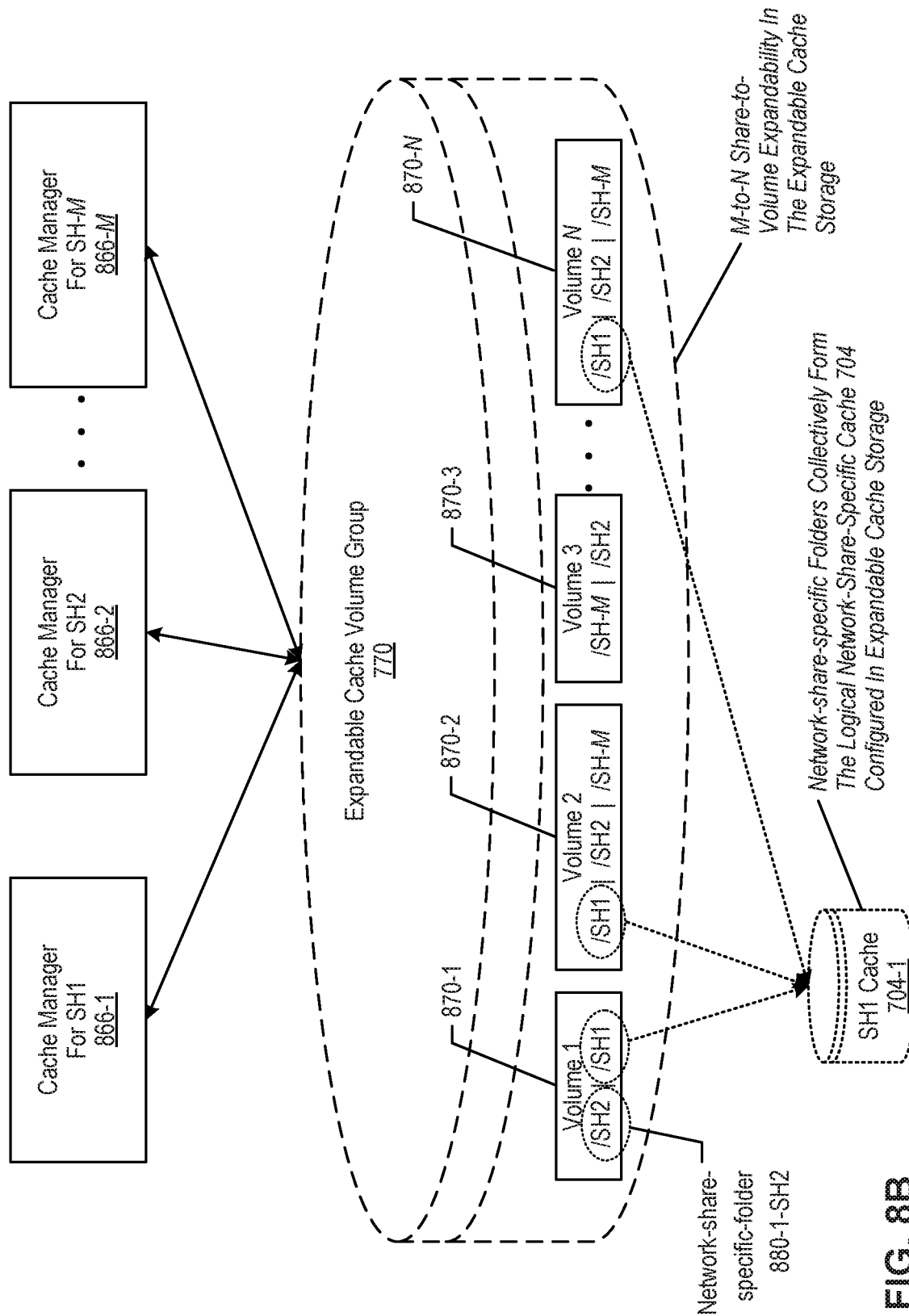
FIG. 8B is a block diagram depicting illustrative detail of an expandable cache storage implementation on a file server in system 700.

FIG. 8B is a block diagram depicting illustrative detail of an expandable cache storage implementation on a file server in system 700. FIG. 8B depicts: network-share-specific cache managers 866 (e.g., 866-1, 866-2, . . . , 866-M) with access to expandable cache volume group 770; expandable cache volume group 770 comprising a number of distinct storage volumes 870 (e.g., 870-1, 870-2, 870-3, . . . , 870-N), each storage volume 870 comprising one or more network-share-specific folder 880 (e.g., designated /SH1, /SH2, . . . , /SH-M) corresponding to the respective network shares configured in the file server. Some storage volumes 870 may be unused, i.e., may not have network-share-specific folder(s) 880 configured therein (not shown) until needed. Expandable cache volume group 770 is illustratively implemented as a volume group having a plurality of storage volumes 870.

The collection of network-share-specific folders 880 implemented for a given network share in one or more volumes 870 collectively form a logical network-share-specific cache 704, e.g., 704-1, for the given network share, e.g., SH1, SH2, . . . , SH-M. The number of storage volumes 870 (e.g., N) need not correspond to the number of network shares (e.g., M), hence the depicted M-to-N share-to-volume expandability available in expandable cache volume group 770 according to the illustrative embodiment.

Figure 9:
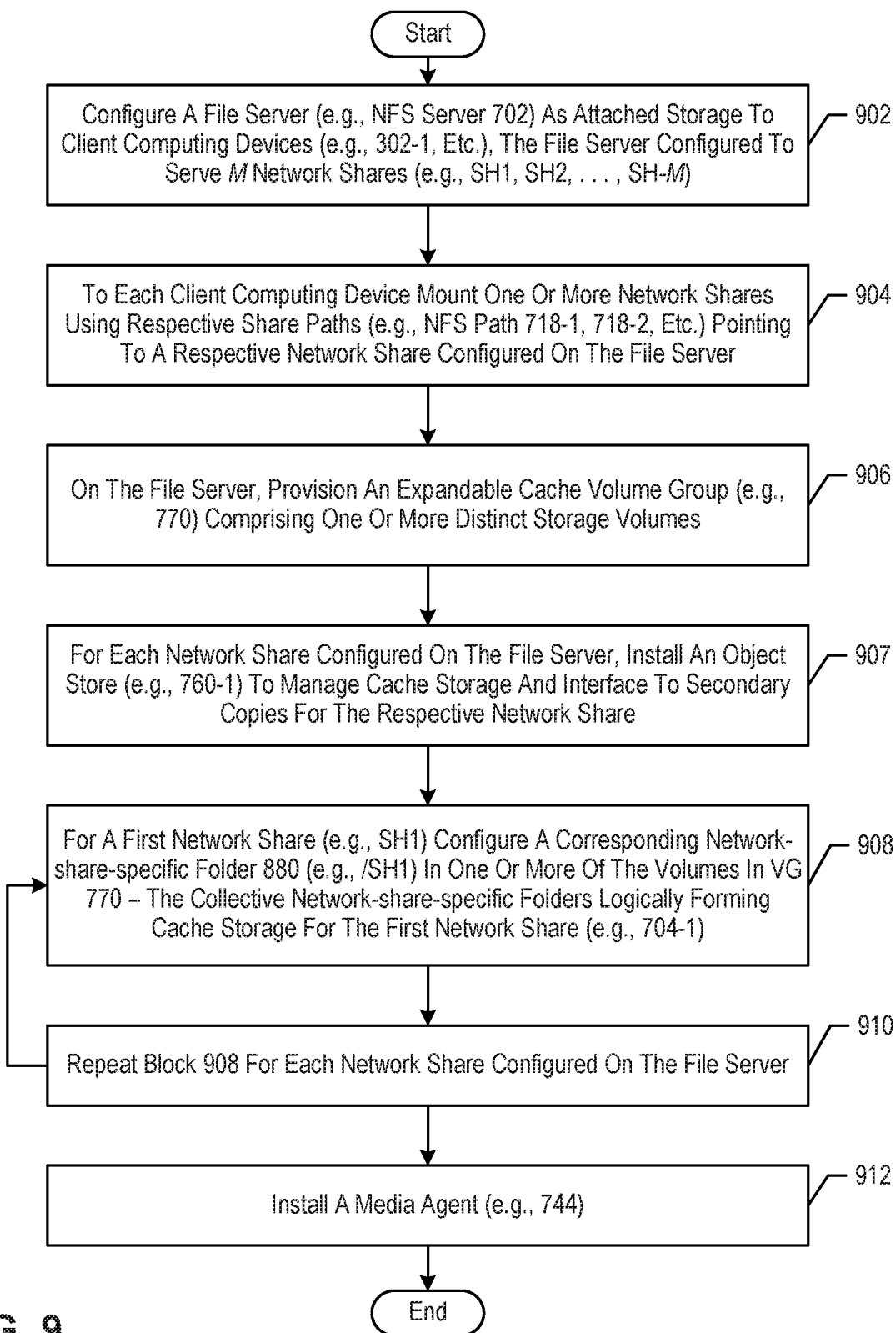
FIG. 9 is a flow diagram depicting illustrative method 900 for installation and initialization operations for system 700.

FIG. 9 is a flow diagram depicting illustrative method 900 for installation and initialization operations for system 700. Illustratively, method 900 is executed by file server 702 (including execution by components that themselves execute on file server 702), except as otherwise noted.

At block 902, a file server is configured (e.g., NFS Server 702) as attached storage to client computing devices 302 (e.g., 302-1, etc.), the file server configured to serve M network shares (e.g., SH1, SH2 . . . SH-M). This operation may be performed and/or implemented by a data center operator and/or system administrator.

At block 904, to each client computing device 302 mount one or more network shares using respective share paths (e.g., NFS path 718-1, 718-2, etc.) pointing to a respective network share configured on file server 702. This operation also may be performed by a data center operator and/or system administrator and/or user of the respective client computing device 302. For example, a mount command may be executed at the client computing device 302 to establish a storage connection between client computing device 302 and the respective network share on the file server, e.g., SH1, SH2, . . . , SH-M. One client computing device may mount one or more network shares in this way, without limitation, e.g., SH1 and SH2, using NFS paths 718-1 and 718-2 respectively.

At block 906, on the file server 702, a volume group (e.g., expandable cache volume group 770) is provisioned comprising one or more distinct storage volumes in a volume group. This operation may be performed by a system administrator and/or data center operator, or in some embodiments it may be based on instructions received by the file sever 702 (e.g., via an appropriate API) from a storage manager (e.g., 740), which is responsible for managing information, storage, and storage operations in system 700.

At block 907, for each network share configured on the file server, install a corresponding object store 760 (e.g., 760-1 . . . 760-M) to manage cache storage and interface to secondary copies for the respective network share (e.g., SH1 . . . SH-M).

At block 908, for a given network share (e.g., SH1), a corresponding network-share-specific folder 880 (e.g., designated /SH1 or otherwise establishing a unique association between the folder and the respective network share) in one or more of the storage volumes 870 in expandable cache volume group 770—the collective network-share-specific folders 880 logically forming cache storage 704 for the given network share, e.g., 704-1. This operation is illustratively performed by a network-share-specific cache manager 866, e.g., 866-1, which is an illustrative component of the network-share-specific object store. The operation may be triggered by an initialization routine executed by the network-share-specific glue layer 862-1.

At block 910, control passes back to block 908, so that block 908 is repeated for each network share configured on the file server, which is part of the group, e.g., SH2 . . . SH-M.

At block 912, a media agent (e.g., 744) is also installed on file server 702. This operation may occur before or after block 907. In some embodiments, one consolidated software installation package is installed on file server 702, and its installation routine triggers blocks 907, 908, 910, as well as 912.

After method 900 completes, file server 702 is in communication with client computing device 302, which has access to one or more network shares mounted to the respective client computing device. Moreover, each network share has an associated object store and at least some storage space allocated in one or more storage volumes in expandable cache volume group 770. Thus, from the user's perspective at a client computing device 302, files can be stored to and retrieved from respective network shares mounted to the client computing device, as described in more detail in regard to subsequent figures.

Figure 10:
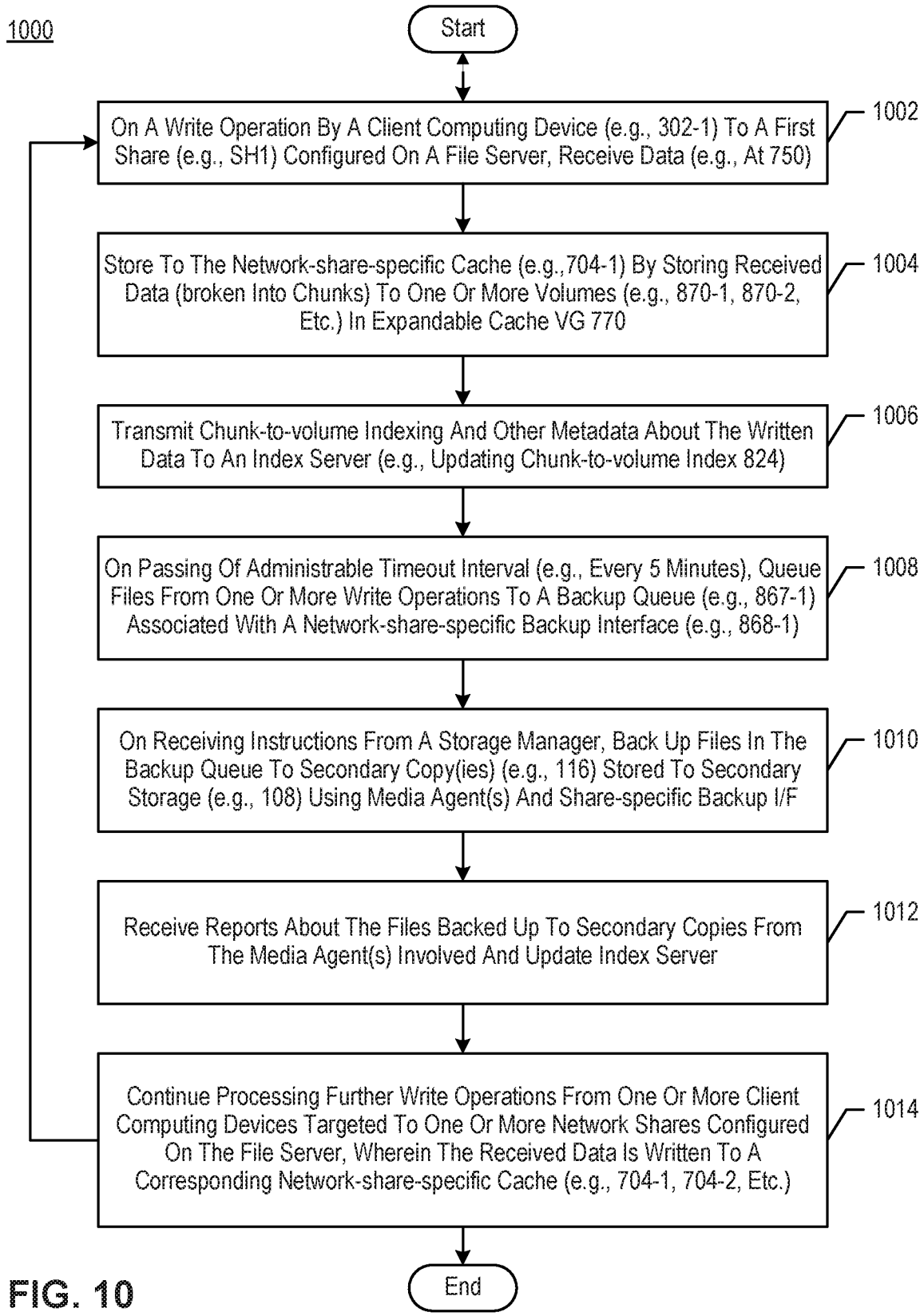
FIG. 10 is a flow diagram depicting illustrative method 1000 for handling certain write and backup operations in system 700.

FIG. 10 is a flow diagram depicting illustrative method 1000 for handling certain write and backup operations in system 700. In respect to any given network share configured on file server 702, method 1000 is executed by the respective network-share-specific object store 760 and subcomponents thereof executing on file server 702.

At block 1002, a data communications handling protocol receives data from a client computing device 302 (e.g., 302-1) executing a write operation to a given network share, e.g., SH1. Illustratively, for NFS file server 702, an NFS protocol handler 750 executing on file server 702 receives the data and distributes the received data to the appropriate object store 760 for the targeted network share, e.g., 760-1.

At block 1004, the data received from the write operation is stored to the network-share-specific cache (e.g., 704-1) by storing received data (broken into chunks) to one or more volumes (e.g., 870-1, 870-2, etc.) in expandable cache volume group 770 and keeping track of where each chunk was stored. The network-share-specific object store (e.g., 760-1) performs this block, and more details on block 1004 are given in subsequent figures.

At block 1006, after storing the data from the write operation to cache (e.g., 704-1), various information about the operation, as well as information about what was stored where, is saved in the system. Accordingly, chunk-to-volume indexing and other metadata about the written data is transmitted illustratively to index server 722 in communication with file sever 702, thereby causing index server 722 to update a mapping that tracks which file chunk is stored to which volume 870 in expandable cache 770, e.g., updating chunk-to-volume index 824. Though this mapping is retained by the respective cache manager 866 (and/or glue layer 862) that stored the chunks to cache 704, the mapping information is further protected by saving it to index server 722.

At block 1008, on passing of an administrable timeout interval (e.g., every 5 minutes), files (and/or write operations thereof) from one or more write operations are queued to a backup queue (e.g., 867) associated with a network-share-specific backup interface (e.g., 868-1). The administrable interval allows for a short interval in which write operations may "settle" so that churn from highly changeable data chunks are reduced. The administrable interval can be of any duration and is not limited to the illustrative 5 minutes.

At block 1010, on receiving instructions from a storage manager (e.g., 740), which is generally responsible for managing system 700 and protecting data therein, files in the backup queue are backed up to secondary copy(ies) (e.g., 116) stored to secondary storage (e.g., 108) using media agent(s) (e.g., 744, 144) and share-specific backup interface (e.g., 868-1) module. Backing up files and/or portions thereof is performed in accordance with information management system 100, described in more detail elsewhere herein. In that context, backup interface 868-1 performs the job of a data agent (e.g., 142). The media agent involved in the backup is preferably one that executes on file server 702, e.g., media agent 744, but in alternative embodiments, the media agent may operate on a secondary storage computing device 106, such as media agent 144. In either case, the media agent is associated with the secondary storage device that ultimately stores the secondary copies 116 created in the backup operation. The backup operation may include ancillary operations, such as deduplication, compression, and/or encryption, and any file-level secondary copy operation described in regard to system 100 may be performed in the present block.

At block 1012, reports about the files backed up to secondary copies are received (e.g., by glue layer 862) from the media agent(s) involved (e.g., 744, 144). The glue layer 862 then transmits the received information, whether in the same form or differently arranged, via index interface 864 to index server 722 to update information thereon, e.g., the file-to-chunk index 826 may be updated with secondary storage information about secondary copies 116. Likewise, storage manager 740 also may receive updates, via media agent 744, 144, e.g., reporting which media agent is associated with secondary copies 116, and other metadata about the backup operation(s). Storage manager 740 illustratively stores such information in an associated management database, e.g., 146.

At block 1014, file server 702 continues processing further write operations from one or more client computing devices 302 targeted to one or more network shares configured on the file server (e.g., SH1, . . . , SH-M), wherein the received data is written to a corresponding network-share-specific cache (e.g., 704-1, 704-2, etc.). Control passes back to block 1002 for receiving further write operations, etc.

Figure 11:
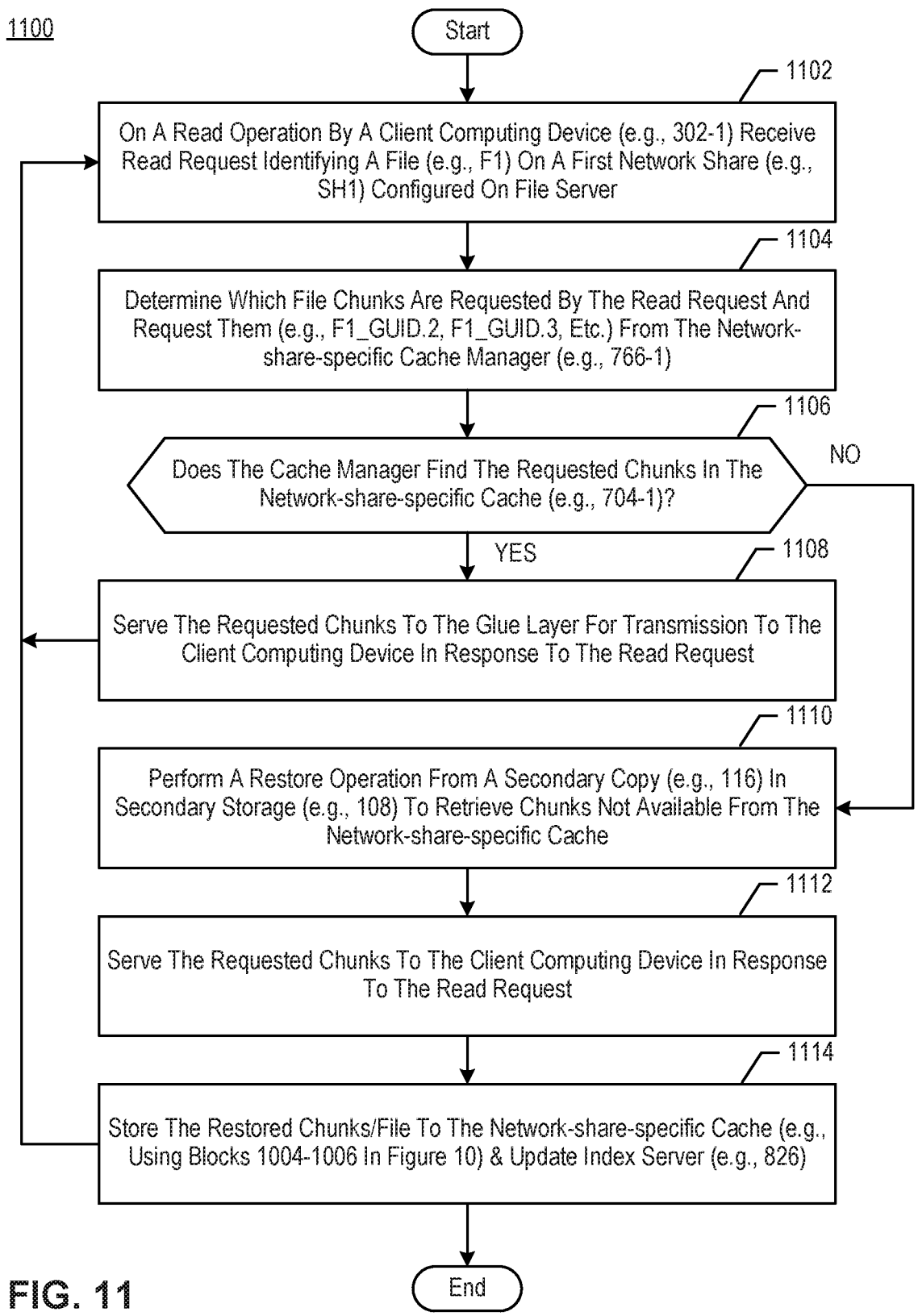
FIG. 11 is a flow diagram depicting illustrative method 1100 for handling certain read and restore operations in system 700.

FIG. 11 is a flow diagram depicting illustrative method 1100 for handling certain read and restore operations in system 700. In respect to any given network share configured on file server 702, method 1100 is executed by the respective network-share-specific object store 760 and subcomponents thereof executing on file server 702.

At block 1102, on a read operation by a client computing device 302 (e.g., 302-1) targeted to a first network share (e.g., SH1) configured on a file server (e.g., 702), a read request is received identifying a file (e.g., F1). Illustratively, for an NFS file server 702, an NFS protocol handler 750 executing on file server 702 receives the read request e.g., designating file F1 residing on network share SH1, and distributes the read request to the appropriate object store 760 for the targeted network share specified in the read request (e.g., 760-1).

At block 1104, the illustrative glue layer module 862-1 determines which file chunks are requested by the read request (e.g., F1_GUID.2, F1_GUID.3, etc.) and requests them from the network-share-specific cache manager (e.g., 866-1).

At block 1106, which is a decision point, the cache manager, e.g., 866-1, determines whether it can find the requested chunks in the network-share-specific cache (e.g., 704-1). The chunk-to-volume mapping retained in a preceding write operation (see, e.g., block 1004 and FIG. 12) is consulted at this point. If some or all the requested chunks are in cache 704, control passes to block 1108. If some or all the requested chunks are not in cache 704 (e.g., have been backed up and pruned at some previous time, or are not in cache 704 for other reasons), control passes to block 1110. If some chunks are in cache 704 while others need to be retrieved from secondary copies, both control paths are followed accordingly.

At block 1108, the network-share-specific cache manager 866 serves the requested chunks to glue layer 862 for transmission to client computing device 302 (via NFS protocol handler 750) in response to the read request. Glue layer 862 illustratively analyzes the received chunks to determine whether all requested chunks have been served and orders them into a proper sequential order, e.g., according to chunk numbers such as F1_GUID.2, F1_GUID.3, etc. If all chunks are not served from cache 704, glue layer 862 illustratively waits for completion of the restore operation at block 1110 before ordering all chunks (whether from cache or restored from secondary storage) into a proper sequence for serving the read request. Thus, some scenarios require glue layer 862 to combine restored chunks (block 1110) with other chunks extracted from the cache 704. The glue layer 862 then transmits the chunks to NFS protocol handler 750 to be transmitted to client computing device 302 in response to the read request. Control passes back to block 1102 for receiving more read requests at the file server 702.

At block 1110, a restore operation is performed from a secondary copy (e.g., 116) available from secondary storage (e.g., 108) to retrieve chunks not available from network-share-specific cache 704. More detail is given in a subsequent figure.

At block 1112, glue layer 862 serves the requested chunks to client computing device 302 (via NFS protocol handler 750) in response to the read request, as explained in more detail at block 1108 and 1408.

At block 1114, the restored chunks and or file retrieved from secondary storage at block 1110 is stored to network-share-specific cache 704, in anticipation that the first read request will be followed by further read requests and thus it would advantageous to restore the data to the file server's cache 704. These operations are described in further detail at blocks 1004-1006 in FIG. 10; also, following the restore operation, mapping information in the index server, e.g., file-to-chunk index 826 also will be updated, along with chunk-to-volume index 824.

It should be noted that file server 702 is configured to execute methods 1000 and 1100 in any order and/or concurrently, e.g., accepting read and write requests from any number of client computing devices 302 and targeted for any number of network shares configured on file server 702.

Figure 12:
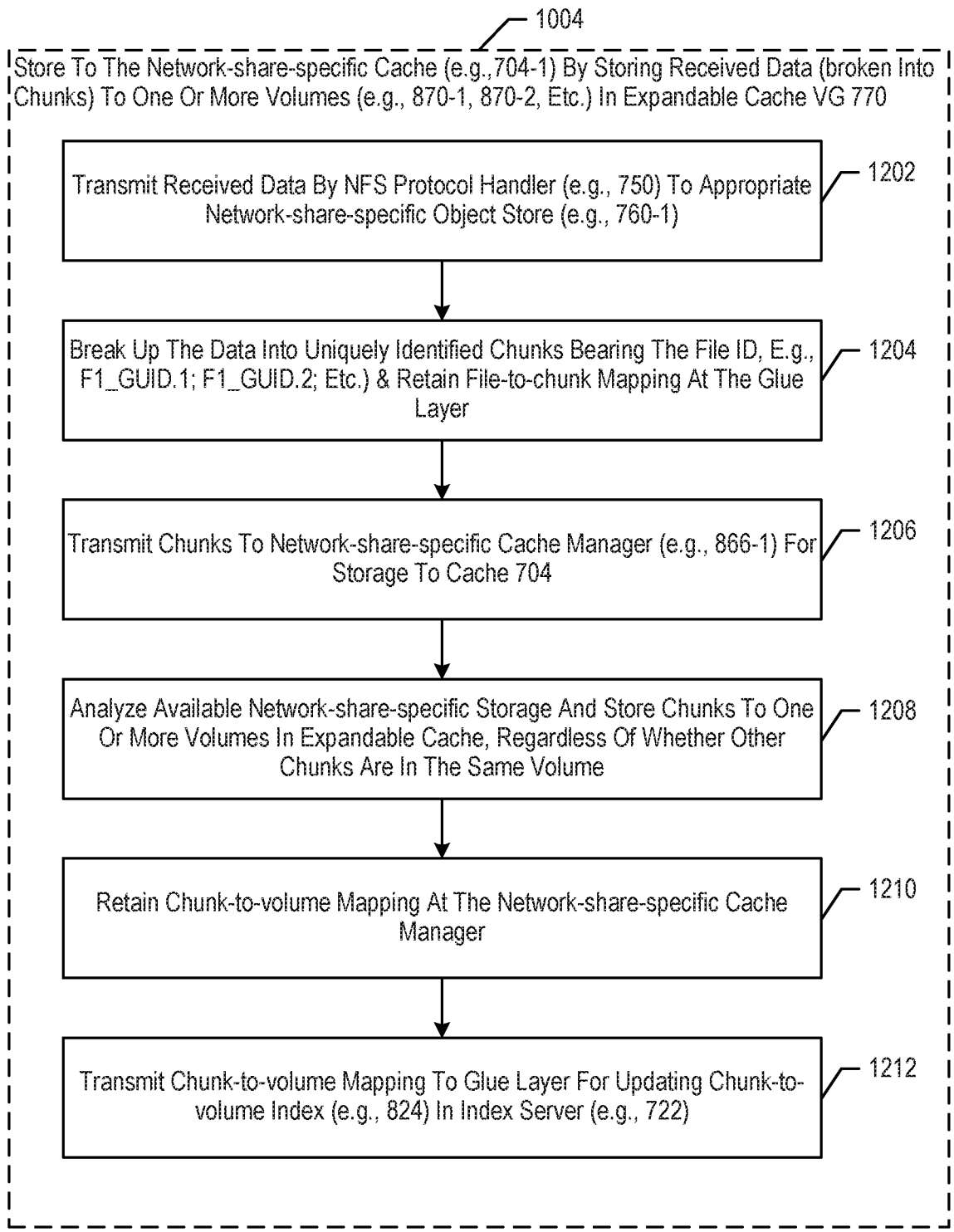
FIG. 12 is a flow diagram depicting some salient operations of block 1004 in method 1000.

FIG. 12 is a flow diagram depicting some salient operations of block 1004 in method 1000. Block 1004 is generally directed to storing data received in a write request to the network-share-specific cache (e.g., 704-1) by storing received data (broken into chunks) to one or more storage volumes 870 (e.g., 870-1, 870-2, etc.) in expandable cache volume group 770. In general, block 1004 is executed by glue layer module 862 and cache manager 866 as described in further detail below.

At block 1202, NFS protocol handler (e.g., 750) transmits the data received in the write request to an appropriate network-share-specific object store 760, based on the particulars in the write request (e.g., to object store 760-1 for a write operation directed to network share SH1).

At block 1204, glue layer 862 (e.g., 862-1) receives the data from NFS protocol handler 750 and breaks it up into uniquely identified portions of a file, herein referred to as "chunks" or "data chunks" or "file chunks." Each chunk created by glue layer 862 bears the file identifier followed by a chunk identifier, e.g., F1_GUID.1; F1_GUID.2; etc.). Accordingly, each chunk carries a unique chunk identifier that also identifies the file it is associated with. Glue layer 862 also retains file-to-chunk mapping for future reference.

At block 1206, glue layer 862 transmits the chunks to the network-share-specific cache manager 866 (e.g., 866-1) for storage to the network-share-specific cache 704 that the cache manager is responsible for managing (e.g., 704-1).

At block 1208, network-share-specific cache manager 866 (e.g., 866-1) analyzes storage in the network-share-specific cache 704 and stores the chunks to one or more storage volumes 870 configured in expandable cache volume group 770, regardless of whether other chunks from the same file are in the same storage volume 870. In other words, cache manager 866 may store different chunks to different storage volumes 870 as it sees fit, whether the chunks are received from one write operation or from more than one write operation. Cache manager 866 may determine that after storing a given chunk to a first storage volume (e.g., 870-1) the volume has reached a predetermined storage limit, and so cache manager 866 may then find another suitable storage volume (e.g., 870-2) for the next chunk or chunks. It should also be remembered that other network shares also may have share-specific folders configured in any given storage volume 870 (see, e.g., FIG. 8B); the presence of such "foreign" folders may affect how much storage remains in the storage volume 870 as a whole, but the contents of those "foreign" folders have no bearing on whether the present cache manager (e.g., 866-1) chooses a particular folder (e.g., 880-1-SH1) for storing any given chunk in the write request. More details on block 1208 are given in a subsequent figure.

At block 1210, cache manager 866 retains chunk-to-volume mapping following the storing operation at block 1208. This mapping will enable cache manager 866 to find chunks in cache 704, or to determine that they are not in cache 704, when responding to a read operation (see, e.g., block 1106).

At block 1212, cache manager 866 transmits the chunk-to-volume mapping to glue layer 862 for updating the chunk-to-volume index (e.g., 824) in the index server (e.g., 722). This operation provides an additional level of protection in case object store 760 crashes or is otherwise disabled. In some alternative embodiments, glue layer 862 retains the chunk-to-volume mapping information instead of its being retained by cache manager 866.

Figure 13:
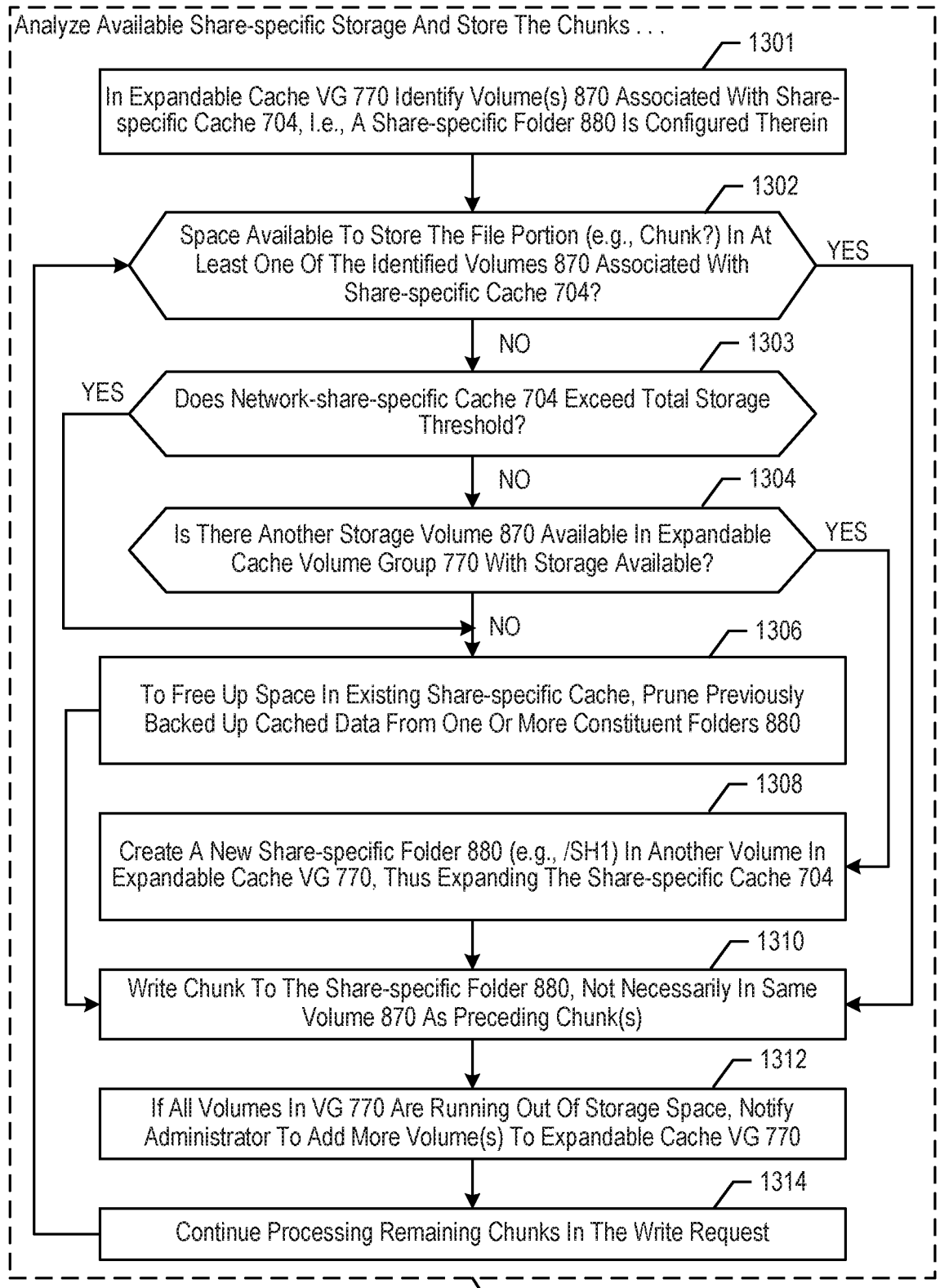
FIG. 13 is a flow diagram depicting some salient operations of block 1208 in method 1000.

FIG. 13 is a flow diagram depicting some salient operations of block 1208 in block 1004 of method 1000. Block 1208 is generally directed at analyzing available network-share-specific storage and storing chunks from a write request to one or more volumes in expandable cache storage. Block 1208 is performed by network-share-specific cache manager 866 (e.g., 866-1) that handles chunks received in the write request.

At block 1301, cache manager 866 identifies a first set of one or more storage volumes 870 configured in expandable cache volume group 770 that are associated with the share-specific cache 704 by virtue of having a network-share-specific folder 880 configured therein. For example, according to FIG. 8B, storage volumes 870-1, 870-2, and 870-N are associated with network share SH1; storage volumes 870-1, 870-2, 870-3, and 870-N are associated with network share SH2; and storage volumes 870-2, 870-3 and 870-N are associated with network share SH-M. In the example of cache manager 866-1 and network share SH1, cache manager 866-1 would identify storage volumes 870-1, 870-2, and 870-N as belonging to the set of storage volumes associated with network share SH1.

At block 1302, which is a decision point, cache manager 866 determines whether one or more of the identified storage volumes 870 associated with the share-specific cache 704 have storage space available for the file portion (e.g., chunk) to be written to cache. If at least one such storage volume is found, e.g., 870-1, control passes to block 1310; otherwise, meaning that none of the storage volumes in cache 704 have sufficient storage space, control passes to block 1303.

At block 1303 in the case where cache manager 866 determines that none of cache-associated volumes 870 have sufficient storage space for the file portion (e.g., chunk) to be written, cache manager 866 determines whether network-share-specific cache 704 as a whole exceeds a storage threshold in the file server. The storage threshold might have been pre-administered as a fixed measure of storage (e.g., 1 TB) or may be a percentage of the total storage in the expandable cache volume group 770 (e.g., 50%) that any given cache should not exceed. If the threshold is exceeded, control passes to block 1306 to free up space in the existing network-share-specific cache; otherwise control passes to block 1304.

At block 1304, which is reached when the cache as a whole is below threshold yet no volumes presently have storage space available to store the file portion (e.g., chunk), cache manager 866 determines whether another storage volume 870, which is not currently in the set of volumes associated with the given network share, is available in expandable cache volume group 770 and has storage available. This means that the storage volume is part of volume group 770, but lacks a network-share-specific folder configured therein and is below a maximum storage threshold (e.g., high-water mark) established for the storage volume as a whole (e.g., 80%). If such a storage volume is found, control passes to block 1308 to expand the amount of storage space for the network share; otherwise, storage for the network share cannot be further expanded in the current configuration and control passes to block 1306 to free up space in the existing network-share-specific cache.

At block 1306, to free up space in the existing network-share-specific cache 704, cache manager 866 prunes previously backed up cached data from one or more constituent folders 880 (e.g., based on age, size of file, etc.). As noted, only data that has already been backed up to secondary copies 116 in secondary storage (see, e.g., block 1010) can be pruned in the present operation to free up space in the cache. Accordingly, one or more network-share-specific folders on respective one or more storage volumes 870 associated with the network share are analyzed for cached data that meets certain pruning criteria, e.g., age, size of file, etc.—so long as that data has been backed up. The data that meets the pruning criteria is then deleted from the cache location(s), thus freeing up space for the present write operation and possibly for other upcoming write operations targeting the same network share. Control passes to block 1310.

At block 1308, which is reached when a storage volume is found in expandable cache volume group 770 that is not currently used by the present network share, cache manager 866 creates a new share-specific folder 880 (e.g., designated /SH1) in the unused storage volume, thus expanding the share-specific cache 704. Notably, the storage volume may be used by other caches that have a corresponding folder populated in the storage volume (e.g., designated /SH2), but in regard to the present network share, the volume is considered to be unused until the network-share-specific folder is created therein. By virtue of creating the folder (e.g., /SH1), the respective storage volume (e.g., 870-2) becomes associated with the respective network share (e.g., SH1) and becomes part of the set of storage volumes associated with the network share. The effect of block 1308 is to dynamically expand, as needed, the amount of storage space available to the particular network share, without requiring a maintenance take-down or restart of the file system as described in the prior art. This on-demand expandability is only limited by how many storage volumes are included in the expandable cache volume group 770, and by any limits on total storage for the particular cache (see block 1303). Control passes to block 1310 to write the portion of the file (e.g., chunk) to cache.

At block 1310, cache manager 866 writes the present chunk to a network-share-specific folder, which may be in a storage volume newly added to the network-share-specific cache at block 1308. Notably, the chunk is not necessarily written to the same storage volume as preceding chunk(s) belonging to the same file, even if they all arrive in the same write request.

At block 1312, if all volumes in expandable cache volume group 770 are running out of storage space (e.g., exceed an administrable high-water mark, e.g., 80%), cache manager 866 causes glue layer 862 to notify an administrator to add more volume(s) 870 to expandable cache volume group 770, i.e., to increase the volume group. Adding to volume group 770, though possibly manual in nature when it requires the services of an administrator, is not visible to the client computing devices 302 and their respective file systems that access the various network shares on file server 702, and therefore this operation further has the effect of seamlessly expanding cache storage on the file server on an as-needed basis without disruption of client computing device operations.

At block 1314, control passes back to block 1302 to continue processing remaining file portions (e.g., chunks) in the write request.

Figure 14:
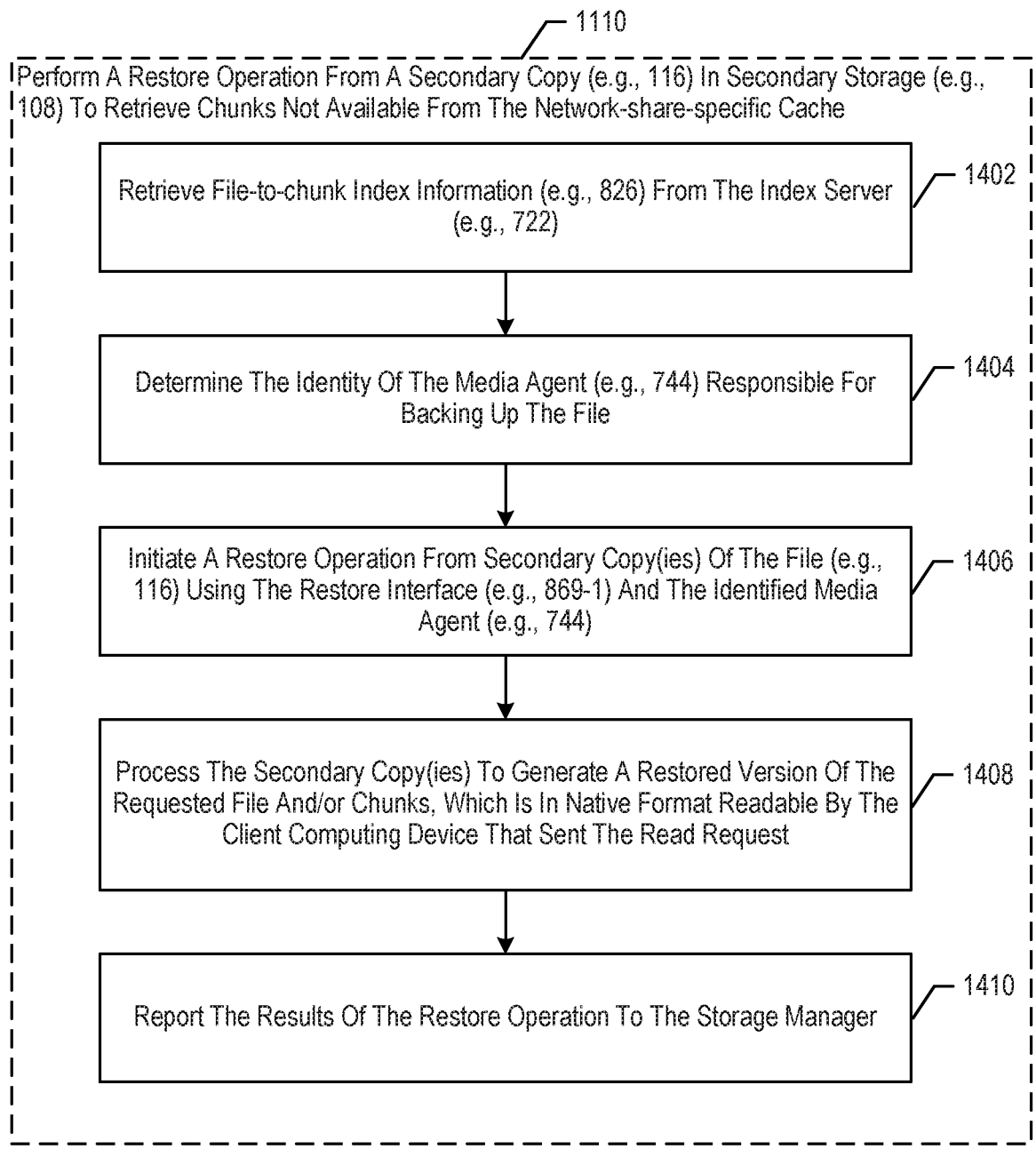
FIG. 14 is a flow diagram depicting some salient operations of block 1110 in method 1100.

FIG. 14 is a flow diagram depicting some salient operations of block 1110 in method 1100. Block 1110 is generally directed to performing a restore operation from a secondary copy (e.g., 116) available from secondary storage (e.g., 108) in order to retrieve chunks that are not available from the network-share-specific cache 704 on the file server 702. This block is performed by components of the network-share-specific object store 760.

At block 1402, the latest file-to-chunk backup information is retrieved by the glue layer 862 from index server 722 (e.g., stored in file-to-chunk index 826), via index interface module 864.

At block 1404, based on the backup information retrieved from index server 722 in the preceding block, glue layer 862 determines the identity of the media agent (e.g., 744) responsible for backing up the particular file or portions thereof—this same media agent will be tapped for the restore operation. In the preferred embodiment, the media agent used for backing up cached data, and hence used later for restoring, is preferably a component that executes locally on the file server 702 (see, e.g., FIG. 7B). However, in alternative embodiments, the media agent (e.g., 144) executes on a secondary storage computing device (e.g., 106) that is distinct and apart from the file server 702.

At block 1406, glue layer 862 initiates a restore operation from secondary copy(ies) of the file (e.g., 116) using the restore interface module (e.g., 869-1) and the identified media agent (e.g., 744, 144, etc.).

At block 1408, the identified media agent and the restore interface module proceed to process the secondary copy(ies) 116 to generate a restored version of the requested file and/or chunks (e.g., find the copy on secondary storage media, retrieve it therefrom, rehydrate, decompress, decrypt, etc.), wherein the resulting restored file/chunks is in native format readable by the client computing device that sent the read request. As noted at blocks 1108 and 1112, some scenarios will require the glue layer 862 to combine (e.g., sequence into a proper order) restored chunks with other chunks extracted from cache 704 before transmitting them to client computing device 302 (via protocol handler 750) in response to the read request.

At block 1410, the restore interface and/or media agent that performed the restore operation report the results of the restore operation to storage manager 740. This operation is analogous to data agent and media agent reporting described in detail elsewhere herein in regard to system 100. Storage manager 740 illustratively stores operation results in an associated management database, e.g., 146.

In regard to the figures described herein, other embodiments are possible within the scope of the present invention, such that the above-recited components, steps, blocks, operations, and/or messages, requests, queries, and instructions are differently arranged, sequenced, sub-divided, organized, and/or combined. In some embodiments, a different component may initiate or execute a given operation. In some embodiments more than one of the recited steps, blocks, operations, and/or messages, requests, queries, and instructions execute concurrently.

Example Embodiments

Some example enumerated embodiments of the present invention are recited in this section in the form of methods, systems, and/or non-transitory computer-readable media without limitation.

MA1. A method for dynamically managing storage for network shares configured in a file server, the method comprising:

receiving, by the file server from a client computing device, a write request in reference to a first file,
    wherein the write request designates a first network share configured in the file server as a storage destination of the write request;

identifying, by a cache manager that executes on the file server, one or more storage volumes configured in the file server that are associated with the first network share,
    wherein each of the one or more storage volumes comprises a respective first-network-share-specific folder that stores data for the first network share and only for the first network share,
    thereby associating each of the one or more storage volumes with the first network share;

if a first storage volume of the one or more storage volumes that are associated with the first network share comprises sufficient storage space to store a first portion of the first file, storing, by the cache manager, the first portion of the first file to the respective first-network-share-specific folder in the first storage volume;

if the first storage volume of the one or more storage volumes that are associated with the first network share lacks sufficient storage space to store the first portion of the first file,
    (a) identifying by the cache manager a second storage volume of the one or more storage volumes that are associated with the first network share, which second volume comprises sufficient storage space to store the first portion of the first file, and
    (b) regardless of whether other portions of the first file are stored to the same second storage volume,
        storing, by the cache manager, the first portion of the first file to the respective first-network-share-specific folder in the identified second storage volume; and if none of the one or more storage volumes that are associated with the first network share comprise sufficient storage space to store the first portion of the first file, dynamically expanding the amount of storage available for the first network share on the file server by:
    (i) identifying, by the cache manager a third storage volume configured in the file server, wherein the third storage volume comprises sufficient storage space to store the first portion of the first file,
    (ii) configuring by the cache manager in the third storage volume a first-network-share-specific folder for storing data for the first network share and only for the first network share,
        thereby associating the third storage volume with the first network share, and
    (iii) storing, by the cache manager, the first portion of the first file to the first-network-share-specific folder configured in the third storage volume.

MA2. The method of claim MA1 further comprising:

if none of the one or more storage volumes that are associated with the first network share comprise sufficient storage space to store the first portion of the first file and no additional storage volumes are available in the file server for dynamically expanding the amount of storage available for the first network share,
- (A) freeing up storage space for the first network share by pruning data, by the cache manager, from one or more first-network-share-specific folders configured in the one or more storage volumes that are associated with the first network share,
  - wherein only data that has been previously backed up from the file server to a secondary storage device can be pruned to free up storage space for the first network share, and
- (B) after the pruning, storing, by the cache manager, the first portion of the first file to a first-network-share-specific folder in one of the one or more storage volumes that are associated with the first network share.

MA2a. The method of claim MA2 wherein the pruning is also based on an age of the data that has been previously backed up.

MA2b. The method of claim MA2 wherein the pruning is also based on a size of a file that has been previously backed up.

MA2c. The method of claim MA2 wherein the amount of data that is pruned to free up storage space for the first network share is sufficient to reach an administrable threshold.

MA2d. The method of claim MA2 wherein criteria for pruning the data that has been previously backed up are administrable via a storage manager that is in communication with the file server.

MA2-2. The method of claim MA1 wherein for storage to the first network share on the file server the first file is divided into a plurality of portions including the first portion, and
  wherein any given portion of the first file is stored to a first-network-share-specific folder configured on a respective one of the one or more storage volumes that are associated with the first network share, independently of whether another portion of the first file is also stored to the same one of the one or more storage volumes that are associated with the first network share, as determined by the cache manager.

MA3. The method of claim MA1 wherein whether sufficient storage space is available to store the first portion of the first file is determined by the cache manager based on one or more administrable thresholds.

MA4. The method of claim MA1 further comprising:
  for storing a second portion of the first file, identifying by the cache manager a storage volume of the one or more storage volumes that are associated with the first network share, based at least in part on whether the identified storage volume comprises sufficient storage space for the second portion of the first file regardless of whether the first portion of the first file is stored in the same storage volume.

MA5. The method of claim MA1 wherein the receiving of the write request is performed by a protocol handler executing on the file server; and further comprising:
  transmitting, by the protocol handler, the write request to a module that executes on the file server, wherein the module is associated with the first network share and is in communication with the cache manager, which is also associated with the first network share;
  dividing, by the module, the first file into a plurality of portions including the first portion; and
  transmitting, by the module, each portion of the plurality of portions to the cache manager associated with the first network share.

MA6. The method of claim MA1 wherein the cache manager, which is associated with the first network share, retains an index of which portion of the first file is stored in which storage volume of the one or more storage volumes associated with the first network share.

MA7. The method of claim MA1 wherein the cache manager, which is associated with the first network share, retains information about which portion of the first file is stored in which storage volume of the one or more storage volumes associated with the first network share.

MA8. The method of claim MA1 further comprising:
  on passing an administrative timeout interval, creating an entry for the first file in a backup queue that is associated with a backup interface module that is associated with the first network share, wherein the backup interface also executes on the file server.

MA9. The method of claim MA8 wherein the backup queue comprises an entry for a second file that is also stored in one or more of the one or more volumes associated with the first network share as a result of another write request designating the first network share received by the file server from one of:
  (A) the same client computing device as the first file, and
  (B) a different client computing device than the first file.

MA10. The method of claim MA8 further comprising:
  receiving, by the backup interface module, one or more instructions from a storage manager to generate at least one secondary copy of the first file;
  generating, by the backup module in conjunction with a media agent that also executes on the file server, a secondary copy of the first file based on the one or more instructions received from the storage manager;
  storing, by the media agent, the generated secondary copy of the first file to a secondary storage device in communication with the file server; and
  reporting metadata about the secondary copy to at least one of an index server in communication with the file server, and the storage manager.

MA11. The method of claim MA8 further comprising:
  receiving, by the backup interface module, one or more instructions from a storage manager to generate at least one secondary copy of the first file;
  generating, by the backup module in conjunction with a media agent that executes on a secondary storage computing device in communication with the file server, a secondary copy of the first file based on the one or more instructions received from the storage manager;
  storing, by the media agent, the generated secondary copy of the first file to a secondary storage device in communication with the secondary storage computing device; and
  reporting metadata about the secondary copy to at least one of an index server in communication with the file server, and the storage manager.

MA12. The method of claim MA1 further comprising:
  receiving, by the file server from a client computing device, a second write request in reference to a second file,
    wherein the write request designates a second network share configured in the file server as a storage destination of the second write request;
    identifying, by a second cache manager that executes on the file server, second one or more storage volumes configured in the file server that are associated with the second network share, wherein each of the second one or more storage volumes comprises a respective second-network-share-specific folder that stores data for the second network share and only for the second network share, wherein at least one of the second one or more storage volumes is the same as one of the one or more storage volumes associated with the first network share, and wherein the second cache manager is distinct from and operates independently of the cache manager the operates in reference to the first network share;

if one of the second one or more storage volumes associated with the second network share comprises sufficient storage space to store a first portion of the second file, storing the first portion of the second file thereto by the second cache manager, regardless of whether any data for the first network share is stored on the same one of the second one or more storage volumes.

MA13. The method of claim MA12 further comprising:

if all of the second one or more storage volumes that are associated with the second network share lack sufficient storage space to store the first portion of the second file, dynamically expanding the amount of storage available for the second network share on the file server by:

(i) identifying, by the second cache manager a fourth storage volume configured in the file server, wherein the fourth storage volume comprises sufficient storage space to store the first portion of the second file regardless of whether any data for the first network share is stored in the fourth storage volume, and (ii) configuring, by the second cache manager, in the fourth storage volume a second-network-share-specific folder for storing data for the second network share and only for the second network share, thereby associating the fourth storage volume with the second network share, and (iii) storing, by the second cache manager, the first portion of the second file to the second-network-share-specific folder configured in the fourth storage volume to dynamically expand the amount of storage available for the second network share on the file server.

MA14. The method of claim MA13 wherein expanding the amount of storage available for the first network share on the file server operates mutually independently from expanding the amount of storage available for the second network share on the file server.

MA15. The method of claim MA1 further comprising:

receiving, by the file server from a client computing device, a read request in reference to the first file, wherein the read request designates the first network share configured in the file server as a source for the read request;

based on the designated first network share in the read request, directing the read request to the cache manager that is associated with the first network share, wherein the directing is performed by a module that is distinct from the cache manager and that also executes on the file server;

if the cache manager determines that the read request can be served at least in part from the one or more storage volumes configured in the file server that are associated with the first network share, retrieving, by the cache manager, at least some of the data requested by the read request from one or more first-network-share-specific folders configured in respective storage volumes in the one or more storage volumes associated with the first network share;

if the cache manager determines that the read request cannot be served from the one or more volumes in the file server that are associated with the first network share:

(i) triggering, by the cache manager, a restore operation to restore the first file from a secondary copy stored on a secondary storage device in communication with the file server, and (ii) performing the restore operation by a restore interface module that executes on the file server in conjunction with a media agent that is associated with the secondary storage device that comprises the secondary copy of the first file; and responding to the read request by the file server, based on at least one of (a) the restored first file and (b) the data retrieved from the one or more storage volumes in the file server.

SYA1. A system for dynamically managing storage for network shares configured in a file server, the system comprising:

a file server in communication with a first client computing device, wherein the file server comprises a plurality of storage volumes;

a secondary storage device in communication with the file server;

wherein the file server is configured to:

receive from the client computing device, a write request in reference to a first file, wherein the write request designates a first network share configured in the file server as a storage destination of the write request;

execute a cache manager that is configured to identify one or more storage volumes configured in the file server that are associated with the first network share, wherein each of the one or more storage volumes comprises a respective first-network-share-specific folder that stores data for the first network share and only for the first network share, thereby associating each of the one or more storage volumes with the first network share;

if a first storage volume of the one or more storage volumes that are associated with the first network share comprises sufficient storage space to store a first portion of the first file, the cache manager is configured to store the first portion of the first file to the respective first-network-share-specific folder in the first storage volume;

if the first storage volume of the one or more storage volumes that are associated with the first network share lacks sufficient storage space to store the first portion of the first file, the cache manager is configured to:

(a) identify a second storage volume of the one or more storage volumes that are associated with the first network share, which second volume comprises sufficient storage space to store the first portion of the first file, and (b) regardless of whether other portions of the first file are stored to the same second storage volume, store the first portion of the first file to the respective first-network-share-specific folder in the identified second storage volume; and if all of the one or more storage volumes that are associated with the first network share lack sufficient storage space to store the first portion of the first file, the cache manager is configured to dynamically expand the amount of storage available for the first network share on the file server by:

(i) identifying a third storage volume configured in the file server, wherein the third storage volume comprises sufficient storage space to store the first portion of the first file, and (ii) configuring in the third storage volume a first-network-share-specific folder for storing data for the first network share and only for the first network share, thereby associating the third storage volume with the first network share, and (iii) storing the first portion of the first file to the first-network-share-specific folder configured in the third storage volume to dynamically expand the amount of storage available for the first network share on the file server.

SYA2. The system of claim SYA1 wherein if none of the one or more storage volumes that are associated with the first network share comprise sufficient storage space to store the first portion of the first file and no additional storage volumes are available in the file server for dynamically expanding the amount of storage available for the first network share, the cache manager is configured to:

(A) free up storage space for the first network share by pruning data, by the cache manager, from one or more first-network-share-specific folders configured in the one or more storage volumes that are associated with the first network share,
wherein only data that has been previously backed up from the file server to a secondary storage device can be pruned to free up storage space for the first network share, and (B) after the pruning, store the first portion of the first file to a first-network-share-specific folder in one of the one or more storage volumes that are associated with the first network share.

SYA2a. The system of claim SYA2 wherein the pruning is also based on an age of the data that has been previously backed up.

SYA2b. The system of claim SYA2 wherein the pruning is also based on a size of a file that has been previously backed up.

SYA2c. The system of claim SYA2 wherein the amount of data that is pruned to free up storage space for the first network share is sufficient to reach an administrable threshold.

SYA2d. The system of claim SYA2 wherein criteria for pruning the data that has been previously backed up are administrable via a storage manager that is in communication with the file server.

SYA2-2. The system of claim SYA1 wherein for storage to the first network share on the file server the first file is divided into a plurality of portions including the first portion, and
wherein any given portion of the first file is stored to a first-network-share-specific folder configured on a respective one of the one or more storage volumes that are associated with the first network share, independently of whether another portion of the first file is also stored to the same one of the one or more storage volumes that are associated with the first network share, as determined by the cache manager.

SYA3. The system of claim SYA1 wherein whether sufficient storage space is available to store the first portion of the first file is determined by the cache manager based on one or more administrable thresholds.

SYA4. The system of claim SYA1 wherein the cache manager is further configured to:

for storing a second portion of the first file, identify a storage volume of the one or more storage volumes that are associated with the first network share, based at least in part on whether the identified storage volume comprises sufficient storage space for the second portion of the first file regardless of whether the first portion of the first file is stored in the same storage volume.

SYA5. The system of claim SYA1 wherein the receiving of the write request is performed by a protocol handler configured to execute on the file server;
wherein the protocol handler is configured to transmit the write request to a module that executes on the file server, wherein the module is associated with the first network share and is in communication with the cache manager, which is also associated with the first network share;
wherein the module is further configured to divide the first file into a plurality of portions including the first portion; and
wherein the module is further configured to transmit each portion of the plurality of portions to the cache manager associated with the first network share.

SYA6. The system of claim SYA1 wherein the cache manager, which is associated with the first network share, is configured to retain an index of which portion of the first file is stored in which storage volume of the one or more storage volumes associated with the first network share.

SYA7. The system of claim SYA1 wherein the cache manager, which is associated with the first network share, is configured to retain information about which portion of the first file is stored in which storage volume of the one or more storage volumes associated with the first network share.

SYA8. The system of claim SYA1 wherein the file server is further configured to on passing an administrative timeout interval, create an entry for the first file in a backup queue that is associated with a backup interface module that is associated with the first network share, wherein the backup interface also executes on the file server.

SYA9. The system of claim SYA8 wherein the backup queue comprises an entry for a second file that is also stored in one or more of the one or more volumes associated with the first network share as a result of another write request designating the first network share received by the file server from one of:

(A) the same client computing device as the first file, and
(B) a different client computing device than the first file.

SYA10. The system of claim SYA8 wherein the backup interface module is further configured to receive one or more instructions from a storage manager to generate at least one secondary copy of the first file;
wherein the backup interface module is further configured to generate in conjunction with a media agent that also is configured to execute on the file server, a secondary copy of the first file based on the one or more instructions received from the storage manager;
wherein the media agent is configured to store the generated secondary copy of the first file to a secondary storage device in communication with the file server; and
wherein the media agent is configured to report metadata about the secondary copy to at least one of an index server in communication with the file server, and the storage manager.

SYA10. The system of claim SYA8 wherein the backup interface module is further configured to receive one or more instructions from a storage manager to generate at least one secondary copy of the first file;
wherein the backup module is further configured to generate in conjunction with a media agent that executes on a secondary storage computing device in communication with the file server, a secondary copy of the first file based on the one or more instructions received from the storage manager;
wherein the media agent is configured to store the generated secondary copy of the first file to a secondary storage device in communication with the secondary storage computing device; and
wherein the media agent is further configured to report metadata about the secondary copy to at least one of an index server in communication with the file server, and the storage manager.

SYA12. The system of claim SYA1 wherein the file server is further configured to:
receive from a client computing device, a second write request in reference to a second file,
wherein the write request designates a second network share configured in the file server as a storage destination of the second write request;
identifying, by a second cache manager that executes on the file server, second one or more storage volumes configured in the file server that are associated with the second network share,
wherein each of the second one or more storage volumes comprises a respective second-network-share-specific folder that stores data for the second network share and only for the second network share,
wherein at least one of the second one or more storage volumes is the same as one of the one or more storage volumes associated with the first network share, and
wherein the second cache manager is distinct from and operates independently of the cache manager the operates in reference to the first network share; and
if one of the second one or more storage volumes associated with the second network share comprises sufficient storage space to store a first portion of the second file, store the first portion of the second file thereto by the second cache manager,
regardless of whether any data for the first network share is stored on the same one of the second one or more storage volumes.

SYA13. The system of claim SYA12 further comprising:
if all of the second one or more storage volumes that are associated with the second network share lack sufficient storage space to store the first portion of the second file, the second cache manager is configured to dynamically expand the amount of storage available for the second network share on the file server by:
(i) identifying a fourth storage volume configured in the file server, wherein the fourth storage volume comprises sufficient storage space to store the first portion of the second file regardless of whether any data for the first network share is stored in the fourth storage volume, and
(ii) configuring in the fourth storage volume a second-network-share-specific folder for storing data for the second network share and only for the second network share,
thereby associating the fourth storage volume with the second network share, and
(iii) storing the first portion of the second file to the second-network-share-specific folder configured in the fourth storage volume to dynamically expand the amount of storage available for the second network share on the file server.

SYA14. The system of claim SYA13 wherein expanding the amount of storage available for the first network share on the file server operates mutually independently from expanding the amount of storage available for the second network share on the file server.

SYA15. The system of claim SYA1 wherein the file server is further configured to:
receive from a client computing device, a read request in reference to the first file,
wherein the read request designates the first network share configured in the file server as a source for the read request;
based on the designated first network share in the read request, direct the read request to the cache manager that is associated with the first network share,
wherein the directing is performed by a module that is distinct from the cache manager and that is also configured to execute on the file server;
if the cache manager determines that the read request can be served at least in part from the one or more storage volumes configured in the file server that are associated with the first network share, the cache manager is further configured to retrieve at least some of the data requested by the read request from one or more first-network-share-specific folders configured in respective storage volumes in the one or more storage volumes associated with the first network share;
if the cache manager determines that the read request cannot be served from the one or more volumes in the file server that are associated with the first network share, the cache manager is further configured to trigger a restore operation to restore the first file from a secondary copy stored on a secondary storage device in communication with the file server, to be performed by a restore interface module that is configured to execute on the file server in conjunction with a media agent that is associated with the secondary storage device that comprises the secondary copy of the first file; and
respond to the read request, based on at least one of (a) the restored first file and (b) the data retrieved from the one or more storage volumes in the file server.

MMA1. A non-transitory computer-readable medium storing instructions that, when executed by at least one file server, cause the file server to perform operations comprising:
receiving, by the file server from a client computing device, a write request in reference to a first file,
wherein the write request designates a first network share configured in the file server as a storage destination of the write request;
identifying, by a cache manager that executes on the file server, one or more storage volumes configured in the file server that are associated with the first network share,
wherein each of the one or more storage volumes comprises a respective first-network-share-specific folder that stores data for the first network share and only for the first network share,
thereby associating each of the one or more storage volumes with the first network share;
if a first storage volume of the one or more storage volumes that are associated with the first network share comprises sufficient storage space to store a first portion of the first file, storing, by the cache manager, the first portion of the first file to the respective first-network-share-specific folder in the first storage volume;
if the first storage volume of the one or more storage volumes that are associated with the first network share lacks sufficient storage space to store the first portion of the first file, (a) identifying by the cache manager a second storage volume of the one or more storage volumes that are associated with the first network share, which second volume comprises sufficient storage space to store the first portion of the first file, and (b) regardless of whether other portions of the first file are stored to the same second storage volume,
storing, by the cache manager, the first portion of the first file to the respective first-network-share-specific folder in the identified second storage volume; and if none of the one or more storage volumes that are associated with the first network share comprise sufficient storage space to store the first portion of the first file, dynamically expanding the amount of storage available for the first network share on the file server by:

(i) identifying, by the cache manager a third storage volume configured in the file server, wherein the third storage volume comprises sufficient storage space to store the first portion of the first file, (ii) configuring by the cache manager in the third storage volume a first-network-share-specific folder for storing data for the first network share and only for the first network share,
thereby associating the third storage volume with the first network share, and (iii) storing, by the cache manager, the first portion of the first file to the first-network-share-specific folder configured in the third storage volume.

MMA2. The non-transitory computer-readable medium of claim MMA1, the operations further comprising:

if none of the one or more storage volumes that are associated with the first network share comprise sufficient storage space to store the first portion of the first file and no additional storage volumes are available in the file server for dynamically expanding the amount of storage available for the first network share, (A) freeing up storage space for the first network share by pruning data, by the cache manager, from one or more first-network-share-specific folders configured in the one or more storage volumes that are associated with the first network share,
wherein only data that has been previously backed up from the file server to a secondary storage device can be pruned to free up storage space for the first network share, and (B) after the pruning, storing, by the cache manager, the first portion of the first file to a first-network-share-specific folder in one of the one or more storage volumes that are associated with the first network share.

MMA2a. The non-transitory computer-readable medium of claim MA2 wherein the pruning is also based on an age of the data that has been previously backed up.

MMA2b. The non-transitory computer-readable medium of claim MA2 wherein the pruning is also based on a size of a file that has been previously backed up.

MMA2c. The non-transitory computer-readable medium of claim MA2 wherein the amount of data that is pruned to free up storage space for the first network share is sufficient to reach an administrable threshold.

MMA2d. The non-transitory computer-readable medium of claim MA2 wherein criteria for pruning the data that has been previously backed up are administrable via a storage manager that is in communication with the file server.

MMA2-2. The non-transitory computer-readable medium of claim MMA1 wherein for storage to the first network share on the file server the first file is divided into a plurality of portions including the first portion, and
wherein any given portion of the first file is stored to a first-network-share-specific folder configured on a respective one of the one or more storage volumes that are associated with the first network share, independently of whether another portion of the first file is also stored to the same one of the one or more storage volumes that are associated with the first network share, as determined by the cache manager.

MMA3. The non-transitory computer-readable medium of claim MMA1 wherein whether sufficient storage space is available to store the first portion of the first file is determined by the cache manager based on one or more administrable thresholds.

MMA4. The non-transitory computer-readable medium of claim MMA1, the operations further comprising:
for storing a second portion of the first file, identifying by the cache manager a storage volume of the one or more storage volumes that are associated with the first network share, based at least in part on whether the identified storage volume comprises sufficient storage space for the second portion of the first file regardless of whether the first portion of the first file is stored in the same storage volume.

MMA5. The non-transitory computer-readable medium of claim MMA1 wherein the receiving of the write request is performed by a protocol handler executing on the file server; and further comprising:
transmitting, by the protocol handler, the write request to a module that executes on the file server, wherein the module is associated with the first network share and is in communication with the cache manager, which is also associated with the first network share;
dividing, by the module, the first file into a plurality of portions including the first portion; and
transmitting, by the module, each portion of the plurality of portions to the cache manager associated with the first network share.

MMA6. The non-transitory computer-readable medium of claim MMA1 wherein the cache manager, which is associated with the first network share, retains an index of which portion of the first file is stored in which storage volume of the one or more storage volumes associated with the first network share.

MMA7. The non-transitory computer-readable medium of claim MMA1 wherein the cache manager, which is associated with the first network share, retains information about which portion of the first file is stored in which storage volume of the one or more storage volumes associated with the first network share.

MMA8. The non-transitory computer-readable medium of claim MMA1, the operations further comprising:
on passing an administrative timeout interval, creating an entry for the first file in a backup queue that is associated with a backup interface module that is associated with the first network share, wherein the backup interface also executes on the file server.

MMA9. The non-transitory computer-readable medium of claim MMA8 wherein the backup queue comprises an entry for a second file that is also stored in one or more of the one or more volumes associated with the first network share as a result of another write request designating the first network share received by the file server from one of:
(A) the same client computing device as the first file, and
(B) a different client computing device than the first file.

MMA10. The non-transitory computer-readable medium of claim MMA8 further comprising:

receiving, by the backup interface module, one or more instructions from a storage manager to generate at least one secondary copy of the first file;

generating, by the backup module in conjunction with a media agent that also executes on the file server, a secondary copy of the first file based on the one or more instructions received from the storage manager;

storing, by the media agent, the generated secondary copy of the first file to a secondary storage device in communication with the file server; and reporting metadata about the secondary copy to at least one of an index server in communication with the file server, and the storage manager.

MMA11. The non-transitory computer-readable medium of claim MMA8 further comprising:

receiving, by the backup interface module, one or more instructions from a storage manager to generate at least one secondary copy of the first file;

generating, by the backup module in conjunction with a media agent that executes on a secondary storage computing device in communication with the file server, a secondary copy of the first file based on the one or more instructions received from the storage manager;

storing, by the media agent, the generated secondary copy of the first file to a secondary storage device in communication with the secondary storage computing device; and reporting metadata about the secondary copy to at least one of an index server in communication with the file server, and the storage manager.

MMA12. The non-transitory computer-readable medium of claim MMA1 further comprising:

receiving, by the file server from a client computing device, a second write request in reference to a second file,
wherein the write request designates a second network share configured in the file server as a storage destination of the second write request;

identifying, by a second cache manager that executes on the file server, second one or more storage volumes configured in the file server that are associated with the second network share, wherein each of the second one or more storage volumes comprises a respective second-network-share-specific folder that stores data for the second network share and only for the second network share, wherein at least one of the second one or more storage volumes is the same as one of the one or more storage volumes associated with the first network share, and wherein the second cache manager is distinct from and operates independently of the cache manager the operates in reference to the first network share;

if one of the second one or more storage volumes associated with the second network share comprises sufficient storage space to store a first portion of the second file, storing the first portion of the second file thereto by the second cache manager, regardless of whether any data for the first network share is stored on the same one of the second one or more storage volumes.

MMA13. The non-transitory computer-readable medium of claim MMA1, the operations further comprising:

if all of the second one or more storage volumes that are associated with the second network share lack sufficient storage space to store the first portion of the second file, dynamically expanding the amount of storage available for the second network share on the file server by:

(i) identifying, by the second cache manager a fourth storage volume configured in the file server, wherein the fourth storage volume comprises sufficient storage space to store the first portion of the second file regardless of whether any data for the first network share is stored in the fourth storage volume, and (ii) configuring, by the second cache manager, in the fourth storage volume a second-network-share-specific folder for storing data for the second network share and only for the second network share, thereby associating the fourth storage volume with the second network share, and (iii) storing, by the second cache manager, the first portion of the second file to the second-network-share-specific folder configured in the fourth storage volume to dynamically expand the amount of storage available for the second network share on the file server.

MMA14. The non-transitory computer-readable medium of claim MMA13 wherein expanding the amount of storage available for the first network share on the file server operates mutually independently from expanding the amount of storage available for the second network share on the file server.

MMA15. The non-transitory computer-readable medium of claim MMA1, the operations further comprising:

receiving, by the file server from a client computing device, a read request in reference to the first file,
wherein the read request designates the first network share configured in the file server as a source for the read request;

based on the designated first network share in the read request, directing the read request to the cache manager that is associated with the first network share, wherein the directing is performed by a module that is distinct from the cache manager and that also executes on the file server;

if the cache manager determines that the read request can be served at least in part from the one or more storage volumes configured in the file server that are associated with the first network share, retrieving, by the cache manager, at least some of the data requested by the read request from one or more first-network-share-specific folders configured in respective storage volumes in the one or more storage volumes associated with the first network share;

if the cache manager determines that the read request cannot be served from the one or more volumes in the file server that are associated with the first network share:

(i) triggering, by the cache manager, a restore operation to restore the first file from a secondary copy stored on a secondary storage device in communication with the file server, and (ii) performing the restore operation by a restore interface module that executes on the file server in conjunction with a media agent that is associated with the secondary storage device that comprises the secondary copy of the first file; and responding to the read request by the file server, based on at least one of (a) the restored first file and (b) the data retrieved from the one or more storage volumes in the file server.

MAA1. A method for dynamically managing storage available to network shares configured in a file server, the method comprising:

receiving, by the file server from a client computing device, a write request in reference to a first file,
wherein the write request designates a first network share configured in the file server as a storage destination of the write request;

identifying, by a cache manager that executes on the file server, a first set of storage volumes configured in the file server that are associated with the first network share,
  wherein each of the first set of storage volumes comprises a respective first-network-share-specific folder that stores data for the first network share and only for the first network share,
    thereby associating each of the first set of storage volumes with the first network share;
if a first storage volume of the first set of storage volumes that are associated with the first network share comprises sufficient storage space to store a first portion of the first file, storing, by the cache manager, the first portion of the first file to the respective first-network-share-specific folder in the first storage volume regardless of whether other portions of the first file are stored to the same first storage volume;
if none of the first set of storage volumes that are associated with the first network share comprise sufficient storage space to store the first portion of the first file, dynamically expanding the amount of storage available for the first network share on the file server by:
  (i) identifying, by the cache manager a second storage volume configured in the file server, outside the first set, that comprises sufficient storage space to store the first portion of the first file,
  (ii) configuring by the cache manager in the second storage volume a first-network-share-specific folder for storing data for the first network share and only for the first network share,
    thereby associating the second storage volume with the first network share, and
    thereby adding the second volume to the first set of storage volumes that are associated with the first network share, regardless of whether the second volume comprises data for another network share configured on the file server, and
  (iii) storing, by the cache manager, the first portion of the first file to the first-network-share-specific folder configured in the second storage volume.

MAA2. The method of claim MAA1 further comprising:
if none of the first set of storage volumes that are associated with the first network share comprise sufficient storage space to store the first portion of the first file and no additional storage volumes are available in the file server for dynamically expanding the amount of storage available for the first network share,
  (A) freeing up storage space for the first network share by pruning data, by the cache manager, from one or more first-network-share-specific folders configured in the first set of storage volumes that are associated with the first network share,
    wherein only data that has been previously backed up from the file server to a secondary storage device can be pruned to free up storage space for the first network share, and
  (B) after the pruning operation, storing, by the cache manager, the first portion of the first file to a first-network-share-specific folder in one of the first set of storage volumes that are associated with the first network share.

MAA3. The method of claim MAA1 further comprising:
if none of the first set of storage volumes that are associated with the first network share comprise sufficient storage space to store the first portion of the first file and no additional storage volumes are available in the file server for dynamically expanding the amount of storage available for the first network share, freeing up storage space for the first network share by:
  (A) identifying, by the cache manager, based on administrable criteria, a set of data to prune from one or more first-network-share-specific folders configured in the first set of storage volumes that are associated with the first network share,
  (B) causing the identified set of data to be backed up to a secondary storage device in communication with the file server,
  (C) pruning the identified set of data, by the cache manager, from the first set of storage volumes that are associated with the first network share, and
  (B) after the pruning operation, storing, by the cache manager, the first portion of the first file to a first-network-share-specific folder in one of the first set of storage volumes that are associated with the first network share.

MB1. A method for dynamically and mutually independently managing storage for multiple network shares configured in a file server, the method comprising:
receiving, by the file server from a client computing device, a write request in reference to a first file,
  wherein the write request designates a first network share configured in the file server as a storage destination of the write request;
identifying, by a first cache manager which is associated with the first network share and which executes on the file server, a first set of storage volumes configured in the file server that are associated with the first network share,
  wherein each of the first set of storage volumes comprises a respective first-network-share-specific folder that stores data for the first network share and only for the first network share, thereby associating each of the first set of storage volumes with the first network share;
if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;
if none of the first set of storage volumes comprise sufficient storage space to store the first portion of the first file, dynamically expanding the amount of storage available for the first network share on the file server by:
  (i) identifying, by the first cache manager a second storage volume configured in the file server, outside the first set, that comprises sufficient storage space to store the first portion of the first file, and
  (ii) configuring, by the first cache manager, in the second storage volume a first-network-share-specific folder for storing data for the first network share and only for the first network share,
    thereby associating the second storage volume with the first network share, and
  (iii) storing, by the cache manager, the first portion of the first file to the first-network-share-specific folder configured in the second storage volume to dynamically expand the amount of storage available for the first network share on the file server;
receiving, by the file server from a client computing device, a second write request in reference to a second file,
  wherein the write request designates a second network share configured in the file server as a storage destination of the second write request;

identifying, by a second cache manager which is associated with the second network share and which executes on the file server, a second set of storage volumes configured in the file server that are associated with the second network share,
wherein each of the second set of storage volumes comprises a respective second-network-share-specific folder that stores data for the second network share and only for the second network share,
wherein at least one of the second set of storage volumes is the same as one of the first set of storage volumes associated with the first network share, and
wherein the second cache manager is distinct from and operates independently of the first cache manager;
if one of the second set of storage volumes associated with the second network share comprises sufficient storage space to store a first portion of the second file, storing by the second cache manager the first portion of the second file to the second-network-share-specific folder configured therein,
regardless of whether any data for the first network share is stored on the same one of the second set of storage volumes; and
if none of the storage volumes in the second set comprise sufficient storage space to store the first portion of the second file, dynamically expanding the amount of storage available for the second network share on the file server by:
(a) identifying, by the second cache manager a third storage volume configured in the file server, outside the second set, wherein the third storage volume comprises sufficient storage space to store the first portion of the second file regardless of whether any data for the first network share is stored in the third storage volume, and
(b) configuring, by the cache manager, in the third storage volume a second-network-share-specific folder for storing data for the second network share and only for the second network share,
thereby associating the third storage volume with the second network share, and
(c) storing, by the second cache manager, the first portion of the second file to the second-network-share-specific folder configured in the third storage volume to dynamically expand the amount of storage available for the second network share on the file server; and
wherein expanding the amount of storage available for the first network share on the file server operates mutually independently from expanding the amount of storage available for the second network share on the file server.

MB2. The method of claim MB1 further comprising:
if none of the first set of storage volumes that are associated with the first network share comprise sufficient storage space to store the first portion of the first file and no additional storage volumes are available in the file server for dynamically expanding the amount of storage available for the first network share,
(A) freeing up storage space for the first network share by pruning data, by the first cache manager, from one or more first-network-share-specific folders configured in the first set of storage volumes,
wherein only data that has been previously backed up from the file server to a secondary storage device can be pruned, and
(B) after the pruning, storing, by the first cache manager, the first portion of the first file to a first-network-share-specific folder in one of the first set of storage volumes that are associated with the first network share; and
wherein freeing up storage space for the first network share on the file server by pruning data operates mutually independently from expanding the amount of storage available for the second network share on the file server.

MB3. The method of claim MB1 further comprising:
if none of the second set of storage volumes that are associated with the second network share comprise sufficient storage space to store the first portion of the second file and no additional storage volumes are available in the file server for dynamically expanding the amount of storage available for the second network share,
(A) freeing up storage space for the second network share by pruning data, by the second cache manager, from one or more second-network-share-specific folders configured in the second set of storage volumes,
wherein only data that has been previously backed up from the file server to a secondary storage device can be pruned, and
(B) after the pruning, storing, by the second cache manager, the first portion of the second file to a second-network-share-specific folder in one of the second set of storage volumes that are associated with the second network share; and
wherein freeing up storage space for the second network share on the file server by pruning data operates mutually independently from expanding the amount of storage available for the first network share on the file server.

SYB1. A system for dynamically managing storage for multiple network shares configured in a file server, the system comprising:
a file server in communication with a first client computing device, wherein the file server comprises a plurality of storage volumes;
a secondary storage device in communication with the file server;
wherein the file server is configured to perform operations comprising:
receiving, by the file server from a client computing device, a write request in reference to a first file,
wherein the write request designates a first network share configured in the file server as a storage destination of the write request;
identifying, by a first cache manager which is associated with the first network share and which executes on the file server, a first set of storage volumes configured in the file server that are associated with the first network share,
wherein each of the first set of storage volumes comprises a respective first-network-share-specific folder that stores data for the first network share and only for the first network share, thereby associating each of the first set of storage volumes with the first network share;
if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;
if none of the first set of storage volumes comprise sufficient storage space to store the first portion of the first file, dynamically expanding the amount of storage available for the first network share on the file server by:
(i) identifying, by the first cache manager a second storage volume configured in the file server, outside the first set, that comprises sufficient storage space to store the first portion of the first file, and (ii) configuring, by the first cache manager, in the second storage volume a first-network-share-specific folder for storing data for the first network share and only for the first network share,
thereby associating the second storage volume with the first network share, and (iii) storing, by the cache manager, the first portion of the first file to the first-network-share-specific folder configured in the second storage volume to dynamically expand the amount of storage available for the first network share on the file server;

receiving, by the file server from a client computing device, a second write request in reference to a second file,
wherein the write request designates a second network share configured in the file server as a storage destination of the second write request;

identifying, by a second cache manager which is associated with the second network share and which executes on the file server, a second set of storage volumes configured in the file server that are associated with the second network share,
wherein each of the second set of storage volumes comprises a respective second-network-share-specific folder that stores data for the second network share and only for the second network share,
wherein at least one of the second set of storage volumes is the same as one of the first set of storage volumes associated with the first network share, and
wherein the second cache manager is distinct from and operates independently of the first cache manager;

if one of the second set of storage volumes associated with the second network share comprises sufficient storage space to store a first portion of the second file, storing by the second cache manager the first portion of the second file to the second-network-share-specific folder configured therein,
regardless of whether any data for the first network share is stored on the same one of the second set of storage volumes; and if none of the storage volumes in the second set comprise sufficient storage space to store the first portion of the second file, dynamically expanding the amount of storage available for the second network share on the file server by:

(a) identifying, by the second cache manager a third storage volume configured in the file server, outside the second set, wherein the third storage volume comprises sufficient storage space to store the first portion of the second file regardless of whether any data for the first network share is stored in the third storage volume, and (b) configuring, by the cache manager, in the third storage volume a second-network-share-specific folder for storing data for the second network share and only for the second network share,
thereby associating the third storage volume with the second network share, and (c) storing, by the second cache manager, the first portion of the second file to the second-network-share-specific folder configured in the third storage volume to dynamically expand the amount of storage available for the second network share on the file server; and wherein expanding the amount of storage available for the first network share on the file server operates mutually independently from expanding the amount of storage available for the second network share on the file server.

SYB2. The system of claim SYB1 the operations further comprising:
if none of the first set of storage volumes that are associated with the first network share comprise sufficient storage space to store the first portion of the first file and no additional storage volumes are available in the file server for dynamically expanding the amount of storage available for the first network share, (A) freeing up storage space for the first network share by pruning data, by the first cache manager, from one or more first-network-share-specific folders configured in the first set of storage volumes,
wherein only data that has been previously backed up from the file server to a secondary storage device can be pruned, and (B) after the pruning, storing, by the first cache manager, the first portion of the first file to a first-network-share-specific folder in one of the first set of storage volumes that are associated with the first network share; and wherein freeing up storage space for the first network share on the file server by pruning data operates mutually independently from expanding the amount of storage available for the second network share on the file server.

SYB3. The system of claim SYB1 the operations further comprising:
if none of the second set of storage volumes that are associated with the second network share comprise sufficient storage space to store the first portion of the second file and no additional storage volumes are available in the file server for dynamically expanding the amount of storage available for the second network share, (A) freeing up storage space for the second network share by pruning data, by the second cache manager, from one or more second-network-share-specific folders configured in the second set of storage volumes,
wherein only data that has been previously backed up from the file server to a secondary storage device can be pruned, and (B) after the pruning, storing, by the second cache manager, the first portion of the second file to a second-network-share-specific folder in one of the second set of storage volumes that are associated with the second network share; and wherein freeing up storage space for the second network share on the file server by pruning data operates mutually independently from expanding the amount of storage available for the first network share on the file server.

MMB1. A non-transitory computer-readable medium storing instructions that, when executed by at least one file server, cause the file server to perform operations comprising:
receiving, by the file server from a client computing device, a write request in reference to a first file,
wherein the write request designates a first network share configured in the file server as a storage destination of the write request;

identifying, by a first cache manager which is associated with the first network share and which executes on the file server, a first set of storage volumes configured in the file server that are associated with the first network share,
- wherein each of the first set of storage volumes comprises a respective first-network-share-specific folder that stores data for the first network share and only for the first network share, thereby associating each of the first set of storage volumes with the first network share;

if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;

if none of the first set of storage volumes comprise sufficient storage space to store the first portion of the first file, dynamically expanding the amount of storage available for the first network share on the file server by:
- (i) identifying, by the first cache manager a second storage volume configured in the file server, outside the first set, that comprises sufficient storage space to store the first portion of the first file, and
- (ii) configuring, by the first cache manager, in the second storage volume a first-network-share-specific folder for storing data for the first network share and only for the first network share,
  - thereby associating the second storage volume with the first network share, and
- (iii) storing, by the cache manager, the first portion of the first file to the first-network-share-specific folder configured in the second storage volume to dynamically expand the amount of storage available for the first network share on the file server;

receiving, by the file server from a client computing device, a second write request in reference to a second file,
- wherein the write request designates a second network share configured in the file server as a storage destination of the second write request;

identifying, by a second cache manager which is associated with the second network share and which executes on the file server, a second set of storage volumes configured in the file server that are associated with the second network share,
- wherein each of the second set of storage volumes comprises a respective second-network-share-specific folder that stores data for the second network share and only for the second network share,
- wherein at least one of the second set of storage volumes is the same as one of the first set of storage volumes associated with the first network share, and
- wherein the second cache manager is distinct from and operates independently of the first cache manager;

if one of the second set of storage volumes associated with the second network share comprises sufficient storage space to store a first portion of the second file, storing by the second cache manager the first portion of the second file to the second-network-share-specific folder configured therein, regardless of whether any data for the first network share is stored on the same one of the second set of storage volumes; and if none of the storage volumes in the second set comprise sufficient storage space to store the first portion of the second file, dynamically expanding the amount of storage available for the second network share on the file server by:
- (a) identifying, by the second cache manager a third storage volume configured in the file server, outside the second set, wherein the third storage volume comprises sufficient storage space to store the first portion of the second file regardless of whether any data for the first network share is stored in the third storage volume, and
- (b) configuring, by the cache manager, in the third storage volume a second-network-share-specific folder for storing data for the second network share and only for the second network share,
  - thereby associating the third storage volume with the second network share, and
- (c) storing, by the second cache manager, the first portion of the second file to the second-network-share-specific folder configured in the third storage volume to dynamically expand the amount of storage available for the second network share on the file server; and wherein expanding the amount of storage available for the first network share on the file server operates mutually independently from expanding the amount of storage available for the second network share on the file server.

MMB2. The non-transitory computer-readable medium of claim MMB1, the operations further comprising:

if none of the first set of storage volumes that are associated with the first network share comprise sufficient storage space to store the first portion of the first file and no additional storage volumes are available in the file server for dynamically expanding the amount of storage available for the first network share,
- (A) freeing up storage space for the first network share by pruning data, by the first cache manager, from one or more first-network-share-specific folders configured in the first set of storage volumes,
  - wherein only data that has been previously backed up from the file server to a secondary storage device can be pruned, and
- (B) after the pruning, storing, by the first cache manager, the first portion of the first file to a first-network-share-specific folder in one of the first set of storage volumes that are associated with the first network share; and wherein freeing up storage space for the first network share on the file server by pruning data operates mutually independently from expanding the amount of storage available for the second network share on the file server.

MMB3. The non-transitory computer-readable medium of claim MMB1, the operations further comprising:

if none of the second set of storage volumes that are associated with the second network share comprise sufficient storage space to store the first portion of the second file and no additional storage volumes are available in the file server for dynamically expanding the amount of storage available for the second network share,
- (A) freeing up storage space for the second network share by pruning data, by the second cache manager, from one or more second-network-share-specific folders configured in the second set of storage volumes,
  - wherein only data that has been previously backed up from the file server to a secondary storage device can be pruned, and
- (B) after the pruning, storing, by the second cache manager, the first portion of the second file to a second-network-share-specific folder in one of the second set of storage volumes that are associated with the second network share; and wherein freeing up storage space for the second network share on the file server by pruning data operates mutually independently from expanding the amount of storage available for the first network share on the file server.

MC1. A method for dynamically managing storage for network shares configured in a file server, the method comprising:
  receiving, by the file server from a client computing device, a write request in reference to a first file,
    wherein the write request designates a first network share configured in the file server as a storage destination of the write request;
  identifying, by a first cache manager which is associated with the first network share and which executes on the file server, a first set of storage volumes configured in the file server that are associated with the first network share,
    wherein each of the first set of storage volumes comprises a respective first-network-share-specific folder that stores data for the first network share and only for the first network share, thereby associating each of the first set of storage volumes with the first network share;
  if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;
  if none of the first set of storage volumes that are associated with the first network share comprise sufficient storage space to store the first portion of the first file,
    (A) freeing up storage space for the first network share by pruning data, by the first cache manager, from one or more first-network-share-specific folders configured in the first set of storage volumes,
      wherein only data that has been previously backed up from the file server to a secondary storage device can be pruned, and
    (B) after the pruning, storing, by the first cache manager, the first portion of the first file to a first-network-share-specific folder in one of the first set of storage volumes that are associated with the first network share.

MC2. The method of claim MC1 further comprising:
  if none of the first set of storage volumes comprise sufficient storage space to store the first portion of the first file and a second storage volume is configured in the file server, outside the first set, that comprises sufficient storage space to store the first portion of the first file, dynamically expanding the amount of storage available for the first network share on the file server by:
    (i) configuring by the first cache manager in the second storage volume a first-network-share-specific folder for storing data for the first network share and only for the first network share,
      thereby associating the second storage volume with the first network share, and
    (ii) storing, by the cache manager, the first portion of the first file to the first-network-share-specific folder configured in the second storage volume.

SYC1. A system for dynamically managing storage for network shares configured in a file server, the system comprising:
  a file server in communication with a first client computing device, wherein the file server comprises a plurality of storage volumes;
  a secondary storage device in communication with the file server;
  wherein the file server is configured to perform operations comprising:
    receiving, by the file server from a client computing device, a write request in reference to a first file,
      wherein the write request designates a first network share configured in the file server as a storage destination of the write request;
    identifying, by a first cache manager which is associated with the first network share and which executes on the file server, a first set of storage volumes configured in the file server that are associated with the first network share,
      wherein each of the first set of storage volumes comprises a respective first-network-share-specific folder that stores data for the first network share and only for the first network share, thereby associating each of the first set of storage volumes with the first network share;
    if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;
    if none of the first set of storage volumes that are associated with the first network share comprise sufficient storage space to store the first portion of the first file,
      (A) freeing up storage space for the first network share by pruning data, by the first cache manager, from one or more first-network-share-specific folders configured in the first set of storage volumes,
        wherein only data that has been previously backed up from the file server to a secondary storage device can be pruned, and
      (B) after the pruning, storing, by the first cache manager, the first portion of the first file to a first-network-share-specific folder in one of the first set of storage volumes that are associated with the first network share.

SYC2. The system of claim SYC1, the operations further comprising:
  if none of the first set of storage volumes comprise sufficient storage space to store the first portion of the first file and a second storage volume is configured in the file server, outside the first set, that comprises sufficient storage space to store the first portion of the first file, dynamically expanding the amount of storage available for the first network share on the file server by:
    (i) configuring by the first cache manager in the second storage volume a first-network-share-specific folder for storing data for the first network share and only for the first network share,
      thereby associating the second storage volume with the first network share, and
    (ii) storing, by the cache manager, the first portion of the first file to the first-network-share-specific folder configured in the second storage volume.

MMC1. A non-transitory computer-readable medium storing instructions that, when executed by at least one file server, cause the file server to perform operations comprising:
  receiving, by the file server from a client computing device, a write request in reference to a first file, wherein the write request designates a first network share configured in the file server as a storage destination of the write request;

identifying, by a first cache manager which is associated with the first network share and which executes on the file server, a first set of storage volumes configured in the file server that are associated with the first network share,
   wherein each of the first set of storage volumes comprises a respective first-network-share-specific folder that stores data for the first network share and only for the first network share, thereby associating each of the first set of storage volumes with the first network share;

if one of the first set of storage volumes associated with the first network share comprises sufficient storage space to store a first portion of the first file, storing by the first cache manager the first portion of the first file to the first-network-share-specific folder configured therein regardless of whether other portions of the first file are stored to the same one of the first set of storage volumes;

if none of the first set of storage volumes that are associated with the first network share comprise sufficient storage space to store the first portion of the first file,
   (A) freeing up storage space for the first network share by pruning data, by the first cache manager, from one or more first-network-share-specific folders configured in the first set of storage volumes,
      wherein only data that has been previously backed up from the file server to a secondary storage device can be pruned, and
   (B) after the pruning, storing, by the first cache manager, the first portion of the first file to a first-network-share-specific folder in one of the first set of storage volumes that are associated with the first network share.

MMC2. The non-transitory computer-readable medium of claim MMC1, the operations further comprising:

if none of the first set of storage volumes comprise sufficient storage space to store the first portion of the first file and a second storage volume is configured in the file server, outside the first set, that comprises sufficient storage space to store the first portion of the first file, dynamically expanding the amount of storage available for the first network share on the file server by:
   (i) configuring by the first cache manager in the second storage volume a first-network-share-specific folder for storing data for the first network share and only for the first network share,
      thereby associating the second storage volume with the first network share, and
   (ii) storing, by the cache manager, the first portion of the first file to the first-network-share-specific folder configured in the second storage volume.

MR1. A method for retrieving data from a network share cache if available instead of retrieving the data from a secondary copy, the method comprising:

receiving, by the file server from a client computing device, a read request in reference to a first file,
   wherein the read request designates a first network share configured in the file server as a source for the read request;

based on the designated first network share in the read request, directing the read request to a first cache manager that is associated with the first network share, wherein the first cache manager executes on the file server,
   wherein the directing is performed by a module that is distinct from the first cache manager and that also executes on the file server;

if the first cache manager determines that the read request can be served at least in part from a first set of storage volumes configured in the file server that are associated with the first network share,
   retrieving, by the first cache manager, at least some of the data requested by the read request from one or more first-network-share-specific folders configured in respective storage volumes in the first set;

if the first cache manager determines that the read request cannot be served from the first set of storage volumes in the file server:
   (i) triggering, by the first cache manager, a restore operation to restore the first file from a secondary copy stored on a secondary storage device in communication with the file server, and
   (ii) performing the restore operation by a restore interface module that executes on the file server in conjunction with a media agent that is associated with the secondary storage device that comprises the secondary copy of the first file; and responding to the read request by the file server, based on at least one of (a) the restored first file and (b) the data retrieved from the first set of storage volumes in the file server.

MR2. The method of claim MR1 further comprising:

dividing, by the module, the restored first file into a plurality of portions including a first portion;

transmitting, by the module, each portion of the plurality of portions to the first cache manager, which is associated with the first network share;

if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and if none of the first set of storage volumes that are associated with the first network share comprise sufficient storage space to store the first portion of the restored first file, dynamically expanding the amount of storage available for the first network share on the file server by:
   (i) identifying, by the first cache manager a second storage volume configured in the file server, outside the first set, that comprises sufficient storage space to store the first portion of the restored first file,
   (ii) configuring by the first cache manager in the second storage volume a first-network-share-specific folder for storing data for the first network share and only for the first network share,
      thereby associating the second storage volume with the first network share, and
      thereby adding the second volume to the first set of storage volumes that are associated with the first network share, regardless of whether the second volume comprises data for another network share configured on the file server, and
   (iii) storing, by the cache manager, the first portion of the restored first file to the first-network-share-specific folder configured in the second storage volume.

MR3. The method of claim MR1 further comprising:

dividing, by the module, the restored first file into a plurality of portions including a first portion;

transmitting, by the module, each portion of the plurality of portions to the first cache manager, which is associated with the first network share;

if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and if none of the first set of storage volumes that are associated with the first network share comprise sufficient storage space to store the first portion of the restored first file,
  (A) freeing up storage space for the first network share by pruning data, by the first cache manager, from one or more first-network-share-specific folders configured in the first set of storage volumes,
    wherein only data that has been previously backed up from the file server to a secondary storage device can be pruned to free up space, and
  (B) after the pruning, storing, by the first cache manager, the first portion of the restored first file to a first-network-share-specific folder in one of the first set of storage volumes that are associated with the first network share.

MR4. The method of claim MR1 wherein the media agent also executes on the file server.

MR5. The method of claim MR1 wherein the media agent executes on a secondary storage computing device that is in communication with the file server and with the secondary storage device.

SYR1. A system for retrieving data from a network share cache if available instead of retrieving the data from a secondary copy, the system comprising:
  a file server in communication with a first client computing device, wherein the file server comprises a plurality of storage volumes;
  a secondary storage device in communication with the file server;
  wherein the file server is configured to perform operations comprising:
    receiving, by the file server from a client computing device, a read request in reference to a first file,
      wherein the read request designates a first network share configured in the file server as a source for the read request;
    based on the designated first network share in the read request, directing the read request to a first cache manager that is associated with the first network share, wherein the first cache manager executes on the file server,
      wherein the directing is performed by a module that is distinct from the first cache manager and that also executes on the file server;
    if the first cache manager determines that the read request can be served at least in part from a first set of storage volumes configured in the file server that are associated with the first network share,
      retrieving, by the first cache manager, at least some of the data requested by the read request from one or more first-network-share-specific folders configured in respective storage volumes in the first set;
    if the first cache manager determines that the read request cannot be served from the first set of storage volumes in the file server:
      (i) triggering, by the first cache manager, a restore operation to restore the first file from a secondary copy stored on a secondary storage device in communication with the file server, and
      (ii) performing the restore operation by a restore interface module that executes on the file server in conjunction with a media agent that is associated with the secondary storage device that comprises the secondary copy of the first file; and
    responding to the read request by the file server, based on at least one of (a) the restored first file and (b) the data retrieved from the first set of storage volumes in the file server.

SYR2. The system of claim SYR1, the operations further comprising:
  dividing, by the module, the restored first file into a plurality of portions including a first portion;
  transmitting, by the module, each portion of the plurality of portions to the first cache manager, which is associated with the first network share;
  if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and
  if none of the first set of storage volumes that are associated with the first network share comprise sufficient storage space to store the first portion of the restored first file, dynamically expanding the amount of storage available for the first network share on the file server by:
    (i) identifying, by the first cache manager a second storage volume configured in the file server, outside the first set, that comprises sufficient storage space to store the first portion of the restored first file,
    (ii) configuring by the first cache manager in the second storage volume a first-network-share-specific folder for storing data for the first network share and only for the first network share,
      thereby associating the second storage volume with the first network share, and
      thereby adding the second volume to the first set of storage volumes that are associated with the first network share, regardless of whether the second volume comprises data for another network share configured on the file server, and
    (iii) storing, by the cache manager, the first portion of the restored first file to the first-network-share-specific folder configured in the second storage volume.

SYR3. The system of claim SYR1, the operations further comprising:
  dividing, by the module, the restored first file into a plurality of portions including a first portion;
  transmitting, by the module, each portion of the plurality of portions to the first cache manager, which is associated with the first network share;
  if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and if none of the first set of storage volumes that are associated with the first network share comprise sufficient storage space to store the first portion of the restored first file,
- (A) freeing up storage space for the first network share by pruning data, by the first cache manager, from one or more first-network-share-specific folders configured in the first set of storage volumes,
  - wherein only data that has been previously backed up from the file server to a secondary storage device can be pruned to free up space, and
- (B) after the pruning, storing, by the first cache manager, the first portion of the restored first file to a first-network-share-specific folder in one of the first set of storage volumes that are associated with the first network share.

SYR4. The system of claim SYR1 wherein the media agent also executes on the file server.

SYR5. The system of claim SYR1 wherein the media agent executes on a secondary storage computing device that is in communication with the file server and with the secondary storage device.

MMR1. A non-transitory computer-readable medium storing instructions that, when executed by at least one file server, cause the file server to perform operations comprising:
receiving, by the file server from a client computing device, a read request in reference to a first file,
  wherein the read request designates a first network share configured in the file server as a source for the read request;
based on the designated first network share in the read request, directing the read request to a first cache manager that is associated with the first network share, wherein the first cache manager executes on the file server,
  wherein the directing is performed by a module that is distinct from the first cache manager and that also executes on the file server;
if the first cache manager determines that the read request can be served at least in part from a first set of storage volumes configured in the file server that are associated with the first network share,
  retrieving, by the first cache manager, at least some of the data requested by the read request from one or more first-network-share-specific folders configured in respective storage volumes in the first set;
if the first cache manager determines that the read request cannot be served from the first set of storage volumes in the file server:
  (i) triggering, by the first cache manager, a restore operation to restore the first file from a secondary copy stored on a secondary storage device in communication with the file server, and
  (ii) performing the restore operation by a restore interface module that executes on the file server in conjunction with a media agent that is associated with the secondary storage device that comprises the secondary copy of the first file; and
responding to the read request by the file server, based on at least one of (a) the restored first file and (b) the data retrieved from the first set of storage volumes in the file server.

MMR2. The non-transitory computer-readable medium of claim MR1, the operations further comprising:
dividing, by the module, the restored first file into a plurality of portions including a first portion;
transmitting, by the module, each portion of the plurality of portions to the first cache manager, which is associated with the first network share;
if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and
if none of the first set of storage volumes that are associated with the first network share comprise sufficient storage space to store the first portion of the restored first file, dynamically expanding the amount of storage available for the first network share on the file server by:
  (i) identifying, by the first cache manager a second storage volume configured in the file server, outside the first set, that comprises sufficient storage space to store the first portion of the restored first file,
  (ii) configuring by the first cache manager in the second storage volume a first-network-share-specific folder for storing data for the first network share and only for the first network share,
    thereby associating the second storage volume with the first network share, and
    thereby adding the second volume to the first set of storage volumes that are associated with the first network share, regardless of whether the second volume comprises data for another network share configured on the file server, and
  (iii) storing, by the cache manager, the first portion of the restored first file to the first-network-share-specific folder configured in the second storage volume.

MMR3. The non-transitory computer-readable medium of claim MR1, the operations further comprising:
dividing, by the module, the restored first file into a plurality of portions including a first portion;
transmitting, by the module, each portion of the plurality of portions to the first cache manager, which is associated with the first network share;
if a first storage volume of the first set of storage volumes that are associated with the first network share comprises sufficient storage space to store the first portion of the restored first file, storing, by the first cache manager, the first portion of the restored first file to a respective first-network-share-specific folder in the first storage volume regardless of whether other portions of the restored first file are stored to the same first storage volume; and
if none of the first set of storage volumes that are associated with the first network share comprise sufficient storage space to store the first portion of the restored first file,
  (A) freeing up storage space for the first network share by pruning data, by the first cache manager, from one or more first-network-share-specific folders configured in the first set of storage volumes,
    wherein only data that has been previously backed up from the file server to a secondary storage device can be pruned to free up space, and
  (B) after the pruning, storing, by the first cache manager, the first portion of the restored first file to a first-network-share-specific folder in one of the first set of storage volumes that are associated with the first network share.

MMR4. The non-transitory computer-readable medium of claim MR1 wherein the media agent also executes on the file server.

MMR5. The non-transitory computer-readable medium of claim MR1 wherein the media agent executes on a secondary storage computing device that is in communication with the file server and with the secondary storage device.

EE1. A method for performing an infinite backup operation in a data storage system, the method comprising:
with a first computing device comprising one or more hardware processors and in communication with one or more secondary storage devices:
receiving, from a second computing device, a request to generate network path information associated with the client computing device, the network path information identifying a location within the one or more secondary storage devices that is associated with the client computing device, the request including client information identifying at least a data type of primary data stored on one or more primary storage devices associated with the client computing device;
generating the network path information based on the received client information;
transmitting the generated network path information to the second computing device;
receiving, from the client computing device, a request to store a copy of the primary data currently stored on the one or more primary storage devices onto the one or more secondary storage devices associated with the first computing device as part of a data protection operation, the request including the network path information generated by the first computing device; and
causing the copy of the primary data to be stored in the location within the one or more secondary storage devices associated with the client computing device based on the network path information.

EE2. A system for performing an infinite backup operation, the method comprising:
one or more secondary storage computing devices comprising computer hardware and configured to store backup copies of client data associated with a client computing device;
a first computing device comprising computer hardware and in network communication with the client computing device, wherein the first computing device is configured to:
receive, from a second computing device, a request to generate network path information associated with the client computing device, the network path information identifying a location within the one or more secondary storage devices that is associated with the client computing device, the request including client information identifying at least a data type of primary data stored on one or more primary storage devices associated with the client computing device;
generate the network path information based on the received client information;
transmit the generated network path information to the second computing device;
receive, from the client computing device, a request to store a copy of the primary data currently stored on the one or more primary storage devices onto the one or more secondary storage devices associated with the first computing device as part of a data protection operation, the request including the network path information generated by the first computing device; and
cause the copy of the primary data to be stored in the location within the one or more secondary storage devices associated with the client computing device based on the network path information.

In other embodiments, a system or systems may operate according to one or more of the methods and/or according to the computer-readable media recited in the preceding paragraphs. In yet other embodiments, a method or methods may operate according to one or more of the systems and/or according to the computer-readable media recited in the preceding paragraphs. In yet more embodiments, a computer-readable medium or media, excluding transitory propagating signals, may cause one or more computing devices having one or more processors and non-transitory computer-readable memory to operate according to one or more of the systems and/or methods recited in the preceding paragraphs.

Terminology

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense, i.e., in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

In some embodiments, certain operations, acts, events, or functions of any of the algorithms described herein can be performed in a different sequence, can be added, merged, or left out altogether (e.g., not all are necessary for the practice of the algorithms). In certain embodiments, operations, acts, functions, or events can be performed concurrently, e.g., through multi-threaded processing, interrupt processing, or multiple processors or processor cores or on other parallel architectures, rather than sequentially.

Systems and modules described herein may comprise software, firmware, hardware, or any combination(s) of software, firmware, or hardware suitable for the purposes described. Software and other modules may reside and execute on servers, workstations, personal computers, computerized tablets, PDAs, and other computing devices suitable for the purposes described herein. Software and other modules may be accessible via local computer memory, via a network, via a browser, or via other means suitable for the purposes described herein. Data structures described herein may comprise computer files, variables, programming arrays, programming structures, or any electronic information storage schemes or methods, or any combinations thereof, suitable for the purposes described herein. User interface elements described herein may comprise elements from graphical user interfaces, interactive voice response, command line interfaces, and other suitable interfaces.

Further, processing of the various components of the illustrated systems can be distributed across multiple machines, networks, and other computing resources. Two or more components of a system can be combined into fewer components. Various components of the illustrated systems can be implemented in one or more virtual machines, rather than in dedicated computer hardware systems and/or computing devices. Likewise, the data repositories shown can represent physical and/or logical data storage, including, e.g., storage area networks or other distributed storage systems. Moreover, in some embodiments the connections between the components shown represent possible paths of data flow, rather than actual connections between hardware. While some examples of possible connections are shown, any of the subset of the components shown can communicate with any other subset of components in various implementations.

Embodiments are also described above with reference to flow chart illustrations and/or block diagrams of methods, apparatus (systems) and computer program products. Each block of the flow chart illustrations and/or block diagrams, and combinations of blocks in the flow chart illustrations and/or block diagrams, may be implemented by computer program instructions. Such instructions may be provided to a processor of a general purpose computer, special purpose computer, specially-equipped computer (e.g., comprising a high-performance database server, a graphics subsystem, etc.) or other programmable data processing apparatus to produce a machine, such that the instructions, which execute via the processor(s) of the computer or other programmable data processing apparatus, create means for implementing the acts specified in the flow chart and/or block diagram block or blocks. These computer program instructions may also be stored in a non-transitory computer-readable memory that can direct a computer or other programmable data processing apparatus to operate in a particular manner, such that the instructions stored in the computer-readable memory produce an article of manufacture including instruction means which implement the acts specified in the flow chart and/or block diagram block or blocks. The computer program instructions may also be loaded to a computing device or other programmable data processing apparatus to cause operations to be performed on the computing device or other programmable apparatus to produce a computer implemented process such that the instructions which execute on the computing device or other programmable apparatus provide steps for implementing the acts specified in the flow chart and/or block diagram block or blocks.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention. These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates other aspects of the invention in any number of claim forms. For example, while only one aspect of the invention is recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for," but use of the term "for" in any other context is not intended to invoke treatment under 35 U.S.C. § 112(f). Accordingly, the applicant reserves the right to pursue additional claims after filing this application, in either this application or in a continuing application.

What is claimed is:

1. A method for dynamically managing storage for network shares configured in a file server, the method comprising:

receiving, by the file server from a client computing device, a write request comprising a first portion of a first file,
wherein the write request designates a first network share configured in the file server as a storage destination for the write request;

identifying, by a cache manager that executes on the file server, one or more storage volumes configured in the file server that are associated with the first network share,
wherein each of the one or more storage volumes comprises a respective first-network-share-specific folder that stores data for the first network share and only for the first network share, thereby associating each of the one or more storage volumes with the first network share;

if the cache manager determines that a first storage volume of the one or more storage volumes that are associated with the first network share comprises sufficient storage space to store the first portion of the first file included in the write request, storing, by the cache manager in response to the write request, the first portion of the first file to the respective first-network-share-specific folder in the first storage volume;

if the cache manager determines that the first storage volume of the one or more storage volumes that are associated with the first network share lacks sufficient storage space for the first portion of the first file included in the write request,
  (a) identifying by the cache manager a second storage volume of the one or more storage volumes that are associated with the first network share, which second storage volume comprises sufficient storage space for the first portion of the first file, and
  (b) regardless of whether other portions of the first file are stored in the same second storage volume, storing, by the cache manager in response to the write request, the first portion of the first file to the respective first-network-share-specific folder in the identified second storage volume; and if the cache manager determines that none of the one or more storage volumes that are associated with the first network share comprise sufficient storage space for the first portion of the first file included in the write request and no additional storage volumes are available in the file server,
  (A) freeing up storage space for the first network share by pruning data, by the cache manager, from one or more first-network-share-specific folders configured in the one or more storage volumes that are associated with the first network share,
    wherein only data that has been previously backed up from the file server into secondary copies can be pruned to free up storage space for the first network share, and
  (B) after the pruning, storing, by the cache manager in response to the write request, the first portion of the first file to a first-network-share-specific folder in one of the one or more storage volumes that are associated with the first network share.

2. The method of claim 1 further comprising:
if the cache manager determines that none of the one or more storage volumes that are associated with the first network share comprise sufficient storage space for the first portion of the first file included in the write request, dynamically expanding the amount of storage available for the first network share on the file server by:
  (i) identifying by the cache manager a third storage volume configured in the file server, wherein the third storage volume comprises sufficient storage space for the first portion of the first file,
  (ii) configuring by the cache manager in the third storage volume a first-network-share-specific folder for storing data for the first network share and only for the first network share, thereby associating the third storage volume with the first network share, and
  (iii) storing, by the cache manager in response to the write request, the first portion of the first file to the first-network-share-specific folder configured in the third storage volume.

3. The method of claim 1 wherein the pruning is also based on an age of the data that has been previously backed up.

4. The method of claim 1 wherein the pruning is also based on a size of a file that has been previously backed up.

5. The method of claim 1 wherein an amount of data that is pruned to free up storage space for the first network share is sufficient to reach an administrable threshold.

6. The method of claim 1 wherein criteria for pruning the data that has been previously backed up are administrable via a storage manager that is in communication with the file server.

7. The method of claim 1 wherein, for storage to the first network share on the file server, the first file is divided into a plurality of portions including the first portion, and
  wherein any given portion of the first file is stored to a first-network-share-specific folder configured on a respective one of the one or more storage volumes that are associated with the first network share, independently of whether another portion of the first file is also stored to the same one of the one or more storage volumes that are associated with the first network share, as determined by the cache manager.

8. The method of claim 1 wherein whether sufficient storage space is available to store the first portion of the first file is determined by the cache manager based on one or more administrable thresholds.

9. The method of claim 1 wherein the write request further comprises a second portion of the first file; and further comprising:
  for storing the second portion of the first file in response to the write request, identifying by the cache manager a storage volume of the one or more storage volumes that are associated with the first network share, based at least in part on whether the identified storage volume comprises sufficient storage space for the second portion of the first file regardless of whether the first portion of the first file is stored in the same storage volume.

10. The method of claim 1 wherein the receiving of the write request is performed by a protocol handler executing on the file server; and further comprising:
  transmitting, by the protocol handler, the write request to a module that executes on the file server, wherein the module is associated with the first network share and is in communication with the cache manager, which is also associated with the first network share;
  dividing, by the module, the first file into a plurality of portions including the first portion; and
  transmitting, by the module, each portion of the plurality of portions to the cache manager associated with the first network share.

11. The method of claim 7 wherein the cache manager which is associated with the first network share maintains an index of which portion of the first file is stored in which storage volume of the one or more storage volumes associated with the first network share.

12. The method of claim 7 wherein the cache manager which is associated with the first network share retains information about which portion of the first file is stored in which storage volume of the one or more storage volumes associated with the first network share.

13. The method of claim 1 further comprising:
  on passing an administrative timeout interval, creating an entry for the first file in a backup queue that is associated with the first network share, wherein files entered in the backup queue are to be backed up into secondary copies stored in a secondary storage device distinct from the file server.

14. A system for dynamically managing storage for network shares configured in a file server, the system comprising:

a file server in communication with a first client computing device, wherein the file server comprises a plurality of storage volumes;

a secondary storage device in communication with the file server;

wherein the file server is configured to:
  receive from the client computing device, a write request comprising a first portion of a first file, wherein the write request designates a first network share configured in the file server as a storage destination for the write request, and
  execute a cache manager that is configured to identify one or more storage volumes configured in the file server that are associated with the first network share,
    wherein each of the one or more storage volumes comprises a respective first-network-share-specific folder that stores data for the first network share and only for the first network share, thereby associating each of the one or more storage volumes with the first network share;
  if a first storage volume of the one or more storage volumes that are associated with the first network share comprises sufficient storage space to store the first portion of the first file included in the write request, the cache manager is configured to store the first portion of the first file to the respective first-network-share-specific folder in the first storage volume in response to the write request;
  if all of the one or more storage volumes that are associated with the first network share lack sufficient storage space to store the first portion of the first file, the cache manager is configured to dynamically expand the amount of storage available for the first network share on the file server by:
    (i) identifying a second storage volume configured in the file server, wherein the second storage volume comprises sufficient storage space for the first portion of the first file, and
    (ii) configuring in the second storage volume a first-network-share-specific folder for storing data for the first network share and only for the first network share, thereby associating the second storage volume with the first network share, and
    (iii) storing, in response to the write request, the first portion of the first file to the first-network-share-specific folder configured in the second storage volume to dynamically expand the amount of storage available for the first network share on the file server; and
  if none of the one or more storage volumes that are associated with the first network share comprise sufficient storage space for the first portion of the first file and no additional storage volumes are available in the file server to dynamically expand the amount of storage available for the first network share, the cache manager is configured to:
    (A) free up storage space for the first network share by pruning data from one or more first-network-share-specific folders configured in the one or more storage volumes that are associated with the first network share, wherein only data that has been previously backed up from the file server to the secondary storage device can be pruned to free up storage space for the first network share, and
    (B) after the pruning, store, in response to the write request, the first portion of the first file to a first-network-share-specific folder in one of the one or more storage volumes that are associated with the first network share.

15. The system of claim 14 wherein if the first storage volume of the one or more storage volumes that are associated with the first network share lacks sufficient storage space for the first portion of the first file, the cache manager is configured to:
  (a) identify a third storage volume of the one or more storage volumes that are associated with the first network share, which third volume comprises sufficient storage space for the first portion of the first file, and
  (b) regardless of whether other portions of the first file are stored to the same third storage volume, store, in response to the write request, the first portion of the first file to the respective first-network-share-specific folder in the identified third storage volume.

16. The system of claim 14 wherein the file server is further configured to, on passing an administrative timeout interval, create an entry for the first file in a backup queue that is associated with a backup interface module that is associated with the first network share, wherein the backup interface module also executes on the file server and is configured to receive from a storage manager one or more instructions to generate at least one secondary copy of the first file;
  wherein the backup interface module is further configured to generate, in conjunction with a media agent, a secondary copy of the first file based on the one or more instructions received from the storage manager; and
  wherein the media agent is configured to store the secondary copy of the first file to the secondary storage device and to report metadata about the secondary copy to at least one of: an index server in communication with the file server, and the storage manager.

17. The system of claim 14 wherein the file server is further configured to:
  receive from a client computing device, a second write request to comprising a first portion of a second file, wherein the second write request designates a second network share configured in the file server as a storage destination for the second write request;
  identify, by a second cache manager that executes on the file server, second one or more storage volumes configured in the file server that are associated with the second network share,
    wherein each of the second one or more storage volumes comprises a respective second-network-share-specific folder that stores data for the second network share and only for the second network share,
    wherein at least one of the second one or more storage volumes is the same as one of the one or more storage volumes associated with the first network share, and
    wherein the second cache manager is distinct from and operates independently of the cache manager that operates in reference to the first network share; and
  if one of the second one or more storage volumes associated with the second network share comprises sufficient storage space for the first portion of the second file included in the second write request, store the first portion of the second file thereto by the second cache manager in response to the second write request, regardless of whether any data for the first network share is stored on the same one of the second one or more storage volumes.

18. The system of claim 17 further comprising:
if all of the second one or more storage volumes that are associated with the second network share lack sufficient storage space for the first portion of the second file, the second cache manager is configured to dynamically expand an amount of storage available for the second network share on the file server by:
  (i) identifying a fourth storage volume configured in the file server, wherein the fourth storage volume comprises sufficient storage space for the first portion of the second file regardless of whether any data for the first network share is stored in the fourth storage volume,
  (ii) configuring in the fourth storage volume a second-network-share-specific folder for storing data for the second network share and only for the second network share, thereby associating the fourth storage volume with the second network share, and
  (iii) storing, in response to the second write request, the first portion of the second file to the second-network-share-specific folder configured in the fourth storage volume to dynamically expand the amount of storage available for the second network share on the file server.

* * * * *